US010974299B2

(12) United States Patent
Bauer et al.

(10) Patent No.: US 10,974,299 B2
(45) Date of Patent: Apr. 13, 2021

(54) ADDITIVE FABRICATION USING VARIABLE BUILD MATERIAL FEED RATES

(71) Applicant: Desktop Metal, Inc., Burlington, MA (US)

(72) Inventors: Uwe Bauer, Cambridge, MA (US); Emanuel Michael Sachs, Newton, MA (US); Mark Gardner Gibson, Carlisle, MA (US); Nicholas Graham Bandiera, Burlington, MA (US)

(73) Assignee: Desktop Metal, Inc., Burlington, MA (US)

( * ) Notice: Subject to any disclaimer, the term of this patent is extended or adjusted under 35 U.S.C. 154(b) by 145 days.

(21) Appl. No.: 16/038,057

(22) Filed: Jul. 17, 2018

(65) Prior Publication Data

US 2019/0022725 A1    Jan. 24, 2019

Related U.S. Application Data

(60) Provisional application No. 62/533,286, filed on Jul. 17, 2017.

(51) Int. Cl.
*B33Y 10/00* (2015.01)
*B21C 33/00* (2006.01)
(Continued)

(52) U.S. Cl.
CPC .............. *B21C 33/00* (2013.01); *B05B 12/06* (2013.01); *B05B 15/50* (2018.02); *B22F 1/0059* (2013.01);
(Continued)

(58) Field of Classification Search
CPC ......... B33Y 10/00; B33Y 30/00; B33Y 50/00; B33Y 50/02; B33Y 70/10; B21C 23/002;
(Continued)

(56) References Cited

U.S. PATENT DOCUMENTS

| 2006/0158456 A1* | 7/2006 | Zinniel | B29C 64/118 |
| | | | 345/589 |
| 2015/0132425 A1* | 5/2015 | Lacaze | B33Y 50/00 |
| | | | 425/144 |

(Continued)

FOREIGN PATENT DOCUMENTS

WO    2015061817 A2 *    5/2015    ............ B22F 1/0059

*Primary Examiner* — Edward T Tolan
(74) *Attorney, Agent, or Firm* — Wiggin and Dana LLP; Jonathan D. Hall; Joseph Casino

(57) ABSTRACT

3D printing using certain materials, such as metal containing multi-phase materials can be prone to clogs and other flow interruptions. Providing build material according to feed rate profiles having varying rates can mitigate these problems. Each feed rate profile can be broken up into blocks of time, some of which relate to fabricating the exterior geometry of the object. Each block of time can be represented by a FFT. The blocks that relate to the exterior are represented by a FFT that has significant high frequency content of 1 Hz or greater. It is beneficial to use profiles including feed rates outside of a range of feed rates suitable for steady state extrusion, being either higher or lower rates than the range limits. A combination of feed rate profiles based only on clog and flow interruption mitigation and operational to print the part according to a model can be used.

14 Claims, 21 Drawing Sheets

(51) Int. Cl.
*B29C 64/118* (2017.01)
*B05B 15/50* (2018.01)
*B05B 12/06* (2006.01)
*B29C 64/393* (2017.01)
*B22F 1/00* (2006.01)
*B22F 3/00* (2021.01)
*B33Y 30/00* (2015.01)
*B33Y 50/02* (2015.01)
*B29C 64/321* (2017.01)
*B29C 64/209* (2017.01)

(52) U.S. Cl.
CPC ............ *B22F 3/008* (2013.01); *B29C 64/118* (2017.08); *B29C 64/393* (2017.08); *B22F 2203/00* (2013.01); *B29C 64/209* (2017.08); *B29C 64/321* (2017.08); *B33Y 10/00* (2014.12); *B33Y 30/00* (2014.12); *B33Y 50/02* (2014.12)

(58) Field of Classification Search
CPC ..... B21C 23/04; B21C 29/003; B21C 29/006; B21C 33/00; B21C 33/004
See application file for complete search history.

(56) References Cited

U.S. PATENT DOCUMENTS

| | | | |
|---|---|---|---|
| 2018/0056602 A1* | 3/2018 | Susnjara | B33Y 10/00 |
| 2018/0272624 A1* | 9/2018 | Chang | B29C 64/112 |
| 2018/0345573 A1* | 12/2018 | Zinniel | B29C 64/295 |
| 2019/0134897 A1* | 5/2019 | Williams | G01N 21/33 |
| 2019/0217546 A1* | 7/2019 | Bosveld | B33Y 10/00 |

* cited by examiner

ADDITIVE FABRICATION USING VARIABLE BUILD MATERIAL FEED RATES

CROSS-REFERENCE TO RELATED APPLICATIONS

This application claims priority to U.S. Provisional App. No. 62/532,323, filed on Jul. 13, 2017, entitled Thermal Gradient Nozzle, the full disclosure of which is hereby incorporated by reference in its entirety. This application also claims priority to U.S. Provisional App. No. 62/533,286, filed on Jul. 17, 2017, entitled Additive Fabrication Using Variable-Speed Extrusion, the full disclosure of which is hereby incorporated by reference in its entirety.

This application is related to the following U.S. patent applications: U.S. Provisional App. No. 62/268,458, filed on Dec. 16, 2015; U.S. application Ser. No. 15/382,535, filed on Dec. 16, 2016; Int'l App. No. PCT/US17/20817 filed on Mar. 3, 2017; U.S. Provisional App. No. 62/303,310, filed on Mar. 3, 2016; and U.S. application Ser. No. 15/059,256 filed on Mar. 2, 2016. Each the foregoing applications is hereby incorporated by reference in its entirety.

TECHNICAL FIELD

The present disclosure generally relates to additive manufacturing, and more specifically to methods and systems for fused filament fabrication using variable build material feed rates.

BACKGROUND

Fused filament fabrication provides a technique for fabricating three-dimensional objects from a thermoplastic or similar materials. Machines using this technique can fabricate three-dimensional objects additively by depositing lines of material in layers to additively build up a physical object from a computer model. While these polymer-based techniques have been changed and improved over the years, the physical principles applicable to polymer-based systems may not be applicable to metal-based systems, which tend to pose different challenges. There remains a need for three-dimensional printing techniques suitable for metal additive manufacturing.

SUMMARY

Flow artifacts within an extruder of an extrusion-based additive manufacturing system can lead to accumulations of solidified material that clog a nozzle of the extruder or otherwise interfere with movement of material through the extruder, particularly where the extrudate includes multi-phase metallic materials or the like. By employing time-varying build material feed rates within the extruder, these artifacts can be mitigated and resulting flow interruptions can be avoided.

One aspect includes a method for feeding build material into and extruding build material out from a nozzle of a three-dimensional printer to fabricate an object. The object has an interior geometry and an exterior geometry, based on a computerized model of the geometry of the object. The printer also comprises a nozzle and a build plate, the nozzle having an inlet and an outlet. The method comprises: feeding the build material into the nozzle inlet according to a predetermined feed rate profile, which predetermined feed rate profile can be broken up into blocks of time, some of which blocks of time relate to fabricating the interior geometry of the object and some of which blocks of time relate to fabricating the exterior geometry of the object. Each block of time can be represented by a FFT (fast Fourier transform), where the blocks of time that relate to fabricating the exterior geometry are represented by a FFT that has significant high frequency content. The method also entails extruding build material from the nozzle outlet; and simultaneously with the extruding step, moving the nozzle outlet along a build path relative to the build plate to fabricate the object on the build plate. With a related embodiment, the predetermined feed rate profile comprises intervals of at least two different feed rates, which may comprise periodic or aperiodic variations of at least two different feed rates. With a significant embodiment, the blocks of time that relate to fabricating the exterior geometry are represented by a FFT that has significant content exceeding 1 Hz. With significant embodiments, the build material is a metal-containing-multi-phase (MCMP) type material, and the build material has a working temperature range that includes a temperature, for extruding the build material out from the nozzle outlet.

Another aspect disclosed herein is a method for feeding build material into and extruding build material out from a nozzle of a three-dimensional printer to fabricate an object, based on a computerized model of geometry of the object, the printer also comprising a nozzle and a build plate, the nozzle having an inlet and an outlet, there also being a set of feed rate profiles operational to print the object according to the computerized model, and a range of feed rates suitable for steady state extrusion. The method comprises feeding the build material into the nozzle inlet according to a combination of: the set of feed rate profiles operational to print the object according to the computerized model; and a predetermined feed rate profile, which predetermined rate profile comprises at least two different feed rates, one being a high feed rate that exceeds the range of feed rates suitable for steady state extrusion. The method also comprises extruding build material from the nozzle outlet; and simultaneously with the extruding step, moving the nozzle outlet along a build path relative to the build plate to fabricate the object on the build plate. In a closely related embodiment, one of the at least two different feed rates is a low feed rate that is less than and outside the range of feed rates suitable for steady state extrusion. One of the at least two different feed rates may be a reverse feed rate or a zero feed rate. The predetermined rate profile may beneficially comprise a periodic variation of at least two different feed rates. With a useful related embodiment, a combined feed rate profile resulting from combining the set of feed rate profiles operational to print the object according to the computerized model and a predetermined feed rate profile, exhibits a time-averaged feed rate, which is within the range suitable for steady state extrusion. In another embodiment, the predetermined feed rate profile comprising a feed rate profile related only to mitigation of clogs and other flow interruptions. A related embodiment further comprises monitoring for an error condition that indicates a flow interruption and in the step of combining a predetermined feed rate profile, combining a predetermined rate profile specifically chosen based on the flow interruption.

Still another aspect disclosed herein is a method for feeding build material into and extruding build material out from a nozzle of a three-dimensional printer to fabricate an object, based on a computerized model of geometry of the object, the printer also comprising a nozzle and a build plate, the nozzle having an inlet and an outlet, there also being a set of feed rate profiles operational to print the object according to the computerized model, and a range of feed rates suitable for steady state extrusion. The method comprises: feeding the build material into the nozzle inlet according to a combination of: the set of feed rate profiles operational to print the object according to the computerized model; and a predetermined feed rate profile, which predetermined rate profile comprises at least two different feed rates, one being a low feed rate that is less than and outside the range of feed rates suitable for steady state extrusion. The method also comprises extruding build material from the nozzle outlet; and simultaneously with the extruding step, moving the nozzle outlet along a build path relative to the build plate to fabricate the object on the build plate.

Yet another aspect disclosed herein is a method for feeding build material into and extruding build material out from a nozzle of a three-dimensional printer to fabricate an object, based on a computerized model of geometry of the object, the printer also comprising a nozzle and a build plate, the nozzle having an inlet and an outlet, there also being a set of feed rate profiles operational to print the object according to the computerized model. The method comprises: feeding the build material into the nozzle inlet according to a combination of feed rates. One is the set of feed rate profiles operational to print the object according to the computerized model; and the other is a predetermined feed rate profile, which predetermined rate profile comprises at least two different feed rates. The method similarly includes extruding build material from the nozzle outlet; and simultaneously with the extruding step, moving the nozzle outlet along a build path relative to the build plate to fabricate the object on the build plate. It can be beneficial to apply a fixed-ratio-of-rates requirement to the ratio of the combination of feed rates and motion of the nozzle outlet along the build path. In an embodiment related to many others herein, the predetermined feed rate profile comprising a feed rate profile related only to mitigation of clogs and other flow interruptions.

Still another aspect disclosed herein is a method for feeding build material into and extruding build material out from a nozzle of a three-dimensional printer to fabricate an object, based on a computerized model of geometry of the object, the printer also comprising a nozzle and a build plate, the nozzle having an inlet and an outlet, there also being a set of model-based feed rate profiles operational to print the object according to the computerized model, which model-based feed rate profiles as applied, results in fabricating an object at a model-based per-object rate, not accounting for delays based on servicing build material and extrusion flow interruptions. There also is a range of feed rates suitable for steady state extrusion. The method comprises: feeding the build material into the nozzle inlet according to a combination of: the set of feed rate profiles operational to print the object according to the computerized model; and a predetermined feed rate profile, which predetermined rate profile comprises at least two different feed rates, and which predetermined rate profile as applied results in fabricating an object at a per-object rate that is less than the model-based per-object rate. As with many other method embodiments, the method includes extruding build material from the nozzle outlet and, simultaneously with the extruding step, moving the nozzle outlet along a build path relative to the build plate to fabricate the object on the build plate. With a closely related embodiment, the model-based feed rate profiles as applied, result in fabricating an object at a servicing-model-based per-object rate, accounting for delays based on servicing build material and extrusion flow interruptions, which servicing-model-based per-object rate is less than the model-based per-object rate. In such a case, the predetermined rate profile as applied results in fabricating an object at a per-object rate that is larger than the servicing-model-based per-object rate.

Another aspect disclosed herein is a computer program product comprising computer executable code embodied in a non-transitory computer readable medium that, when executing on a printer for three-dimensional fabrication of an object, the object having an interior geometry and an exterior geometry, based on a computerized model of the geometry of the object, the printer also comprising a nozzle and a build plate, the nozzle having an inlet and an outlet, controls the printer to perform the following steps: feeding the build material into the nozzle inlet according to a predetermined feed rate profile which predetermined feed rate profile can be broken up into blocks of time, some of which blocks of time relate to fabricating the interior geometry of the object and some of which blocks of time relate to fabricating the exterior geometry of the object, each block of time being represented by a FFT (fast Fourier transform), where the blocks of time that relate to fabricating the exterior geometry are represented by a FFT that has significant high frequency content; extruding build material from the nozzle outlet; and simultaneously with the extruding step, moving the nozzle outlet along a build path relative to the build plate to fabricate the object on the build plate.

Still another aspect disclosed herein is a computer program product comprising computer executable code embodied in a non-transitory computer readable medium that, when executing on a printer for three-dimensional fabrication of an object, based on a computerized model of the geometry of the object, the printer also comprising a nozzle and a build plate, the nozzle having an inlet and an outlet, there also being a set of feed rate profiles operational to print the object according to the computerized model, and a range of feed rates suitable for steady state extrusion, controls the printer to perform the following steps: feeding the build material into the nozzle inlet according to a combination of: the set of feed rate profiles operational to print the object according to the computerized model; and a predetermined feed rate profile, which predetermined rate profile comprises at least two different feed rates, one being a high feed rate that exceeds the range of feed rates suitable for steady state extrusion. The computer program product also controls the printer to extrude build material from the nozzle outlet; and simultaneously with the extruding step, moving the nozzle outlet along a build path relative to the build plate to fabricate the object on the build plate.

Another aspect disclosed herein is a printer for fabricating a three-dimensional object based on a computerized model of geometry of the object, the object having an interior geometry and an exterior geometry. The printer comprises: a nozzle with an inlet to receive a build material in a solid condition, the build material having a working temperature range with a flowable state exhibiting rheological behavior suitable for fused filament fabrication; a heating system operable to heat the build material within the nozzle to a temperature within the working temperature range; a drive system operable to engage the build material and to feed the build material into the nozzle inlet at a feed rate with sufficient force to extrude the build material from the nozzle outlet onto a build plate, while at a temperature within the working temperature range; a feed rate controller configured to vary the feed rate that the drive system feeds the build material into the nozzle according to a predetermined feed rate profile which predetermined feed rate profile can be broken up into blocks of time, some of which blocks of time relate to fabricating the interior geometry of the object and some of which blocks of time relate to fabricating the exterior geometry of the object, each block of time being represented by a FFT (fast Fourier transform), where the blocks of time that relate to fabricating the exterior geometry are represented by a FFT that has significant high frequency content; and a nozzle robotics system operational to move the nozzle outlet at a rate along a build path relative to the build plate to fabricate the object on the build plate as build material is driven into the nozzle inlet and extruded out from the nozzle outlet.

Another aspect disclosed herein is a printer for fabricating a three-dimensional object based on a computerized model of geometry of the object. The printer comprises: a nozzle with an inlet to receive a build material in a solid condition, the build material having a working temperature range with a flowable state exhibiting rheological behavior suitable for fused filament fabrication, there also being a range of feed rates suitable for steady state extrusion. The printer also comprises a heating system operable to heat the build material within the nozzle to a temperature within the working temperature range and a drive system operable to engage the build material and to feed the build material into the nozzle inlet at a feed rate with sufficient force to extrude the build material from the nozzle outlet onto a build plate, while at a temperature within the working temperature range. The printer also includes a feed rate controller configured to vary the feed rate that the drive system feeds the build material into the nozzle according to a combination of: a set of feed rate profiles operational to print the object according to the computerized model; and a predetermined feed rate profile, which predetermined rate profile comprises at least two different feed rates, one being a high feed rate that exceeds the range of feed rates suitable for steady state extrusion. There are also a nozzle robotics system operational to move the nozzle outlet at a rate along a build path relative to the build plate to fabricate the object on the build plate as build material is driven into the nozzle inlet and extruded out from the nozzle outlet.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
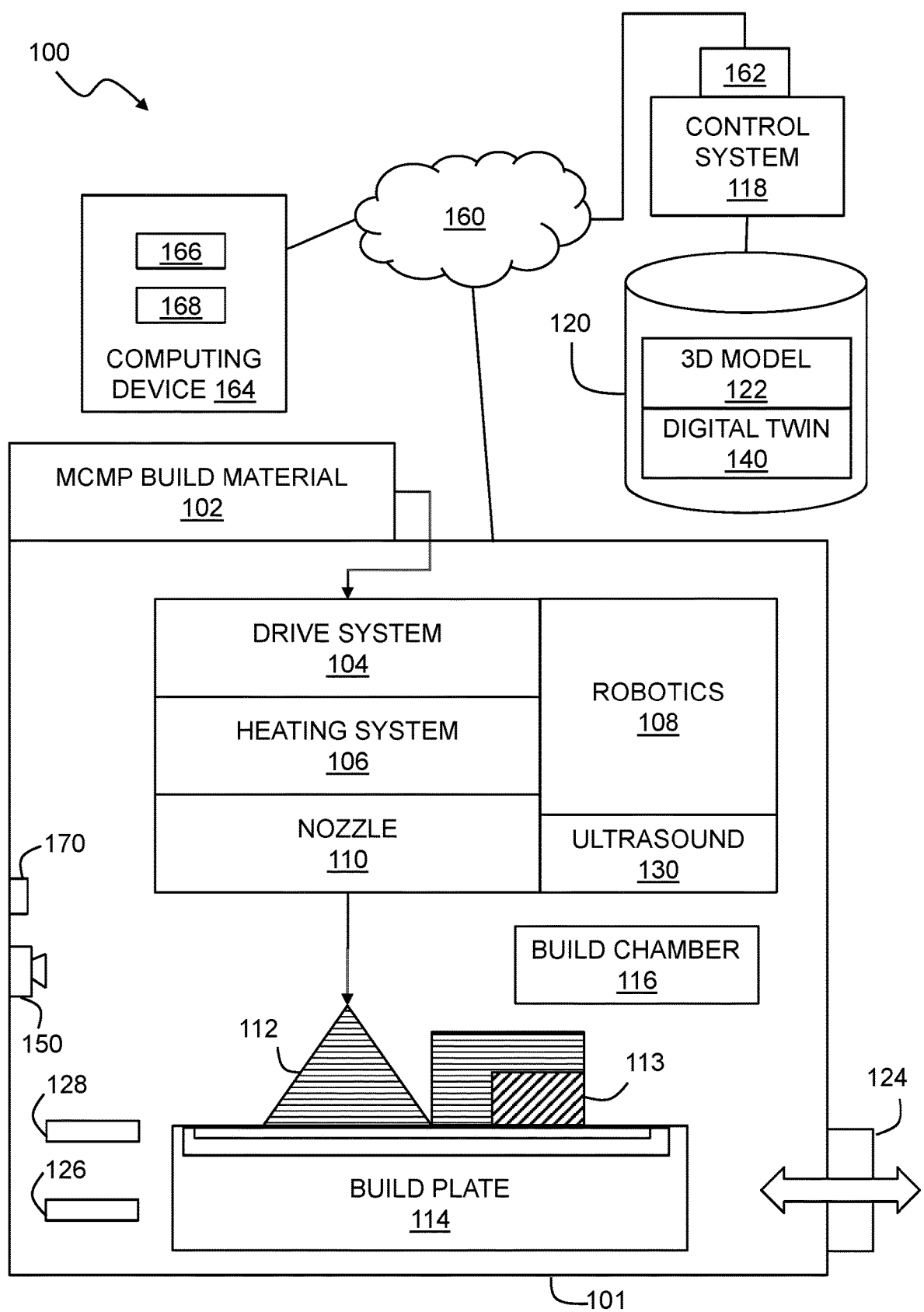
FIG. 1 is a block diagram of an additive manufacturing system.

Embodiments will now be described more fully hereinafter with reference to the accompanying figures, in which preferred embodiments are shown. The foregoing may, however, be embodied in many different forms and the following description should not be construed as limiting unless explicitly stated otherwise.

All documents mentioned herein are incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term or should generally be understood to mean and/or and so forth.

Recitation of ranges of values herein are not intended to be limiting, referring instead individually to any and all values falling within the range, unless otherwise indicated herein, and each separate value within such a range is incorporated into the specification as if it were individually recited herein. The words about, approximately, substantially, or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language (e.g., such as, or the like) provided herein, is intended merely to better illuminate the embodiments and does not pose a limitation on the scope of the embodiments or the claims. No language in the specification should be construed as indicating any unclaimed element as essential to the practice of the claimed embodiments.

In the following description, it is understood that terms such as first, second, top, bottom, up, down, and the like, are words of convenience and are not to be construed as limiting terms unless specifically stated to the contrary.

In general, the following description emphasizes three-dimensional printers using metal as a build material for forming a three-dimensional object. However, there are some apparatus and method aspects of the present teachings that are also suitable for use with build materials that do not include metal, but which do assume a physical state having a rheology including a viscosity that is suitable for extrusion.

Regarding metal build materials more specifically, this description emphasizes three-dimensional printers that deposit metal, metal alloys, or other metallic compositions for forming a three-dimensional object using fused filament fabrication or similar techniques. In these techniques, a bead of material is extruded in a layered series of two-dimensional patterns to form a three-dimensional object from a digital model. The beads may also be referred to as roads or paths or lines. However, it will be understood that other additive manufacturing techniques and other build materials may also or instead be used with many of the techniques contemplated herein. Such techniques may benefit from the systems and methods described below, and all such printing technologies are intended to fall within the scope of this disclosure, and within the scope of terms such as printer, three-dimensional printer, fabrication system, additive manufacturing system, and so forth, unless a more specific meaning is explicitly provided or otherwise clear from the context. Further, if no type of printer is stated in a particular context, then it should be understood that any and all such printers are intended to be included, such as where a particular material, support structure, article of manufacture, or method is described without reference to a particular type of three-dimensional printing process.

Embodiments of the present teachings may include methods that use a varying build material feed rate during the course of extruding material for a part. It is believed that use of such varying build material feed rates mitigate clogging and clumping and other flow related impediments to reliable continuous feeding in of build material and extruding out of extrudate. Such variable feed rate profiles are discussed below. Before that discussion, however, will be discussed the general FFF 3D printing equipment that is suitable for use with the present teachings, and also the materials for which benefits have been found using the varying build material feed rate profiles.

FIG. 1 is a block diagram of an additive manufacturing system. In general, the additive manufacturing system may include a three-dimensional printer 101 (or simply printer 101) that deposits a metal, metal alloy, metal composite or the like, using fused filament fabrication or any similar process. In general, the printer 101 may include a multi-phase metallic build material 102 that is propelled by a drive system 104 and heated to an extrudable state by a heating system 106, and then extruded through one or more nozzles 110. By concurrently controlling robotics 108 to position the nozzle(s) along an extrusion path relative to a build plate 114, an object 112 may be fabricated on the build plate 114 which may be situated within a build chamber 116. In general, a control system 118 may manage operation of the printer 101 to fabricate the object 112 according to a three-dimensional model using a fused filament fabrication process or the like. The types of materials suitable as a build material are discussed below.

Figure 2:
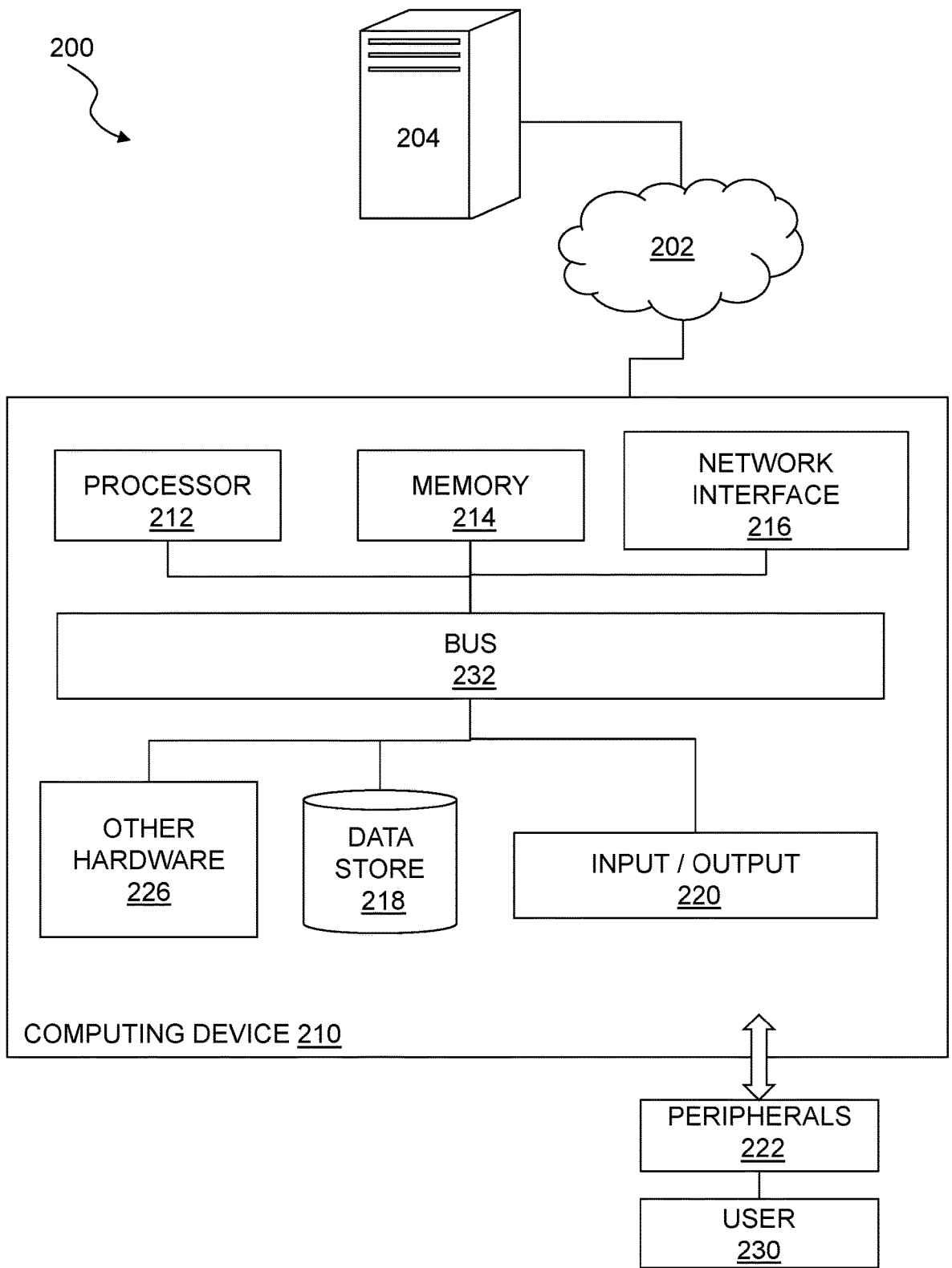
FIG. 2 is a block diagram of a computer system.

FIG. 2 is a block diagram of a computer system, which may be used for any of the computing devices, control systems or other processing circuitry described herein. The computer system 200 may include a computing device 210, which may also be connected to an external device 204 through a network 202. The computing device 210 may include any of the controllers described herein (or vice-versa), or otherwise be in communication with any of the controllers or other devices described herein. The computing device 210 may include a processor 212, a memory 214, a network interface 216, a data store 218, and one or more input/output devices 220. The computing device 210 may further include or be in communication with peripherals 222. A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth. A bus 232 or combination of busses may serve as an electromechanical platform for interconnecting components of the computing device 200.

Figure 3:
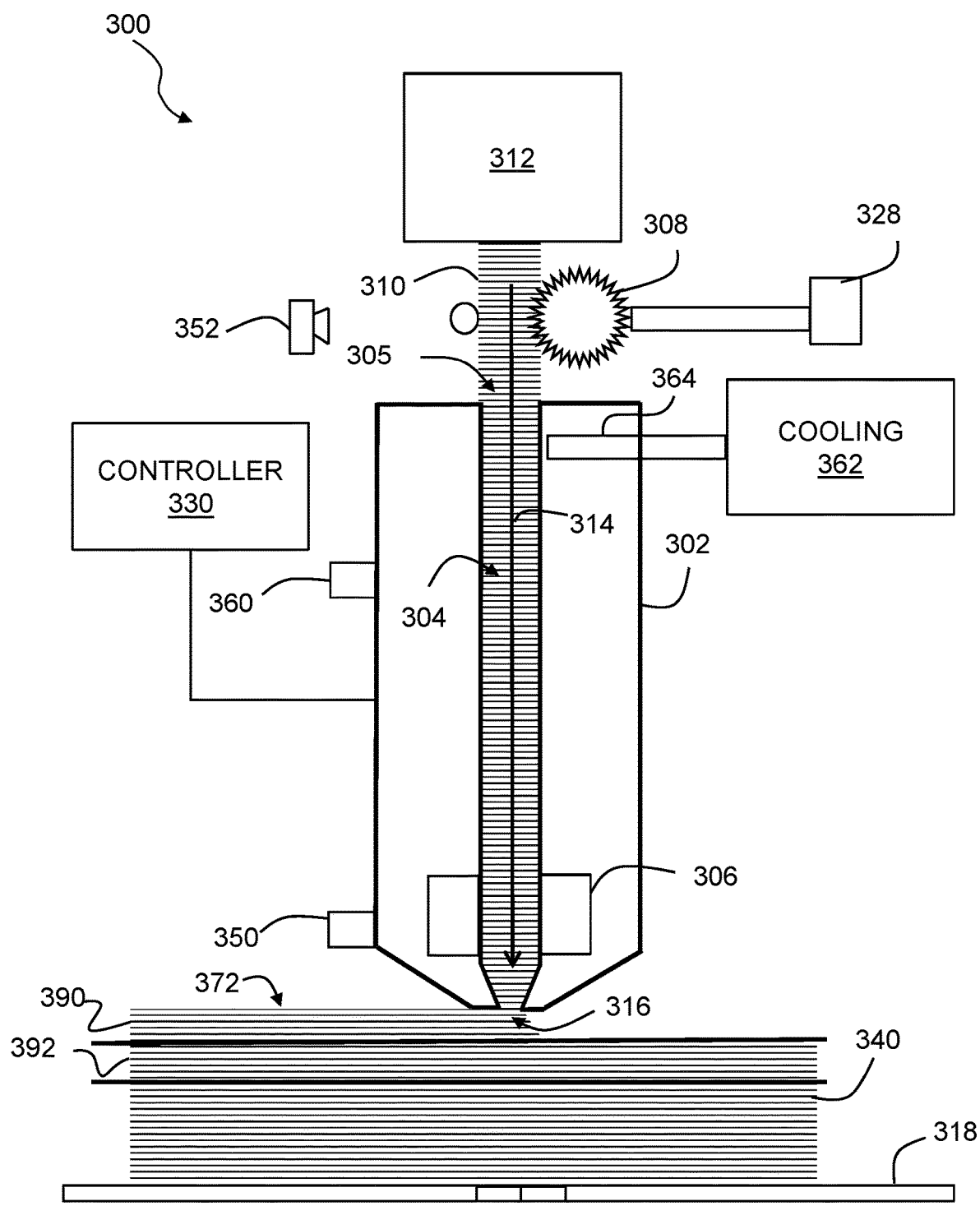
FIG. 3 shows an extruder for a three-dimensional printer.

FIG. 3 shows an extruder 300 for a three-dimensional printer. In general, the extruder 300 may include a nozzle 302, a nozzle bore 304, a heating system 306, and a drive system 308 such as any of the systems described herein, or any other devices or combination of devices suitable for a printer that fabricates an object from a computerized model using a fused filament fabrication process and a metallic build material as contemplated herein. In general, the extruder 300 may receive a build material 310 from a source 312, such as any of the build materials and sources described herein, and advance the build material 310 along a feed path (indicated generally by an arrow 314) toward an opening 316 of the nozzle 302 for deposition on a build plate 318 or other suitable surface. The term build material is used herein interchangeably to refer to metallic build material, species and combinations of metallic build materials, or any other build materials (such as thermoplastics), all as discussed below. As such, references to build material 310 should be understood to include metallic build materials, or multi-phase metallic build materials or any of the other build material or combination of build materials described herein, including a thermoplastic, under specific conditions, unless a more specific meaning is provided or otherwise clear from the context.

Many metallic build materials may be used with the techniques described herein. In general, any build material with metallic content that provides a useful working temperature range with rheological behavior suitable for heated extrusion may be used as a metallic build material as contemplated herein. One particularly desirable class of metallic build materials are metallic multi-phase materials. Such multi-phase materials can be any wholly or partially metallic mixture that exhibits a working temperature range in which at least one solid phase and at least one liquid phase co-exist, resulting in a rheology suitable for fused filament fabrication or similar techniques described herein.

The following discussion will initially describe many different materials that exhibit the beneficial properties. These different materials may not form any naturally occurring class or type of material, as far as the present inventors are aware. However, they all together constitute a type of materials suitable for use with the present teachings. The term metal containing multi-phase type material, referred to in shortened form as an MCMP type, or simply an MCMP material, will be used to refer to all of the materials that are about to be described, and any other suitable materials not explicitly mentioned, but which exhibits a working temperature range in which at least one solid phase and at least one liquid phase co-exist, resulting in a rheology suitable for fused filament fabrication or similar techniques described herein.

In one aspect, a MCMP build material may be a metal alloy that exhibits a multi-phase equilibrium between at least one solid and at least one liquid phase. Such a semi-solid state may provide a working temperature range with rheological behavior suitable for use in fused filament fabrication as contemplated herein. For example, the composite may, within the working temperature range, form a non-Newtonian paste or Bingham fluid with a non-zero shear stress at zero shear strain. While the viscous fluid nature of the composite permits extrusion or other similar deposition techniques, this non-Newtonian characteristic can permit the deposited material to retain its shape against the force of gravity so that a printed object can retain a desired form until the composite material cools below a solidus or eutectic temperature of the metallic base.

For example a composition of a eutectic alloy system, which is not the eutectic composition, may exhibit such a multiphase equilibrium. Compositions within an alloy system with a eutectic may melt over a range of temperatures rather than at a melting point and thus provide a semi-solid state with a mixture of at least one solid and at least one liquid phase that collectively provide rheological behavior suitable for fused filament fabrication or similar additive fabrication techniques. This mixture may be at equilibrium or stable over the timescales of the extrusion process.

Figure 4A:
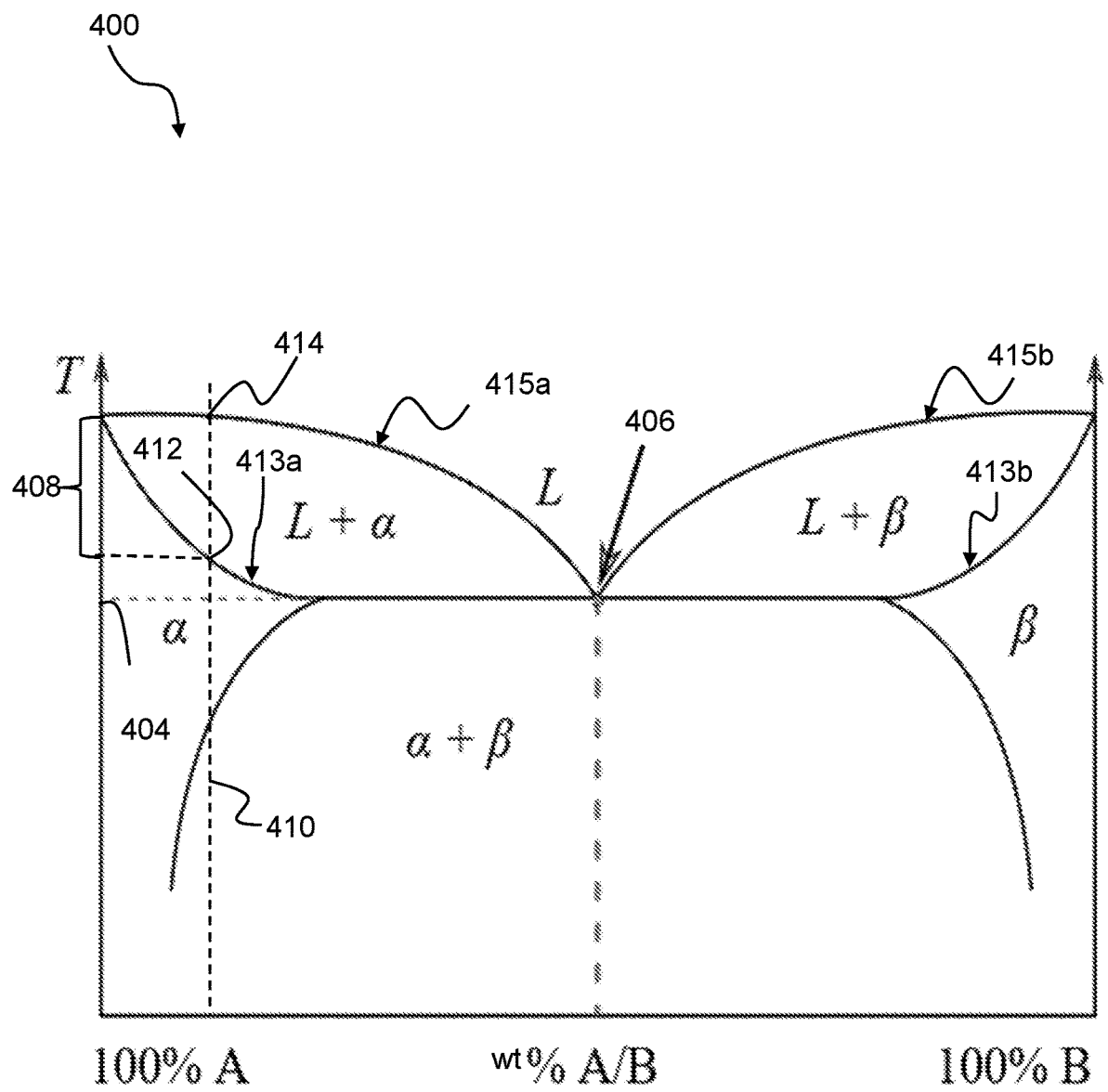
FIG. 4A shows a phase diagram for a generic eutectic system, for which, within a temperature range, there are compositions that exist in a multi-phase condition of at least one solid phase and one liquid phase.

FIG. 4A shows a phase diagram 400 for a simple eutectic alloy system, exhibiting an alloy composition suitable for use as a MCMP build material in the methods and systems described herein. The eutectic composition is the composition present at the vertical dashed line that intersects the point 406. The point 406 is at the intersection of the lines that represent the eutectic composition (vertical dashed) and the eutectic temperature 404. In general, the build material may include an alloy with a working temperature range in which the mixture contains a solid and liquid phase in an equilibrium proportion dependent on temperature. The solid and liquid phases coexist within the temperature and composition combinations within the two bound regions labeled as L+$\alpha$ and L+$\beta$, respectively. This notation signifies that within that region, the build material exists as a mixture of a liquid phase L made up of components A and B and a solid phase with a specific crystalline structure. The solid phase is denoted as $\alpha$, for compositions to the left of the eutectic composition (higher concentrations of component A) and as $\beta$ for compositions to the right of the eutectic composition (higher concentrations of component B). Where $\alpha$ denotes a solid solution of B in an A matrix and $\beta$ denotes a solid solution of A in a B matrix. This multi-phase condition usefully increases viscosity of the material above the pure liquid viscosity while in the working temperature range to render the material in a flowable state exhibiting rheological behavior suitable for fused filament fabrication or similar extrusion-based additive manufacturing techniques.

It should be understood that whenever alloy systems are discussed which have two constituents, that is, binary alloy systems, the same concepts will apply to alloy systems with three, four, and any number of constituents. As an example, a quaternary system can also have a eutectic composition.

The alloy composition just described is one instance of a MCMP material of a general class of materials that are suitable for use with the present teachings. More are described below.

For another instance of a MCMP material, it is beneficial to add an inert high-temperature second phase into a metal alloy. The metal alloy may be a simple alloy that only exhibits one (liquid) phase within a given temperature range. In that case, the inert material provides the second phase, and the desirable viscosity properties. Alternatively, the inert material may be provided to an alloy that itself demonstrates a multi-phase condition within a working temperature range, as discussed above, in which case, the alloy plus inert material can give rise to a more complicated multi-phase situation, with possibly one liquid phase and two solid phases, possibly at different temperatures, with a semi-solid state to further control viscosity.

For another instance of MCMP materials, an inert second phase may be used with an alloy with substantially the eutectic composition. This combination provides a dual advantage of the relatively low melting temperature that is characteristic of the eutectic composition, along with the desirable flow characteristics that can be imparted by an added inert second phase.

In FIG. 4A, composition and temperature combinations above the liquidus curves 415a and 415b will be a single liquid phase L. When an alloy in a eutectic alloy system solidifies, its components may solidify at different temperatures, resulting in a semi-solid suspension of solid and liquid components prior to full solidification. The working temperature for such an alloy composition is generally a range of temperatures between a lowest and highest melting temperature. In a mixture around the eutectic point 406, the lowest melting temperature (at which this mixture remains partially molten) is the eutectic temperature 404. The highest melting temperature will generally be a function of the percentage of the components A and B. In regions far from the eutectic composition such that the eutectic line terminates, i.e., at the far left or the far right of the phase diagram 400, the lowest melting temperature may be somewhat above the eutectic temperature, e.g., at the solidus temperature of the alloy. The solidus temperatures for different compositions lie upon the solidus curves 413a and 413b, which also are collinear for some of their extent with a horizontal line at the eutectic temperature 404. For example, for a composition in a eutectic alloy system with a very high fraction of material A (as indicated by a dashed vertical line 410), the composition may have a solidus temperature 412 somewhat above the eutectic temperature 404, and a liquidus temperature 414 at the highest liquidus temperature for the composition. Either type of composition, may have a working temperature range 408 including a range of temperatures above a lowest melting temperature (e.g., where the entire system becomes solid) and below a highest melting temperature (e.g., where the entire system becomes liquid) where the composition, or a corresponding metallic build material includes solid and liquid phases in a combination providing a variable, temperature-dependent viscosity and rheological behavior suitable for extrusion. This working temperature range 408 will vary by composition and alloying elements, but may be adapted for a wide range of metal alloys for use in a fused filament fabrication process or the like as contemplated herein.

Figure 4B:
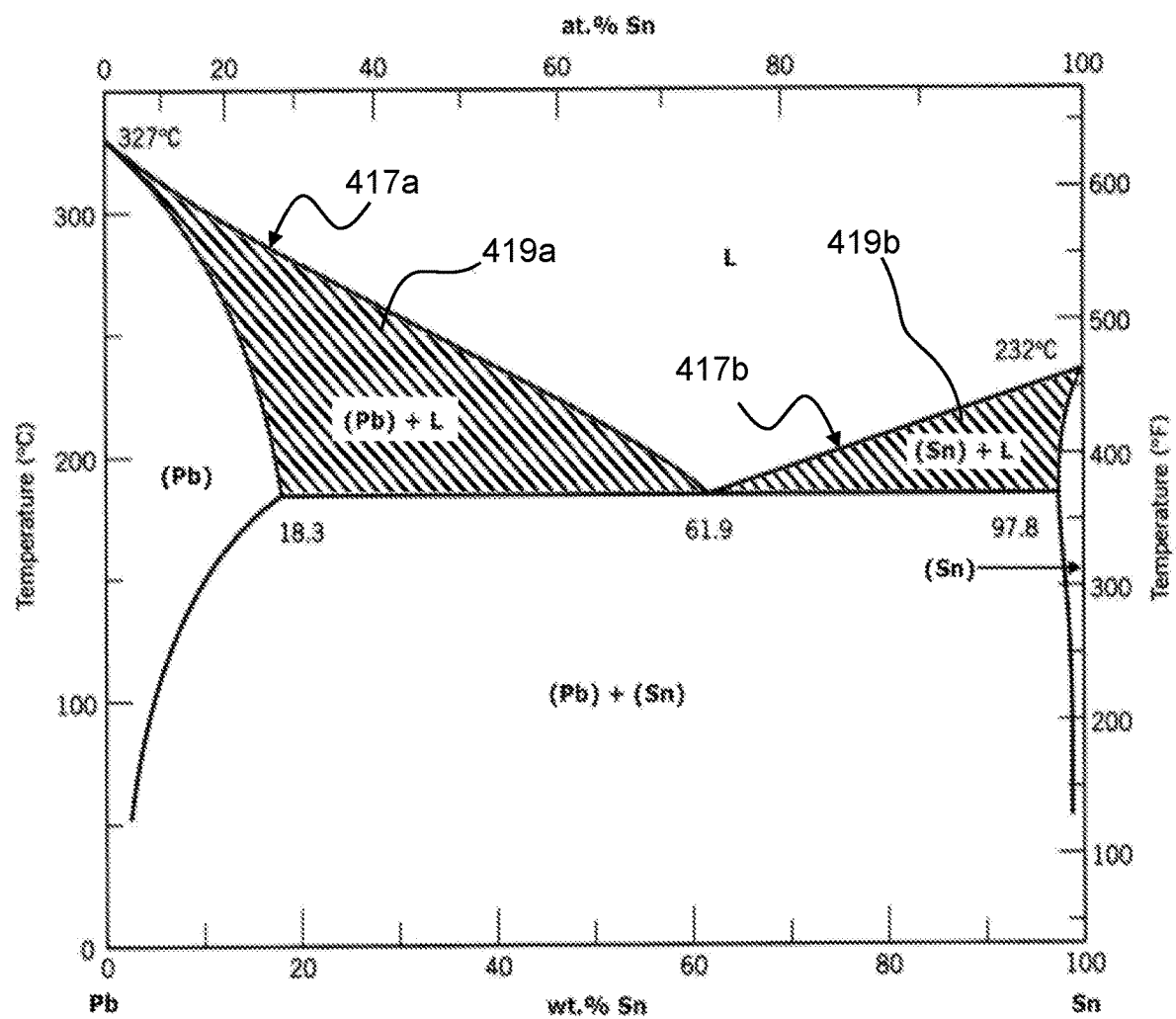
FIG. 4B shows a phase diagram for a lead and tin system.

FIGS. 4A, 4B, 4C, 4D and 6, show phase diagrams of example eutectic alloy systems that exhibit compositions suitable for use as a build material in the methods and systems described herein. FIG. 4B shows in graphical form a binary phase diagram for the Pb (lead) and Sn (tin) system. The eutectic composition is at 61.9 wt % Sn, and the eutectic temperature is 183 degrees C. For composition and temperature combinations within the region denoted L, the material will be in a single phase liquid state. For composition and temperature combinations within the two cross-hatched regions the material will be in a two-phase state where a liquid and solid phase coexist in equilibrium proportions. In the region 419a, on the left hand side—higher Pb concentration—of the eutectic composition, the liquid L coexists with the solid (Pb) phase. In the region 419b, on the right hand side—higher Sn concentration—of the eutectic composition, the liquid L coexists with the solid (Sn) phase. Here (Pb) denotes a solid solution of Sn in a Pb matrix and (Sn) denotes a solid solution of Pb in a Sn matrix. The liquidus curves below the liquid region L are indicated at 417a bounding the liquid L plus solid (Pb) region and at 417b bounding the liquid L plus solid (Sn) region.

Figure 4C:
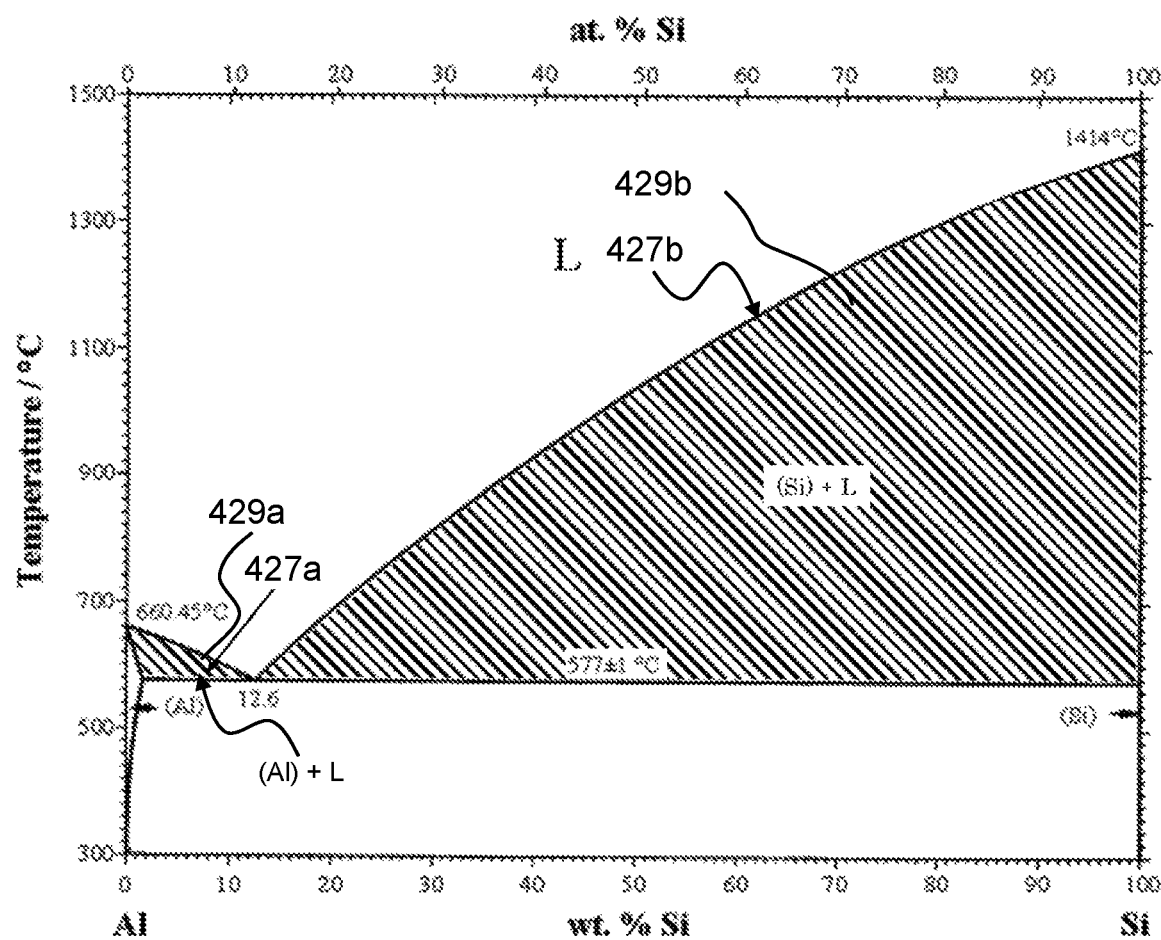
FIG. 4C shows a phase diagram for an aluminum and silicon system.

FIG. 4C shows in graphical form a phase diagram for an Al (aluminum) and Si (silicon) system. The eutectic composition is at 12.6 wt % Si, and the eutectic temperature is at approximately 577 degrees C. For composition and temperature combinations within the region denoted L the material will be in a single phase liquid state. For composition and temperature combinations within the two cross-hatched regions 429a and 429b the material will be in a two phase state where a liquid and solid phase coexist in equilibrium proportions. In the region 429a, to the left of the eutectic composition, where there is a higher Al concentration—the liquid L coexists with solid (Al) phase. In the region 429b, to the right of the eutectic composition, where there is a higher Si concentration, the liquid L coexists with solid (Si) phase. Where (Al) denotes a solid solution of Si in an Al matrix and (Si) denotes a solid solution of Al in a Si matrix. The liquidus curves below the liquid region L are indicated at 427a bounding the liquid L plus solid (Al) region and at 427b bounding the liquid L plus solid (Si) region.

Figure 4D:
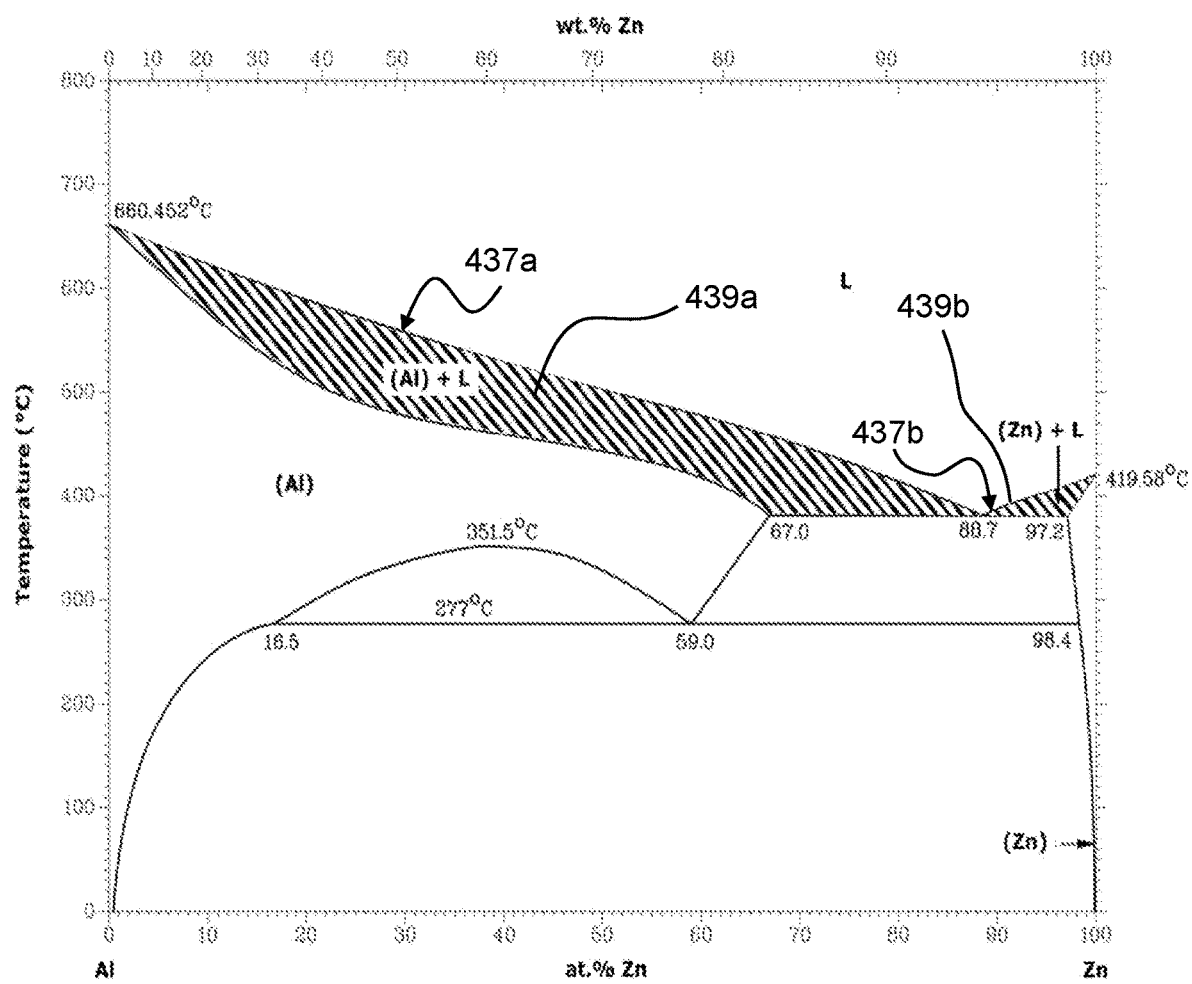
FIG. 4D shows a phase diagram for an aluminum and zinc system.

FIG. 4D shows in graphical form a binary phase diagram for the Al (aluminum) and Zn (zinc) system. The system exhibits a eutectic composition and temperature at 88.7 at % Zn, and 381 degrees C. For composition and temperature combinations within the region denoted L the material will be in a single-phase liquid state. For composition and temperature combinations within the two cross-hatched regions the material will be in a two phase state where liquid and solid phases coexist in equilibrium proportions. In the region 439a, on the left hand side—higher Al concentrations—of the eutectic, the liquid L coexists with the solid (Al) phase and in the region 439b, on the right hand side—higher Zn concentration—of the eutectic composition, the liquid L coexists with the solid (Zn) phase. Where, (Al) denotes a solid solution of Zn in an Al matrix and (Zn) denotes a solid solution of Al in a Zn matrix. The liquidus curves below the liquid region L are indicated at 437a bounding the liquid L plus solid (Al) region and at 437b bounding the liquid L plus solid (Zn) region.

Figure 6:
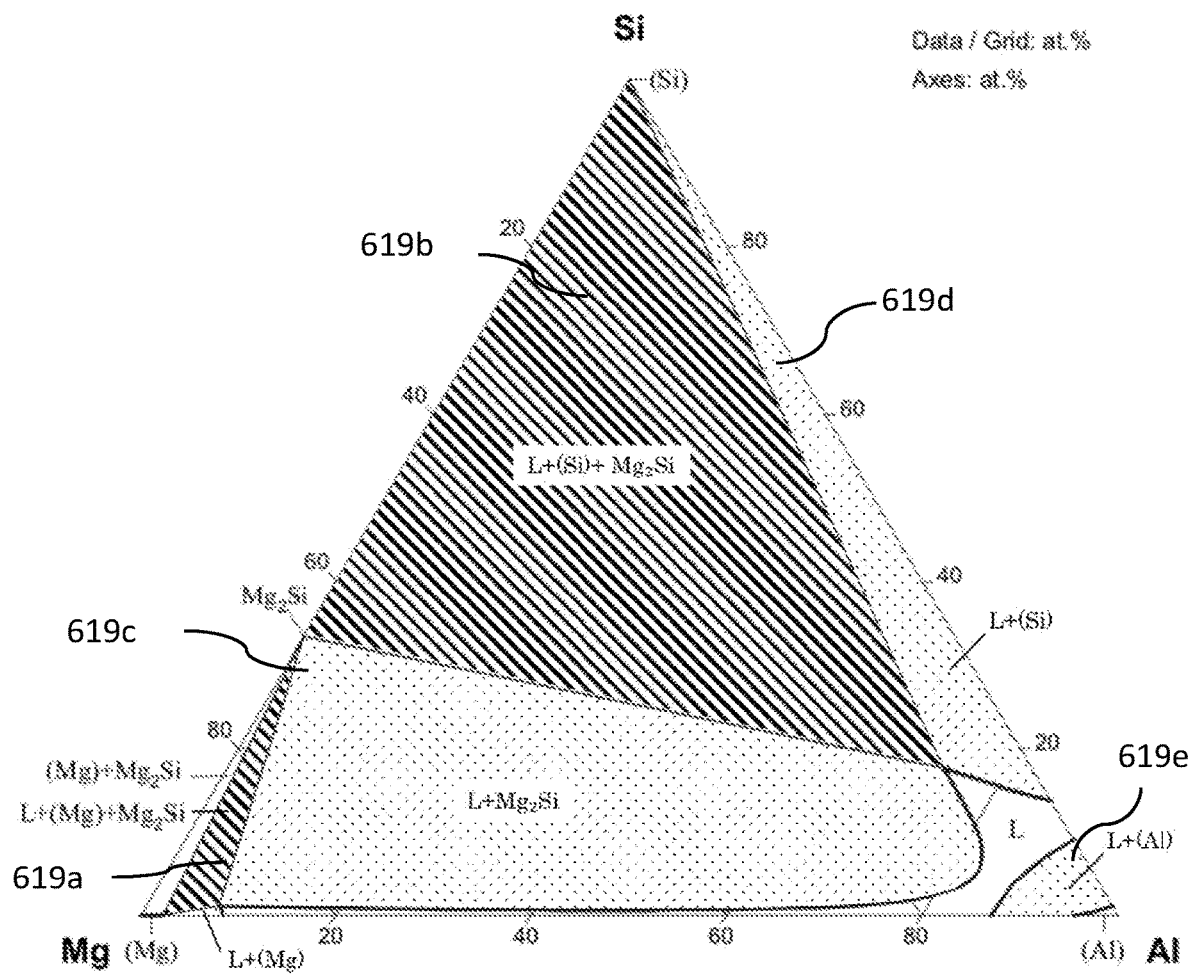
FIG. 6 shows an isothermal section of a phase diagram for an Aluminum Silicon Magnesium Ternary alloy, having regions with a liquid phase and two solid phases.

FIG. 6 shows an isothermal section at 600 degrees C. of the ternary phase diagram for the Al—Si—Mg (aluminum-silicon-magnesium) alloy system. Because there are three components, the phase diagram of the Al—Si—Mg system is three-dimensional but at any temperature an isothermal slice of the phase diagram can be constructed that will show the phases present for all compositions of the ternary system. The two cross-hatched regions 619a and 619b show regions of compositions that have a single liquid phase L, and two different solid phases, with region 619a having the solids of (Mg) and $Mg_2Si$, and the other region 619b having a liquid phase and the solids of (Si) and $Mg_2Si$. The three dotted regions 619c, 619d and 619e show regions of compositions that have a single liquid phase L, and only one solid phase, but with the solid phases differing in each region, with region 619c having the solid of $Mg_2Si$, the region 619d having the solid (Si) phase and the other region 619e having the solid of (Al). Any of the cross-hatched (liquid and two solid phase) or dotted (liquid and one solid phase) regions could have suitable compositions for multi-phase build material for use with the present teachings. Other systems that are ternary, or have even more than three components, may also have the required multi-phase compositions for practice of the present teachings. The presence of multiphase regions is not limited to binary or ternary systems with a eutectic, it extends to alloy systems with an arbitrary number of components, all of which may exhibit compositions with a working temperature range suitable for fused filament fabrication or similar fabrication processes.

Figure 5A:
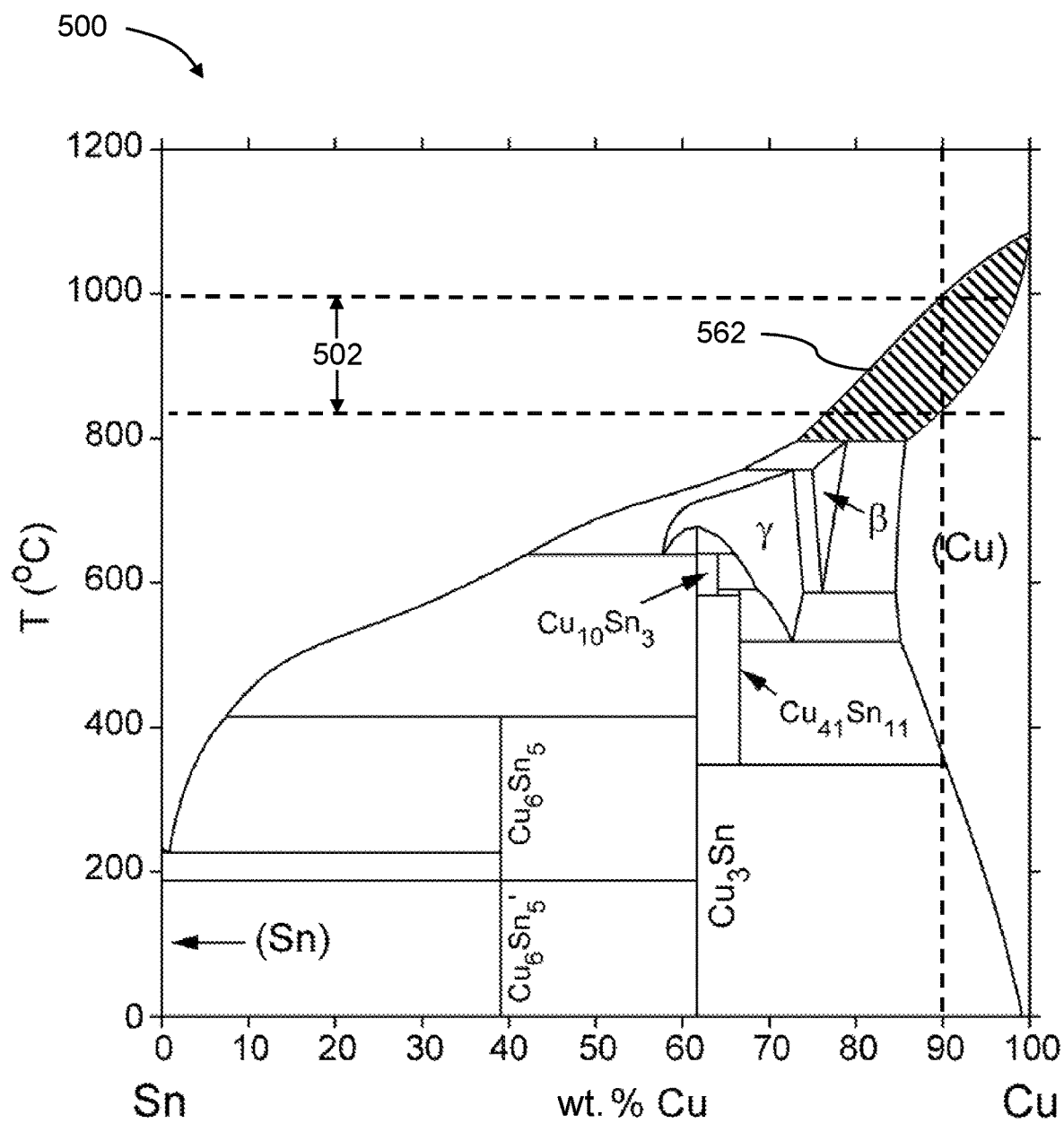
FIG. 5A shows a phase diagram for a peritectic system.

Another instance of suitable MCMP materials may include compositions within a peritectic alloy system. A composition within a peritectic alloy system may also have a working temperature range with a multi-phase state suitable for use in a fused filament fabrication process. FIG. 5A shows a phase diagram 500 for a peritectic system. As used herein, a peritectic system refers to a chemical system wherein a solid phase and a liquid phase may react upon cooling to form a third, solid phase. In particular, FIG. 5A shows a phase diagram 500 for a relatively common peritectic system of 90/10 bronze, which is an alloy of Sn (tin) and Cu (copper). This system can provide a working temperature range 502 in which the constituent elements form a multi-phase mixture between solid and liquid parts, for instance as shown in the cross-hatched region 562. In this range of temperatures, an equilibrium volume fraction of solid and liquid can be controlled by varying temperature. The rheology of the extrudate can be tuned by tuning the volume fraction (and therefore the temperature) of the composition, and the resulting material can provide a substantially plastic temperature behavior suitable for extrusion. While the highly non-uniform solidification behavior may present design and handling challenges, this technique may be usefully applied for fabrication with bronze and similar alloys and materials.

More generally, a suitable MCMP material alloy system may contain more than one eutectic or more than one peritectic, as well as both eutectics and peritectics, all of which may provide a multi-phase state with a rheology suitable for extrusion. For example, the Al—Cu phase diagram (not reproduced herein) has both a eutectic and a peritectic. In particular the presence of intermediate phases and intermetallic compounds can greatly increase the complexity of metal alloy phase diagrams, resulting in multiple regions within the phase diagram where at least one liquid phase and at least one solid phase coexist in equilibrium. In such systems, there may be a wide range of alloy compositions exhibiting a working temperature range with a multi-phase state suitable for use as a metallic build material in a fused filament fabrication process. All of the foregoing are instances of suitable MCMP materials.

Figure 5B:
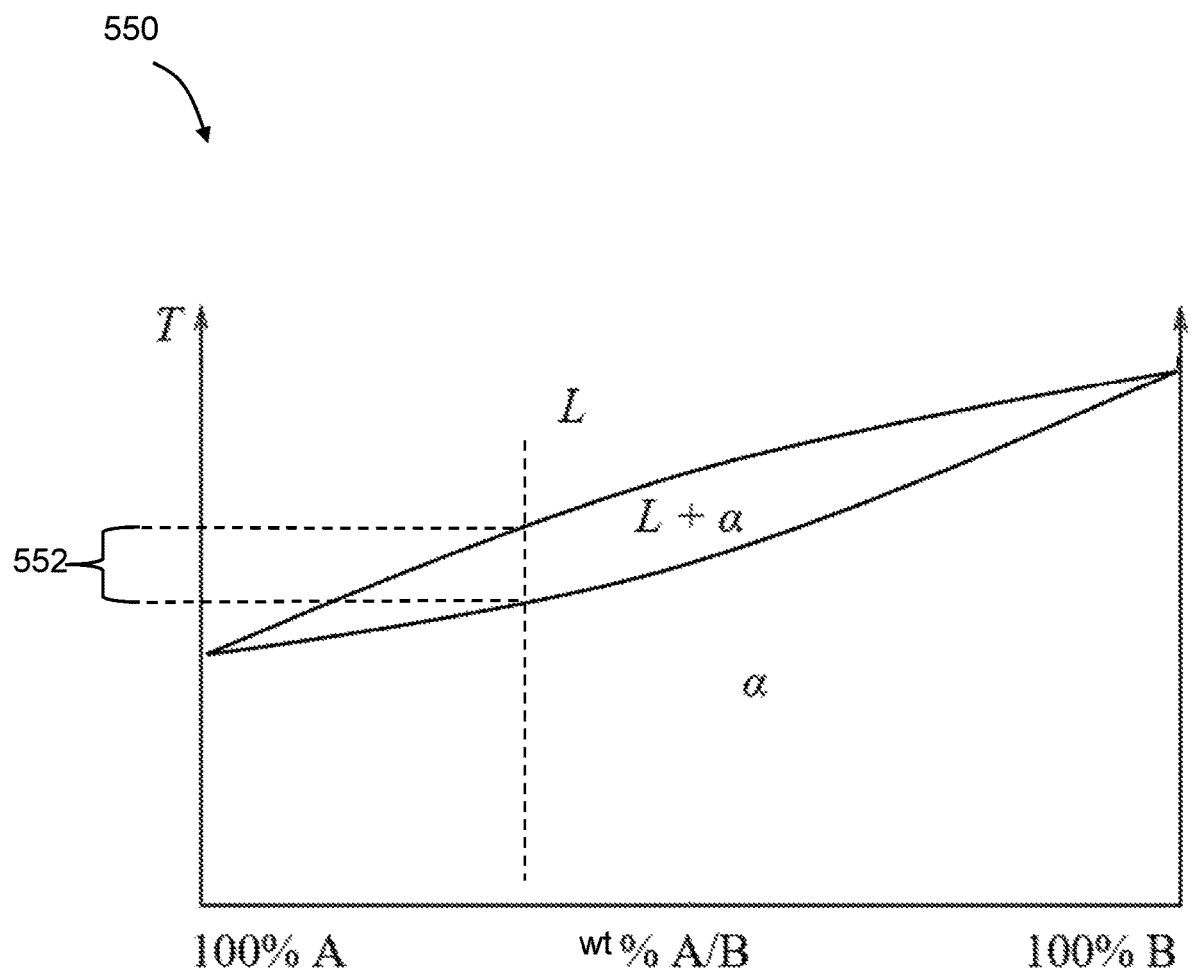
FIG. 5B shows a phase diagram for an isomorphous system.

Yet another instance of suitable MCMP materials are isomorphous alloy systems, for which a portion of a phase diagram is shown schematically in FIG. 5B. A composition of an isomorphous alloy system may also have a working temperature range with a semi-solid state suitable for use in a fused filament fabrication process. Here, an isomorphous alloy system refers to an alloy system comprised of components having the same crystal structure such that the components are fully miscible in the solid state and form a continuous solid solution. Binary alloys of copper and nickel for example represent such an isomorphous alloy system and may be used as a build material for fabricating objects as contemplated herein, particularly in instances in which the composition has a temperature range within which the composition exhibits a mixture of solid and liquid phases resulting in rheological behavior suitable for extrusion.

FIG. 5B shows a phase diagram for an isomorphous system. In particular, FIG. 5B shows a phase diagram 550 for a binary alloy system including component A and B which forms a solid solution α extending across the whole composition range, i.e. from a composition of 100% component A all the way to 100% component B. In certain solid solution forming systems, the solid solubility may have a narrower composition range or ranges than the composition range shown in FIG. 5B without departing from the scope of the present disclosure. The binary solid solution system in FIG. 5B can provide a working temperature range 552 in which the constituent components A and B form a multi-phase mixture between solid and liquid parts. In the temperature range 552, an equilibrium volume fraction of solid and liquid can be controlled by varying temperature. This multi-phase condition may usefully increase viscosity of the material above the pure liquid viscosity while in the temperature range 552 to render the material in a flowable state exhibiting rheological behavior suitable for fused filament fabrication or similar.

More generally, a chemical system may exhibit a multi-phase equilibrium between at least one solid and at least one liquid phase without exhibiting a eutectic or a peritectic phase behavior. The copper-gold system is an example. Such systems may still provide a working temperature range between a solidus and liquidus temperature with a rheology suitable for use in fused filament fabrication process as contemplated herein, and such systems are considered an instance of MCMP materials.

Another instance of suitable MCMP materials include metallic materials using a combination of a metallic base and a high temperature inert second phase, which may constitute a metallic multi-phase material which may be usefully deployed as a build material for fused filament fabrication. For example, U.S. application Ser. No. 15/059,256, filed on Mar. 2, 2016 and incorporated by reference herein in its entirety, describes a variety of such materials. Thus, one useful metallic build material contemplated herein includes a composite formed of a metallic base and a second phase. The metallic base may include any metal or metal alloy (or combination of alloys) that melts at a first temperature. The second phase may be a high temperature inert second phase in particle form that remains substantially inert up to at least a second temperature that is higher than the first temperature, preferably substantially higher in order to provide a useful working range of temperatures where the metallic base can melt while the second phase remains inert. This second phase may for example include inert ceramic particles. In general, this combination enables the use of a relatively low-temperature metallic alloy as a base material that can be easily melted, while providing a useful working range above the melting temperature where the composite exhibits behavior suitable for extrusion or other dispensing operations. As mentioned above, the composite may, within the working temperature range, form a non-Newtonian paste or Bingham fluid with a non-zero shear stress at zero shear strain. While the viscous fluid nature of the composite permits extrusion or other similar deposition techniques, this non-Newtonian characteristic can permit the deposited material to retain its shape against the force of gravity so that a printed object can retain a desired form until the composite material cools below a solidus or eutectic temperature of the metallic base. As a non-limiting example, the metallic base may be a low melting point metal and the second phase may be made up of inert ceramic particles, such that in the working temperature range, this composite forms a paste consisting of solid ceramic particles and molten metal.

In this context, it will be understood that the term inert is intended to mean that a material is not substantially chemically reactive within the relevant temperature range and over the timescales of a printing process, and still more generally that a material remains sufficiently unchanged in physical, chemical and mechanical properties so that the second phase can continue to contribute to the desired behavior (e.g., viscosity, yield stress) within the working temperature range. Thus, for example, inert particles in this context will not crystallize, liquefy, oxidize, react, or otherwise interact significantly with other materials in the metallic base, and will not change physical, mechanical, or chemical properties within the composite while within the working temperature range and within the timescales of the printing process. The particles may also or instead be inert as a result of a reacted surface of the particles, or some other surface, coating, condition or property thereof, even when the principal particle material is not inherently inert. A coating could, for example, be a ceramic or intermetallic material. Thus, it is more generally contemplated that within the working temperature range, the metallic base will liquefy, while the second phase will retain its physical characteristics so that the viscosity or yield stress of the composite can be maintained in a range suitable for use in additive manufacturing as contemplated herein.

Another instance of suitable MCMP build materials includes a metal loaded extrudable composite made up of a combination of a matrix material and metal particles. The matrix material may melt or undergo a glass-to-liquid-transition well below the melting temperature of the metal particles and thus provide a working temperature range in which the viscous fluid nature of the composite permits extrusion or other similar deposition techniques.

The matrix material may be composed of a multitude of components exhibiting different melting or glass-to-liquid-transition temperatures. As a result, the matrix material may not be fully liquid but rather consist of a mixture of liquid and solid phases in the working temperature range of the composite material. Although such metal loaded extrudable composites may not conventionally be referred to as metallic, and lack many typical bulk properties of a metal (such as good electrical conductivity), a net shape object fashioned from such a material may usefully be sintered into a metallic object, and such a build material—useful for fabricating metallic objects—is considered a "metallic build material" for the purposes of the following discussion. Such composite build materials may contain metallic content such as a sinterable metallic powder or other metal powder mixed with a thermoplastic, a wax, a compatibilizer, a plasticizer, or other material matrix to obtain a metallic build material that can be extruded at low temperatures where the matrix softens (e.g., around two-hundred degrees Celsius or other temperatures well below typical metal melting temperatures). For example, materials such as metal injection molding materials or other powdered metallurgy compositions contain significant metal content, but are workable for extrusion at lower temperatures. These materials, or other materials similarly composed of metal powder and a binder system, may be used to fabricate green parts that can be debound and sintered into fully densified metallic objects, and may be used as metallic build materials as contemplated herein. Other metal-loaded extrudable compositions are described by way of non-limiting example in PCT App. Ser. No. 17/665,26, filed on Dec. 14, 2017, claiming priority to U.S. Provisional application No. 62/434,014 filed on Dec. 14, 2016 and incorporated fully herein by reference, any of which may be suitably employed as a build material as contemplated herein.

Still more generally, describing the overall concept of MCMP materials, they may include any build material with metallic content that provides a useful working temperature range with rheological behavior suitable for heated extrusion and thus may be used as a metallic build material as contemplated herein. Examples have been given above. The limits of this window or range of working temperatures will depend on the type of material (e.g. metal alloy, metallic material with high temperature inert phase, metal-loaded extrudable composites) and the metallic and non-metallic constituents. For metal alloys, such as compositions in eutectic alloy systems, peritectic alloy systems and isomorphous alloy systems, the useful temperature range is typically between a solidus temperature and a liquidus temperature. In this context, the corresponding working temperature range is referred to for simplicity as a working temperature range between a lowest and highest melting temperature. For MCMP build materials with an inert high temperature second phase, the window may begin at any temperature above the melting temperature of the base metallic alloy, and may range up to any temperature where the second phase remains substantially inert within the mixture. For MCMP metal-loaded extrudable composites, the window may begin at any temperature above the glass transition temperature for amorphous matrix materials or above the melting temperature for crystalline matrix materials, and may range up to any temperature where the thermal decomposition of the matrix material remains sufficiently low.

According to the foregoing, the term MCMP build material, as used herein, is intended to refer to any metal-containing build material, which may include elemental or alloyed metallic components, as well as compositions containing other non-metallic components, which may be added for any of a variety of mechanical, rheological, aesthetic, or other purposes. For non-limiting example, non-metallic strengtheners may be added to a metallic material. As another example, a non-metallic material (e.g., plastic, glass, carbon fiber, and so forth) may be imbedded as a support material to reinforce structural integrity of a metallic build material. The presence of a non-metallic support material may be advantageous in many fabrication contexts, such as extended bridging where build material is positioned over large unsupported regions. Moreover, other non-metallic compositions such as sacrificial support materials may be usefully deposited using the systems and methods contemplated herein. Thus, for example, water soluble support structures having high melting temperatures, which are matched to the temperature range (i.e., between the glass transition temperature and melting temperature) of the metallic build material can be included within the printed product. All such materials and compositions used in fabricating a metallic object, either as constituents of the metallic object or as supplemental materials used to aid in the fabrication of the metallic object, are intended to fall within the scope of a MCMP build material as contemplated herein, suitable for use with the present teachings.

Much of the discussion has centered around alloy systems containing as few as two elements. The present teachings disclosed herein may apply to alloy systems with any number of elements. Examples of commercial alloys which are relevant include the following: Zinc die-casting alloys such as Zamak 2, Zamak 3, Zamak 5, Zamak 7, ZA-8, ZA-12, ZA-27. Magnesium die casting alloys such as AZ91. Aluminum casting alloys such as A356, A35>, A319, A360, A380. Aluminum wrought alloys such as 6061, 7075.

Now that suitable build materials for use with the present teachings have been described, it is useful to return to a more detailed discussion of apparatus and methods used to treat and build objects with such build materials. FIG. 1 is a block diagram of an additive manufacturing system. In general, the additive manufacturing system may include a three-dimensional printer 101 (or simply 'printer' 101) that deposits a metal, metal alloy, metal composite or the like using fused filament fabrication or any similar process. In general, the printer 101 may include a build material 102 that is propelled by a drive system 104 and heated to an extrudable state by a heating system 106, and then extruded through one or more nozzles 110. By concurrently controlling robotics

108 to position the nozzle(s) along an extrusion path relative to a build plate 114, an object 112 may be fabricated on the build plate 114 which may be situated within a build chamber 116. In general, a control system 118 may manage operation of the printer 101 to fabricate the object 112 according to a three-dimensional model using a fused filament fabrication process or the like.

The build material 102 may be provided in a variety of form factors including, without limitation, any of the form factors described herein or in materials incorporated by reference herein. The build material 102 may be provided, for example, from a hermetically sealed container or the like (e.g., to mitigate passivation), as a continuous feed (e.g., a wire), or as discrete objects such as rods or rectangular prisms that can be fed into a chamber or the like as each prior discrete unit of build material 102 is heated and extruded. In one aspect, two build materials 102 may be used concurrently, e.g., through two different nozzles, where one nozzle is used for general fabrication and another nozzle is used for bridging, supports, or similar features.

The build material 102 may include a metal wire, such as a wire with a diameter of approximately 80 μm, 90 μm, 100 μm, 0.5 mm, 1 mm, 1.25 mm, 1.5 mm, 1.75 mm, 2 mm, 2.25 mm, 2.5 mm, 3 mm, or any other suitable diameter.

The build material 102 may have any shape or size suitable for extrusion in a fused filament fabrication process. For example, the build material 102 may be in pellet form for heating and compression, or the build material 102 may be formed as a wire (e.g., on a spool), a billet, or the like for feeding into an extrusion process.

A printer 101 disclosed herein may include a first nozzle 110 for extruding a first material. The printer 101 may also include a second nozzle for extruding a second material, where the second material has a supplemental function (e.g., as a support material or structure) or provides a second build material with different mechanical, functional, or aesthetic properties useful for fabricating a multi-material object.

A drive system 104 may include any suitable gears, rollers, compression pistons, or the like for continuous or indexed feeding of the build material 102 into the heating system 106. In one aspect, the drive system 104 may include a gear such as a spur gear with teeth shaped to mesh with corresponding features in the build material such as ridges, notches, or other positive or negative detents. In another aspect, the drive system 104 may use heated gears or screw mechanisms to deform and engage with the build material. Thus, in one aspect a printer for a metal FFF process may heat a metal to a temperature within a working temperature range for extrusion, and heat a gear that engages with, deforms, and drives the metal in a feed path toward the nozzle 110.

In another aspect, the drive system 104 may use bellows or any other collapsible or telescoping press to drive rods, billets, or similar units of build material into the heating system 106. Similarly, a piezoelectric or linear stepper drive may be used to advance a unit of build media in an indexed fashion using discrete mechanical increments of advancement in a non-continuous sequence of steps.

The heating system 106 may employ a variety of techniques to heat a metallic build material to a temperature within a working temperature range suitable for extrusion. For fused filament fabrication systems as contemplated herein, this is more generally a range of temperatures where a build material exhibits rheological behavior suitable for fused filament fabrication or a similar extrusion-based process. These behaviors are generally appreciated for, e.g., thermoplastics such as ABS or PLA used in fused deposition modeling, however many metallic build materials have similarly suitable behavior, albeit many with greater forces and higher temperatures, for heating, deformation and flow through a nozzle so that they can be deposited onto an object with a force and at a temperature to fuse to an underlying layer. Among other things, this requires a plasticity at elevated temperatures that can be propelled through a nozzle for deposition (at time scales suitable for three-dimensional printing), and a rigidity at lower temperatures that can be used to transfer force downstream in a feed path to a nozzle bore or reservoir where the build material can be heated into a flowable state and forced out of a nozzle.

Any heating system 106 or combination of heating systems suitable for maintaining a corresponding working temperature range in the build material 102 where and as needed to drive the build material 102 to and through the nozzle 110 may be suitably employed as a heating system 106 as contemplated herein. In one aspect, electrical techniques such as inductive or resistive heating may be usefully applied to heat the build material 102. Thus, for example, the heating system 106 may be an inductive heating system or a resistive heating system configured to electrically heat a chamber around the build material 102 to a temperature within the working temperature range, or this may include a heating system such as an inductive heating system or a resistive heating system configured to directly heat the material itself through an application of electrical energy. Because metallic build materials are generally electrically conductive, they may be electrically heated through contact methods (e.g., resistive heating with applied current) or non-contact methods (e.g., induction heating using an external electromagnet to drive eddy currents within the material). When directly heating the build material 102, it may be useful to model the shape and size of the build material 102 in order to better control electrically-induced heating. This may include estimates or actual measurements of shape, size, mass, and so forth, as well as information about bulk electromagnetic properties of the build material 102. The heating system 106 may also include various supplemental systems for locally or globally augmenting heating using, e.g., chemical heating, combustion, laser heating or other optical heating, radiant heating, ultrasound heating, electronic beam heating, and so forth.

The robotics 108 may include any robotic components or systems suitable for moving the nozzles 110 in a three-dimensional path relative to the build plate 114 while extruding build material 102 to fabricate the object 112 from the build material 102 according to a computerized model of the object. A variety of robotics systems are known in the art and suitable for use as the robotics 108 contemplated herein. For example, the robotics 108 may include a Cartesian coordinate robot or x-y-z robotic system employing a number of linear controls to move independently in the x-axis, the y-axis, and the z-axis within the build chamber 116. Delta robots may also or instead be usefully employed, which can, if properly configured, provide significant advantages in terms of speed and stiffness, as well as offering the design convenience of fixed motors or drive elements. Other configurations such as double or triple delta robots can increase range of motion using multiple linkages. More generally, any robotics suitable for controlled positioning of a nozzle 110 relative to the build plate 114 may be usefully employed, including any mechanism or combination of mechanisms suitable for actuation, manipulation, locomotion, and the like within the build chamber 116.

The robotics 108 may position the nozzle 110 relative to the build plate 114 by controlling movement of one or more of the nozzle 110 and the build plate 114. For example, in an aspect, the nozzle 110 is operably coupled to the robotics 108 such that the robotics 108 position the nozzle 110 while the build plate 114 remains stationary. The build plate 114 may also or instead be operably coupled to the robotics 108 such that the robotics 108 position the build plate 114 while the nozzle remains stationary. Or some combination of these techniques may be employed, such as by moving the nozzle 110 up and down for z-axis control, and moving the build plate 114 within the x-y plane to provide x-axis and y-axis control. In some such implementations, the robotics 108 may translate the build plate 114 along one or more axes, and/or may rotate the build plate 114.

The object 112 may be any object suitable for fabrication using the techniques contemplated herein. This may include functional objects such as machine parts, aesthetic objects such as sculptures, or any other type of objects, as well as combinations of objects that can be fit within the physical constraints of the build chamber 116 and build plate 114. Some structures such as large bridges and overhangs cannot be fabricated directly using FFF because there is no underlying physical surface onto which a material can be deposited. In these instances, a support structure 113 may be fabricated, preferably of a soluble or otherwise readily removable material, in order to support a corresponding feature. Alternatively, support structure can be made of the same material as the build material, but presented in a skeletal geometry, which can be cut off later.

The build plate 114 may be formed of any surface or substance suitable for receiving deposited metal or other materials from the nozzles 110. The surface of the build plate 114 may be rigid and substantially planar. In one aspect, the build plate 114 may be heated, e.g., resistively or inductively, to control a temperature of the build chamber 116 or a surface upon which the object 112 is being fabricated. This may, for example, improve adhesion, prevent thermally induced deformation or failure, and facilitate relaxation of stresses within the fabricated object. In another aspect, the build plate 114 may be a deformable structure or surface that can bend or otherwise physically deform in order to detach from a rigid object 112 formed thereon. The build plate 114 may also include electrical contacts providing a circuit path for internal ohmic heating of the object 112 or heating an interface between the object 112 and build material 102 exiting the nozzle 110.

The build plate 114 may be movable within the build chamber 116, e.g., by a positioning assembly (e.g., the same robotics 108 that position the nozzle 110 or different robotics). For example, the build plate 114 may be movable along a z-axis (e.g., up and down—toward and away from the nozzle 110), or along an x-y plane (e.g., side to side, for instance in a pattern that forms the tool path or that works in conjunction with movement of the nozzle 110 to form the tool path for fabricating the object 112), or some combination of these. In an aspect, the build plate 114 is rotatable.

The build plate 114 may include a temperature control system for maintaining or adjusting a temperature of at least a portion of the build plate 114. The temperature control system may be wholly or partially embedded within the build plate 114. The temperature control system may include without limitation one or more of a heater, coolant, a fan, a blower, or the like. In implementations, temperature may be controlled by induction heating of the metallic printed part.

In general, an optional build chamber 116 houses the build plate 114 and the nozzle 110, and maintains a build environment suitable for fabricating the object 112 on the build plate 114 from the build material 102. Where appropriate for the build material 102, this may include a vacuum environment, an oxygen depleted environment, a heated environment, and inert gas environment, and so forth. A build chamber is an optional element. It is not required for all situations. Some materials may require a special build environment inside a build chamber, such as an inert gas atmosphere. Other materials such as zinc aluminum alloys or zinc die casting alloys may be printed in air and thus do not require a build chamber. The build chamber 116, if present, may be any chamber suitable for containing the build plate 114, an object 112, and any other components of the printer 101 used within the build chamber 116 to fabricate the object 112. There are many places within this disclosure that mention a build chamber, and it should be understood that it is optional, in general, and that it has been mentioned only because in many cases, it is used, and to mention it shows all of the elements that might be present in any one situation.

The printer 101 may include a vacuum pump 124 coupled to the build chamber 116 and operable to create a vacuum within the build chamber 116. The build chamber 116 may form an environmentally sealed chamber so that it can be evacuated with the vacuum pump 124 or any similar device in order to provide a vacuum environment for fabrication. This may be particularly useful where oxygen causes a passivation layer that might weaken layer-to-layer bonds in a fused filament fabrication process as contemplated herein. The build chamber 116 may be hermetically sealed, air-tight, or otherwise environmentally sealed. The environmentally sealed build chamber 116 can be purged of oxygen, or filled with one or more inert gases in a controlled manner to provide a stable build environment. Thus, for example, the build chamber 116 may be substantially filled with one or more inert gases such as argon or any other gases that do not interact significantly with heated metallic build materials 102 used by the printer 101. One or more passive or active oxygen getters 126 or other similar oxygen absorbing materials or systems may usefully be employed within the build chamber 116 to take up free oxygen. The build chamber 116 may include a temperature control system 128 for maintaining or adjusting a temperature of at least a portion of a volume of the build chamber 116 (e.g., the build volume). The temperature control system 128 may also or instead move air (e.g., circulate air) within the build chamber 116 to control temperature, to provide a more uniform temperature, or to transfer heat within the build chamber 116.

In general, a control system 118 may include a controller or the like configured to control operation of the printer 101. The control system 118 may be operable to control the components of the additive manufacturing system 100, such as the nozzle 110, the build plate 114, the robotics 108, the various temperature and pressure control systems, and any other components of the additive manufacturing system 100 described herein to fabricate the object 112 from the build material 102 based on a three-dimensional model 122 or any other computerized model describing the object 112. The control system 118 may include any combination of software and/or processing circuitry suitable for controlling the various components of the additive manufacturing system 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the control system 118 may include a microprocessor or other processing circuitry with sufficient computational power to provide related functions such as executing an operating system, providing a graphical user interface (e.g., to a display coupled to the control system 118 or printer 101), converting three-dimensional models 122 into tool instructions, and operating a web server or otherwise hosting remote users and/or activity through a network interface 162 for communication through a network 160.

In general, a three-dimensional model 122 or other computerized model of the object 112 may be stored in a database 120 such as a local memory of a computing device used as the control system 118, or a remote database accessible through a server or other remote resource, or in any other computer-readable medium accessible to the control system 118. The control system 118 may retrieve a particular three-dimensional model 122 in response to user input, and generate machine-ready instructions for execution by the printer 101 to fabricate the corresponding object 112. This may include the creation of intermediate models, such as where a CAD model is converted into an STL model, or other polygonal mesh or other intermediate representation, which can in turn be processed to generate machine instructions such as g-code for fabrication of the object 112 by the printer 101.

In operation, to prepare for the additive manufacturing of an object 112, a design for the object 112 may first be provided to a computing device 164. The design may be a three-dimensional model 122 included in a CAD file or the like. The computing device 164 may in general include any devices operated autonomously or by users to manage, monitor, communicate with, or otherwise interact with other components in the additive manufacturing system 100. This may include desktop computers, laptop computers, network computers, tablets, smart phones, smart watches, or any other computing device that can participate in the system as contemplated herein. In one aspect, the computing device 164 is integral with the printer 101.

The computing device 164 may include the control system 118 as described herein or a component of the control system 118. The computing device 164 may also or instead supplement or be provided in lieu of the control system 118. Thus, unless explicitly stated to the contrary or otherwise clear from the context, any of the functions of the computing device 164 may be performed by the control system 118 and vice-versa. In another aspect, the computing device 164 is in communication with or otherwise coupled to the control system 118, e.g., through a network 160, which may be a local area network that locally couples the computing device 164 to the control system 118 of the printer 101, or an internetwork such as the Internet that remotely couples the computing device 164 in a communicating relationship with the control system 118.

The computing device 164 (and the control system 118) may include a processor 166 and a memory 168 to perform the functions and processing tasks related to management of the additive manufacturing system 100 as described herein. In general, the memory 168 may contain computer code that can be executed by the processor 166 to perform the various steps described herein, and the memory may further store data such as sensor data and the like generated by other components of the additive manufacturing system 100.

One or more ultrasound transducers 130 or similar vibration components may be usefully deployed at a variety of locations within the printer 101. For example, a vibrating transducer may be used to media as it is distributed from a hopper of build material 102 into the drive system 104. The printer 101 may also include a camera 150 or other optical device. In one aspect, the camera 150 may be used to create the digital twin 140 or provide spatial data for the digital twin 140. The camera 150 may more generally facilitate machine vision functions or facilitate remote monitoring of a fabrication process. The additive manufacturing system 100 may include one or more sensors 170. The sensor 170 may communicate with the control system 118, e.g., through a wired or wireless connection (e.g., through a data network 160). The sensor 170 may be configured to detect progress of fabrication of the object 112, and to send a signal to the control system 118 where the signal includes data characterizing progress of fabrication of the object 112. The additive manufacturing system 100 may include, or be connected in a communicating relationship with, a network interface 162. The network interface 162 may include any combination of hardware and software suitable for coupling the control system 118 and other components of the additive manufacturing system 100 in a communicating relationship to a remote computer (e.g., the computing device 164) through a data network 160. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to a local area network or the like that is in turn coupled to a wide area data network such as the Internet. This may also or instead include hardware/software for a WiMAX connection or a cellular network connection (using, e.g., CDMA, GSM, LTE, or any other suitable protocol or combination of protocols). Consistently, the control system 118 may be configured to control participation by the additive manufacturing system 100 in any network 160 to which the network interface 162 is connected, such as by autonomously connecting to the network 160 to retrieve printable content, or responding to a remote request for status or availability of the printer 101.

FIG. 2 is a block diagram of a computer system, which may be used for any of the computing devices, control systems or other processing circuitry described herein. The computer system 200 may include a computing device 210, which may also be connected to an external device 204 through a network 202. The computing device 210 may include any of the controllers described herein (or vice-versa), or otherwise be in communication with any of the controllers or other devices described herein. The computing device 210 may include a processor 212, a memory 214, a network interface 216, a data store 218, and one or more input/output devices 220. The computing device 210 may further include or be in communication with peripherals 222. A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth. A bus 232 or combination of busses may serve as an electromechanical platform for interconnecting components of the computing device 200.

FIG. 3 shows an extruder 300 for a three-dimensional printer. In general, the extruder 300 may include a nozzle 302, a nozzle bore 304, a heating system 306, and a drive system 308 such as any of the systems described herein, or any other devices or combination of devices suitable for a printer that fabricates an object from a computerized model using a fused filament fabrication process and a metallic build material as contemplated herein. In general, the extruder 300 may receive a build material 310 from a source 312, such as any of the build materials and sources described herein, and advance the build material 310 along a feed path (indicated generally by an arrow 314) toward an opening 316 of the nozzle 302 for deposition on a build plate 318 or other suitable surface. The term build material is used herein interchangeably to refer to metallic build material, species and combinations of metallic build materials, or any other build materials (such as thermoplastics). As such, references to "build material 310" should be understood to include metallic build materials, or multi-phase metallic build materials or any of the other build material or combination of build materials described herein, including a thermoplastic, under specific conditions, unless a more specific meaning is provided or otherwise clear from the context.

The nozzle 302 may be any nozzle suitable for the temperatures and mechanical forces required for the build material 310. For extrusion of metallic build materials, portions of the nozzle 302 (and the nozzle bore 304) may be formed of high-temperature materials such as sapphire, alumina, aluminum nitride, graphite, boron nitride or quartz, which provide a substantial margin of safety for system components.

The nozzle bore 304 may be any chamber or the like suitable for heating the build material 310, and may include an inlet 305 to receive a build material 310 from the source 312. The nozzle 302 may also include an outlet 316 that provides an exit path for the build material 310 to exit the nozzle bore 304 along the feed path 314 where, for example, the build material 310 may be deposited on the build plate 318. The inside dimensions of the nozzle bore may be larger than the outside dimensions of the incoming build material, and thus could be said to have some amount of clearance or extra volume with respect the build material. It should also be noted that the nozzle bore may take a wide array of geometries and cross-sections and need not be uniform along its length. For example, it may include diverging sections, converging sections, straight sections, and non-cylindrical sections. Subsequent layers of lines are deposited upon an earlier layer 340. The layer presently being deposited as the top layer 390 has an exposed upper surface 372, upon which the nest to be deposited layer will be deposited.

The heating system 306 may employ any of the heating devices or techniques described herein. It will be understood that the heating system 306 may also or instead be configured to provide additional thermal control, such as by locally heating the build material 310 where it exits the nozzle 302 or fuses with a second layer 392 of previously deposited material, or by heating a build chamber or other build environment where the nozzle 302 is fabricating an object. An auxiliary heater (not shown) may be provided relatively close to the inlet 305, for times when it may be desired to heat add thermal power to the nozzle near to the inlet.

The drive system 308 may be any drive system operable to mechanically engage the build material 310 in solid form and advance the build material 310 from the source 312 into the nozzle bore 304 with sufficient force to extrude the build material 310, while at a temperature within the working temperature range, through the opening 316 in the nozzle 302. In general, the drive system 308 may engage the build material 310 while at a temperature below the working temperature range, e.g., in solid form, or at a temperature below a bottom of the working temperature range where the build material 310 is more pliable but still sufficiently rigid to support extrusion loads and translate a driving force from the drive system 308 through the build material 310 to extrude the heated build material in the nozzle bore 304. A sensor 328, such as a load cell or a torque sensor, may be coupled to the drive system 308, to sense the load on the drive system. This can be useful, for instance, to determine whether any blockages or other impediments to driving the build material may be occurring.

Unlike thermoplastics conventionally used in fused filament fabrication, metallic build materials are highly thermally conductive. As a result, high nozzle temperatures can contribute to elevated temperatures in the drive system 308. Thus, in one aspect, a lower limit of the working temperature range for the nozzle bore 304 and nozzle 302 may be any temperature within the temperature ranges described above that is also above a temperature of the build material 310 where it engages the drive system 308, thus providing a first temperature range for driving the build material 310 and a second temperature range greater than the first temperature range for extruding the build material 310. Or stated alternatively and consistent with the previously discussed working temperature ranges, the build material 310 may typically be maintained within the working temperature range while extruding and below the working temperature range while engaged with the drive system 308, however, in some embodiments the build material 310 may be maintained within the working temperature when engaged with the drive system 308 and when subsequently extruded from by the nozzle 302. All such temperature profiles consistent with extrusion of metallic build materials as contemplated herein may be suitably employed. While illustrated as a gear, it will be understood that the drive system 308 may include any of the drive chain components described herein, and the build material 310 may be in any suitable, corresponding form factor.

A camera 352, may be provided to observe the condition of the build material 310 adjacent and outside of the nozzle inlet 305.

The extruder 300 may also include a controller 360, for controlling various components of the extruder, such as a cameral 352, load sensor 328, sensor 350, and the ultrasound generator 130, among other things.

As noted above, a printer may include two or more nozzles and extruders for supplying multiple build and support materials or the like. Thus, the extruder 300 may be a second extruder for extruding a supplemental build material.

Figure 7:
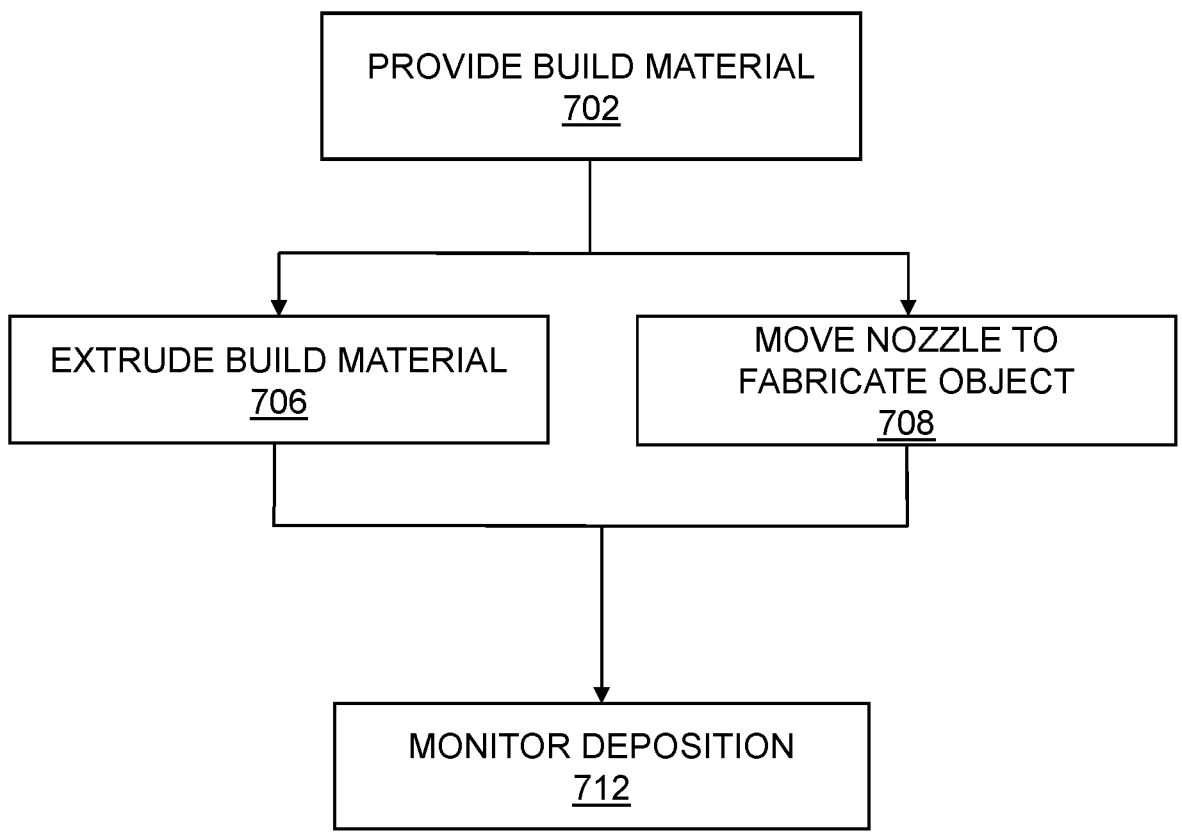
FIG. 7 shows a flow chart of a method for operating a printer in a three-dimensional fabrication of an object.

FIG. 7 shows schematically, in flow chart form, the steps of a method for operating a printer in a three-dimensional fabrication of an object.

As shown in step 702, the method 700 may begin with providing a build material such as any of the build materials described herein to an extruder.

Simultaneously, build material is extruded 706 and the nozzle outlet is moved 708, relative to the build plate, to deposit lines of extruded build material, to fabricate an object. In some circumstances, it is beneficial to monitor 712 feeding and/or deposition of the build material, for instance with a camera 150 (FIG. 1) or 352 (FIG. 3), or a force sensor 328 (FIG. 1), as discussed below. A camera, such as 352 could be provided near to the inlet 305 of the nozzle, where it could observe the geometrical condition of the build material as it is being driven into the nozzle. For instance, if the build material is in the form of a wire, and if the wire buckles, that may indicate that there is blockage or some other impediment to the flow of build material through the extruder 300. In such a case, remedial action could be taken. Alternatively, if the diameter of the build material immediately adjacent the inlet 305 to the nozzle increases, in a phenomenon that may be referred to a mushrooming, that might indicate that the softened build material is deforming, because there is an impediment to it proceeding into the nozzle bore 304. Again, remedial action could be taken, as discussed below. As will be discussed below, the descriptions of the steps of extruding build material 706 and moving the nozzle to fabricate an object, 708, are simplifications.

Figure 8:
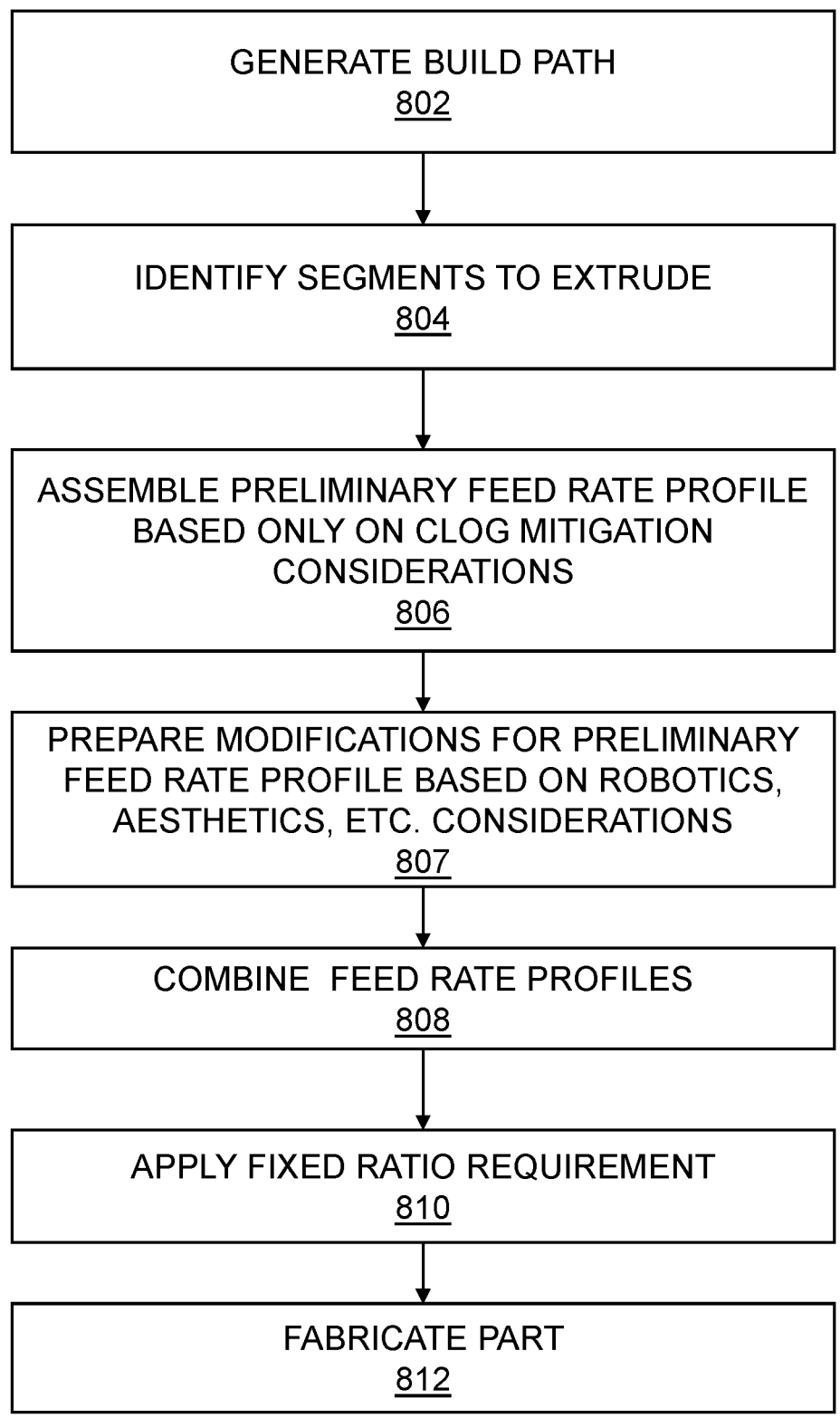
FIG. 8 shows schematically in flow chart form, steps of a method to fabricate a part using FFF in which a feed rate profile based only on clog mitigation considerations is combined with feed rate profiles based on robotics, aesthetics, and other considerations.

Many considerations go into how to extrude build material 706, including the feed rate at which build material is provided to the nozzle, and geometric and machine based considerations and limitations of the object being built. Similarly, any considerations go into how to move the nozzle 708, as the build material is being extruded. These are discussed below in detail in conjunction with FIGS. 7 and 8.

The foregoing has described generally 3D printing build materials that are MCMP, and also general aspects of 3D printing with typical hardware. Below will be described methods to mitigate and otherwise reduce difficulties caused by build material clogging or clumping or otherwise failing to flow freely within the nozzle. In some cases, varying the build material feed rate provides these advantages.

In this disclosure, heat is used to mean thermal energy, and is measured in the SI derived system in Joules. Thermal power refers to the movement or transfer of heat or thermal energy, per unit time, from one location to another. The SI derived unit of thermal power is a Joule per second, or Watt. The term extrudate refers to the build material that is exiting a nozzle, e.g., in a three-dimensional printing process. The verb to condition is used to mean the act of bringing a build material up to a temperature within its working range, where it has rheological behavior suitable for the printing process.

The present teachings may contain a method for additive fabrication using time-varying build material feed rates for use with the MCMP type build materials. In general, time-varying build material feed rates may be used to mitigate nozzle clogging and facilitate continuous extrusion of metallic build materials. In addition to mitigating the formation of nozzle clogs, time-varying build material feed rates may also be used to clear existing clogs or otherwise address emerging clogs in a nozzle or elsewhere within a flow path through an extruder.

MCMPs pose particular challenges when they are processed in a manner similar to FFF. There are many factors that make processing MCMPs challenging; several factors are presented below. MCMPs often have high thermal conductivities, specific heats and thermal diffusivities and thus may pose particular temperature control challenges. Additionally, for those materials operating in a multi-phase region of their alloying elements, the effective viscosity of the fluid is strongly a function of solid phase content and its morphology. The percent solid phase may be quite sensitive to temperature. Furthermore, many of these materials may exhibit complex rheological behaviors, such as thixotropy. Another concern is the reactivity of molten metals, which are prone to forming oxides in an oxygen containing environment. Some MCMPs contain elements that are self-passivating, and so a layer of oxide may exist on the build material itself before extrusion. These oxides are typically of very high melting point (well above the working temperature range for the MCMP) and may have much lower thermal conductivity. This oxide may then enter the nozzle, which may have negative repercussions if it is not expelled from the nozzle. For those materials that have a molten metal element, the viscosity of the liquid phase is typically very low (several orders of magnitude less than the viscosities of materials typically processed in FFF), yet the liquid phase must entrain the solid phase particles in order to achieve the requisite effective (combined) viscosity. These two phases should not segregate from one another, as this would lead to a buildup of solid particles in one spatial location and a concentration of the liquid phase in another spatial location. This has many implications for the flow of the MCMP material when in its multi-phase state. For instance, for a given material in a particular condition, it is understood that below a certain flow velocity, the liquid phase has the propensity to segregate from the solid. Additionally, many solid phase particles undergo agglomeration phenomena and Ostwald ripening, causing their size to increase with dwell time within the nozzle. Furthermore, these materials in their multi-phase state may be sensitive to strain rate and pressure gradients within the nozzle. In summary, MCMPs may clog or jam when extruded through a nozzle. Some of these clogging or jamming mechanisms are described in more detail later. The anti-clogging feed rate profiles described herein may make use of some of the properties of MCMPs or traits of the printer's hardware system in order to mitigate the clogging or jamming when processing these materials.

Suitable feed rates may vary widely according to build materials, nozzle geometry, heating ranges, and so forth. For example, as a non-limiting example, an extruder may have a nozzle with a cross section similar to a corresponding cross section of the build material passing therethrough (e.g., similarly shaped, and slightly smaller than or larger than the build material), such as the deposition nozzles described below, including straight bore, expanding bore and reducing bore nozzles as well as any other nozzle geometry. Where a reducing bore nozzle has an outlet cross section smaller than an inlet cross section, a straight bore nozzle has an outlet cross section approximately the same as an inlet cross section, and an expanding bore nozzle has an outlet cross section larger than an inlet cross section. If a build material is passed through such a nozzle at a sufficiently high rate, the nozzle may fail to properly condition the build material or otherwise heat the build material up to an appropriate working temperature range, and the build material may pass through the nozzle substantially as a solid, unsuitable for fusion to an underlying layer. On the other hand, if the build material is passed through the nozzle too slowly, the nozzle may clog, for instance due to accumulation of solid phase material at undesirable locations within the nozzle. It is important to note that similar feed rate considerations may also apply to extruders with straight bore, expanding bore and reducing bore nozzle as well as any other nozzle geometry with a cross section that differs significantly from a corresponding cross section of the build material passing therethrough.

Between these two rates there is an intermediate feed rate regime where the extruder can be optimally operated for a useful duration without clogging. While the nozzle will likely eventually clog even in this intermediate regime, the intermediate regime is characterized by a feed rate at which the extrusion can be maintained clog-free at steady state, for an extended duration. This may be a feed rate at which extrusion is optimized for a maximum duration of clog-free operation, or any feed rate within a surrounding range of feed rates where steady state extrusion can be maintained for a useful duration for additive fabrication. It will be appreciated that an actual duration of clog-free operation may vary under substantially fixed conditions. As such, the transition between the intermediate regime and the adjacent problematically high feed rate and problematically low feed rate regimes may be relative boundaries that depend on user preferences or design limits. However, the general phenomena of clogging at low feed rates and failing to condition at high feed rates provide useful guidelines on different operating regimes for a given extruder and build material. These are referred to herein as a high feed rate regime, a low feed rate regime, and an intermediate feed rate regime respectively. In the following, extrusion in the intermediate regime is also referred to as steady state extrusion. Furthermore, it will be understood that the feed rate regimes are not necessarily strict delineations, but rather characterizations. That is to say there may be a transition window between each of the identified regions, where the behavior is between that of its neighboring regimes. By alternating or varying the build material feed rate among these different regimes, continuous operation can be sustained for an extended period such as, for example, a period longer than that typically achievable by extrusion in the intermediate regime alone, even though for brief periods of time, a relatively high feed rate that could be problematic under continuous operation, or a relatively low feed rate that could be problematic under continuous operation, is used for relatively short periods of time. The realization that intentionally feeding build material at problematically high feed rates and also at problematically low feed rates can mitigate clogging and lead to better overall per unit fabrication rates is a novel, unexpected and inventive discovery.

While the terms high feed rate and low feed rate may be used to describe build material feed rates above and below the intermediate regime respectively, these terms may also be used in a relative sense to indicate changes in the feed rate. Thus, for example, during a high feed rate interval the build material may be driven through the nozzle at a rate that prevents the build material from reaching the desired condition, or at a rate within the intermediate regime that is nonetheless greater than a feed rate during a low feed rate interval. Similarly, a low feed rate interval may include an interval during which build material is fed into the nozzle at a rate below the optimal rates within the intermediate regime, or at a rate within the intermediate regime but below a greater rate used during a high feed rate interval.

In this context, it will be appreciated that a wide variety of rate profiles may be used as a predetermined rate profile contemplated herein. In one aspect, a wide variety of different feed rates may be employed. For example, a predetermined rate profile may include a high feed rate interval and a low feed rate interval. The build material feed rate during the high feed rate interval may exceed a feed rate suitable for steady state extrusion, and may include, for example, a feed rate above the rate at which the nozzle can transfer heat to condition the build material, at least in steady state operation. The feed rate may also or instead include a low feed rate interval below a feed rate suitable for steady state extrusion, e.g., a feed rate at which solid phase material will accumulate and clog around the margins of a melt zone within the nozzle, at least in steady state operation. A predetermined rate profile may also or instead include an intermediate feed rate interval, such as an interval during which the extruder is operated in the intermediate regime at an optimal rate for extended extrusion as described above.

In one aspect, the changes in build material feed rate may be characterized as relative changes. For example, in one aspect, the feed rate during the high feed rate interval may be at least 1.1, 1.5, two, ten or fifty times a maximum suitable feed rate for steady state extrusion. In another aspect, the feed rate during the high feed rate interval may be 1.1 times a minimum steady state feed rate suitable for extrusion, 1.5 times a minimum steady state feed rate suitable for extrusion, twice the minimum steady state feed rate suitable for extrusion, ten times the minimum steady state feed rate suitable for extrusion, one hundred times the minimum steady state feed rate suitable for extrusion or any other suitable differential rate. In another aspect, the build material feed rate during the high feed rate interval may be 1.05, 1.1, 1.5, two, ten or one hundred times a feed rate during the low feed rate interval. In another aspect, the average feed rate—e.g., the time averaged feed rate over a number of high feed rate and low feed rate intervals may be within the low feed rate regime or intermediate feed rate regime, while the feed rate during the high feed rate interval may be greater than a maximum suitable feed rate for steady state extrusion. More generally, any number and combination of different feed rates, which may vary discretely or continuously during extrusion, may be employed to provide variable feed rate extrusion suitable to mitigate clogging as contemplated herein.

In another aspect, different interval durations may be usefully employed. For example, the low feed rate interval may be at least twice a duration of the high feed rate interval, at least five times a duration of the high feed rate interval, at least nine times a duration of the high feed rate interval, at least one hundred times a duration of the high feed rate interval, or any other multiple of the high feed rate interval. The duration of the low feed rate and high feed rate intervals may also be chosen such that the average feed rate—e.g., the time averaged feed rate over a number of high feed rate and low feed rate intervals—is within the low feed rate regime or intermediate feed rate regime, and/or such that the average feed rate is below the rate at which the nozzle can transfer heat to liquefy the build material.

A reverse movement of build material may be used instead of or in addition to a low feed rate interval with a lower feed rate or zero feed rate. Thus, for example, as shown schematically in FIG. 9, the predetermined rate profile 900 may include a forward interval during which the build material is advanced forward through the nozzle at a positive feed rate and a reverse interval during which the build material is withdrawn backward through the nozzle at a negative feed rate. By interval, it is meant the portion of the build material feed that is conducted at one speed, or in one direction, or of one character. For instance, in FIG. 9, three and one half forward intervals are shown, and three reverse intervals are shown. A feed rate profile is a combination of different feed rate intervals. As stated, FIG. 9 shows a feed rate profile 900 that is made up of alternating forward feed and reverse feed intervals.

Figure 9:
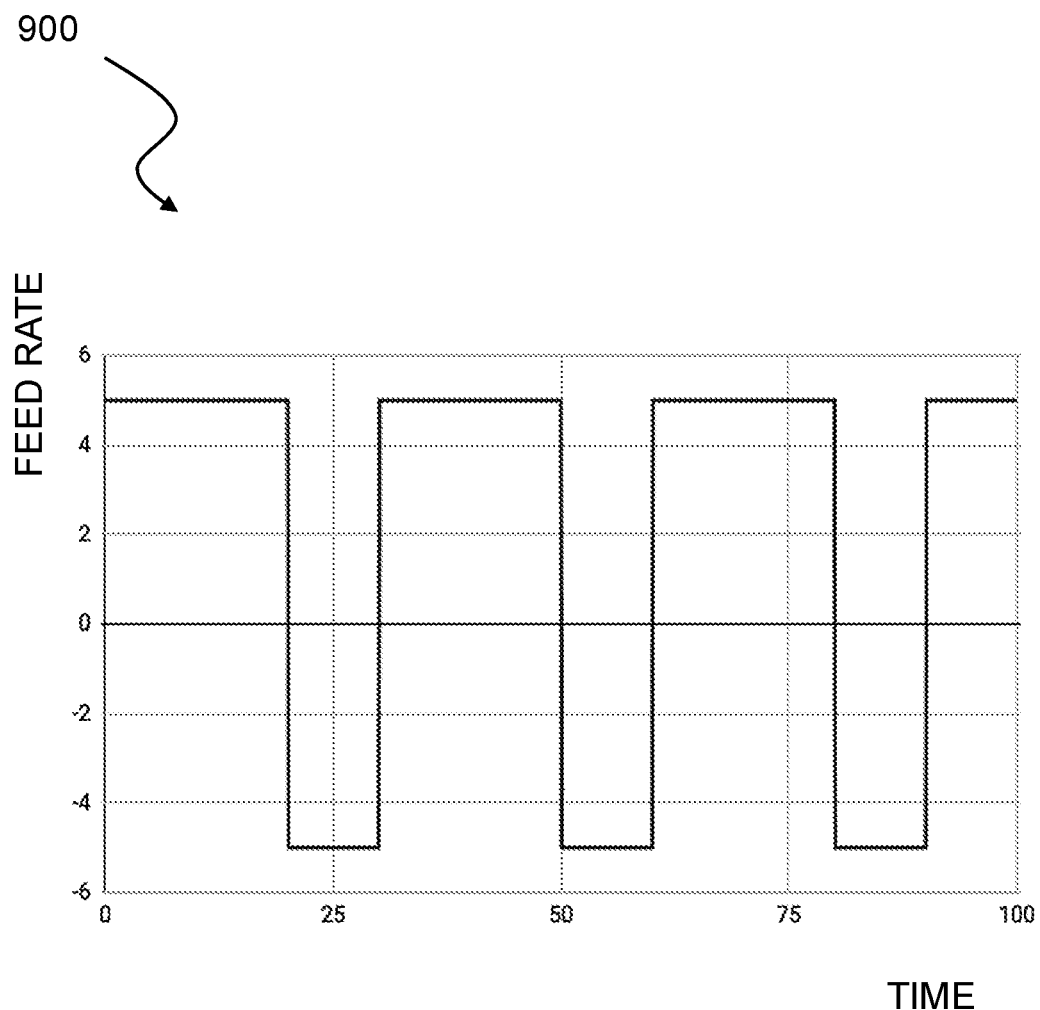
FIG. 9 shows a build material feed rate profile having forward feed and reverse feed intervals.

According to a first, basic embodiment of a method hereof, as shown in FIG. 9, the forward interval may have a duration that is longer than the reverse interval, e.g., that is at least one percent longer than the reverse interval, at least five percent longer than the reverse interval, at least ten percent longer than the reverse interval, at least fifty percent longer than the reverse interval, at least twice the reverse interval, at least 10 times the reverse interval, at least one hundred times the reverse interval or any other duration sufficiently greater than the reverse interval. Similarly, the reverse movement may be at a feed rate that is less or more than the forward movement. Either the feed rate or the duration of the reverse movement can be greater than the corresponding feature of the forward movement. (It will be understood that the extruder build material drive system 308 cannot accelerate instantaneously and therefore it is not possible to have a truly vertical line on a feed rate versus time graph. However, the acceleration may be appreciably large relative to the commanded change in feed rate that these depictions are a fair approximation. The same is true of decelerations. Thus, it will be understood that all of the feed rate profiles illustrated herein with figures are shown in an idealized rendition.)

Figure 16:
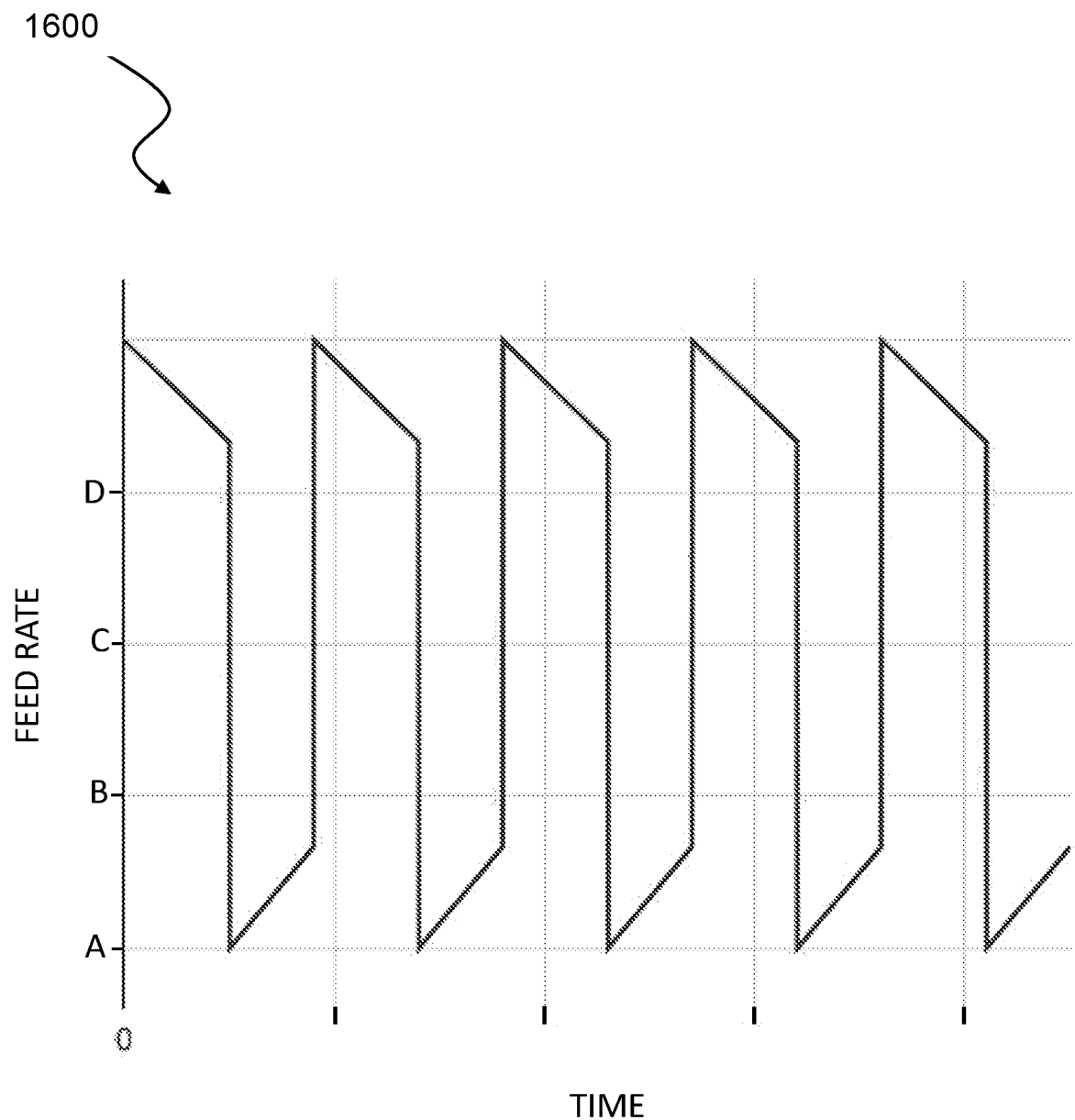
FIG. 16 shows a build material feed rate profile having higher feed rate intervals and lower feed rate intervals, in which the magnitude of the interval varies over the course of the interval, and never is at a constant magnitude for any period of time. The location of the zero magnitude, feed rate is not specified, and could be at any one of the locations identified as A, B, C, and D on the feed rate vertical axis, depending upon feed rate parameters of other aspects of the combined system, as discussed below.

Still more generally, the predetermined rate profile may be any profile that varies the feed in a periodic, aperiodic or other manner to vary the build material feed rate during a fabrication process. It will be appreciated from the preceding description that a wide variety of time-varying rate profiles may be employed to use multiple, different feed rates over time in a manner that mitigates an accumulation of solid phase material or other similar artifacts within a nozzle that may lead to nozzle clogging during use. In general, a rate profile such as any of the profiles contemplated above may be applied in any periodic manner, e.g., continuously, or with periodic intervening intervals of intermediate feed rate steady state operation. The feed rate need not be constant during any interval of either high rate feeding or low rate feeding. The feed rate need not be constant during any interval of either high rate feeding or low rate feeding, such as is shown schematically in FIG. 16, where the feed rate profile 1600 exhibits forward motion intervals where the feed rate declines over the course of an interval, and lower feed rate intervals where the feed rate increases during an interval. (It should be noted that in FIG. 16, a graphical technique has been used so that FIG. 16 can be used to illustrate several different situations. It will be noted that on the vertical feed rate scale, there are four tick-marks, identified as A, B, C, D, from lowest to highest. In FIG. 16, no location on the vertical feed rate scale that identifies a feed rate of zero has been specified. This is because it is desired to use FIG. 16 within this disclosure to show a situation where the zero feed rate could be located at any one of A, B, C of D, depending on other considerations related to combining the variable feed rate profiles with other feed rate profiles, as discussed in more detail below. Similarly the horizontal axis in FIG. 16 is time, and tick-marks are shown to indicate the division of the axis, but no magnitudes are shown regarding the tick-marks. This is because any relevant time-scale is possible, as discussed above. The intervals may extend for various periods of time, depending on the circumstances. Specific examples are provided herein of feed rate profiles with intervals of specific durations. They are for illustration purposes only, and are not meant to be limiting.)

In a state-of-the-art three-dimensional printer employing an extrusion-based printing technique such as fused filament fabrication, three dimensional objects are fabricated additively by depositing lines of material in layers to additively build up a physical object from a computer model. This is shown schematically in block diagram in FIG. 8. Typically, as shown in step 802, a slicing engine may be used to generate a build path (also known as printing instructions) from a computerized model of the object based on a suitable layer height and line width $l_W$. Usually, these build path (printing) instructions are then interpreted by a motion planner, which takes into account the physical limitations of the motion system (also referred to as the robotics 108, herein) and executes the build path (print) instructions on the printer. As a result, the extrusion nozzle outlet 316 moves along a build path relative to a build plate 318 of the printer and build material 310 is fed into the nozzle inlet 305 based on a feed rate profile to fabricate the object 340 line by line and layer by layer. During extrusion, the rate $V_N$ at which the nozzle outlet 316 moves along the build path and the rate $F_M$ at which build material 310 is fed into the nozzle inlet 305 are closely related. In steady state extrusion and assuming a constant layer height, substantially continuous and uniform lines of line width $l_W$ can be achieved by keeping the ratio between these two rates at a fixed value $C_U$. This proportionality relationship is referred to below as the fixed-ratio-of-rates requirement.

$$l_W \propto \frac{F_M}{V_N} = C_U$$

A build material feed rate profile associated with the build path, may exhibit a variety of feed rates. The considerations giving rise to these feed rate variations may be classified into different categories. As described above, all feed rates need to respect the physical limitations of the motion system or any other globally set acceleration and speed limits. This requirement limits how fast the feed rate may change or what the maximum feed rate can be within the build material feed rate profile.

Beyond such limitations, a salient category of feed rate considerations may be related to the geometry of the object. For instance, starting and stopping extrusion at the beginning and end of a line will require a change in feed rate. Moreover, a change in curvature of the build path may allow/require an increase/decrease in the rate at which the nozzle moves along the build path and thus a corresponding increase/decrease in the build material feed rate. In certain situations, such as at tight corners or in order to fill small spaces, the feed rate may also be deliberately reduced relative to the rate at which the nozzle moves along the build path (i.e. a reduction in $C_U$). The feed rate may also be adjusted during special print segments, such as bridging, i.e. the printing of unsupported line segments across small gaps in the part.

Another category of feed rate considerations relates to object aesthetics and build quality. For instance, it may be desirable that at the beginning and end of every line, the feed rate undergoes a certain sequence of feed rates to start a line at its full width and achieve a clean disconnect between nozzle and extrudate at the end of a line. Moreover, to achieve sufficiently high bonding between two adjoining lines, it can be beneficial to momentarily increase $C_U$ and provide extra material for bonding.

The feed rate variations described above in connection with the clog mitigation teachings presented herein represent another class of feed rate considerations, which are largely independent of the machine capabilities and process requirements described above and are instead designed to mitigate the formation of clogs and other flow interruptions anywhere along the bore 304 of the extrusion nozzle 302. here, other flow interruptions may include such effects as the build up of solid material in the nozzle bore 304 due to for instance insufficient conditioning of the build material. In order to fabricate an object from metal multi-phase material at low rates of nozzle clogging, all of the above build material feed rate considerations need to be taken into account. This means that the feed rate profiles optimized to realize the part geometry, the build quality and clog mitigation, all need to be combined into an overall feed rate profile for printing the object. One way to achieve this is described in the following.

The build path generated in step 802 for the fabrication of an object generally contains two types of segments: those requiring extrusion; and those not requiring extrusion, for example when the nozzle moves from one location on the part to another location on the part. As shown in step 804, having identified sections of build path where extrusion is required, the feed rate profile for these sections can be constructed. As a starting point, a preliminary feed rate profile can be assembled as shown in step 806, for which it is assumed that the required extrusion is achieved solely by a feed rate profile $F_{clog}$ optimized for the mitigation of clogs and other flow interruptions. Thus, the preliminary feed rate profile contains feed rate intervals whose duration and feed rate are ideal to reduce the formation of nozzle clogs and other flow interruptions, as discussed in other sections hereof. In a next step, the preliminary feed rate profile is then modified as shown in step 807 according to additional feed rate considerations. These considerations include the above referenced machine capabilities, such as the capabilities of the robotic 108 and motion and heating systems 306, as well as process requirements such as the above discussed geometry and build quality considerations. The modifications to the preliminary feed rate profile are then applied to or combined (see step 808) with the preliminary feed rate profile to result in a combined considerations feed rate profile, which can be used, in part, to fabricate a part. The resulting build material feed rate profile $F_M$ thus is a function $f$ of the feed rate profiles required to satisfy clog mitigation $F_{clog}$ considerations, process requirements $F_{process}$ and machine capabilities $F_{machine}$.

$$F_M = f(F_{clog}, F_{machine}, F_{process})$$

In order to satisfy the requirement of substantially uniform and continuous lines, as shown in step 810, the combined feed rate profile $F_M$ also needs to satisfy the fixed-ratio-of-rates requirement:

$$\frac{F_M}{V_N} = C_U$$

This requirement can be achieved by either further modifying the combined feed rate profile $F_M$ or by adjusting the rate $V_N$ at which the nozzle outlet moves along the segments of the build path that require extrusion. Having fully constructed the feed rate profile, as shown in step 812, the object can now be fabricated from metal multi-phase material at low rates of nozzle clogging.

It is understood that instead of being purely optimized for clog mitigation, the preliminary feed rate profile $F_{clog}$ assembled at step 806, may instead already be constructed by accounting for a combination of feed rate considerations such as clog mitigation and build rate maximization. Moreover, instead of using $F_{clog}$ as the starting point to construct the combined feed rate profile $F_M$, $F_{machine}$ or $F_{process}$ may also be used to construct a preliminary feed rate profile suitable to achieve the required extrusion.

In order to achieve build material extrusion, a requirement of $F_M$ is that the overall time averaged feed rate of $F_M$, including the forward and possible reverse movement intervals attributable to the clog mitigation feed rate profiles, and the other feed rate profile considerations to $F_M$, is positive, so that build material is, on average, advanced forward, over time, and material is extruded from the nozzle outlet. More generally, any combination of feed rates and durations may be employed for a reverse movement profile of a clog mitigation profile, provided that the time-averaged feed rate of the combined $F_M$, is positive, suitable for additive fabrication and consistent with non-clogging operation as contemplated herein.

There may be clog mitigation feed rate profiles for which the overall time averaged feed rate including the forward and reverse movement intervals is not, on average, advanced forward, over time, In other words, there may be clog mitigation feed rate profiles for which the overall time averaged feed rate including the forward and reverse movement intervals results in no extrusion during the duration of the clog mitigation rate profile. However, in that case, that would still be a valuable contribution to the overall part extrusion effort, if the clog mitigation effect of the particular profile were so profound as to be worth the penalty of not extruding any material during its duration. For instance, it may be that an alternating forward motion interval and reverse motion interval, in which the time averaged feed rates do not result in extrusion, has a powerful clog removal effect, and thus, would be included in a clog mitigation rate profile, from time to time.

Because there exist limitations on operation of the various drive components including the robotics and the extruder, and a maximum amount of thermal power that may be transferred from the nozzle to flowing build material averaged over time, the application of the foregoing time varying build material feed rate techniques are similarly restricted. That is to say, employing such techniques during a print may not afford an increase in the average build material deposition rate. Often, employing such techniques in a print results in a lower average build material deposition rate, as compared to a conventionally executed print. Conventionally executed prints often try to maximize the build material deposition rate by feeding build material as quickly as possible, subject in part to the aforementioned limitations. The anti-clogging feed rate profiles are not necessarily designed with build material throughput in mind, and so employing these profiles can result in longer deposition times over certain ranges of build material deposition measurement, due the lower deposition rate. However there is a marked benefit because there are longer intervals between clogging events and/or required nozzle servicing events. Furthermore, as the aforementioned nozzle servicing events themselves take time, it is possible to achieve lower total per unit print times, because the number of clogging events or nozzle servicing events may be reduced. Stated otherwise, there may be a net per part print time advantage by employing these variable build material feed rate techniques although the use of these techniques may penalize build material throughput (absent consideration of servicing events) in favor of improved clog mitigating behavior.

In another aspect, the rate profile may be applied at predetermined times during a fabrication process, e.g., after height changes resulting from a z-axis position step between fabrication layers, or after a stoppage of extrusion, e.g., during a non-extruding nozzle movement or other pause or stoppage in extrusion. In another aspect, the rate profile may be applied in response to sensed conditions such as increased force on the drive system (indicative of an impending clog), a change in material temperature, an extended pause or dwell during fabrication, a change in the dimension of the build material as it enters the nozzle inlet, or any other condition that can be monitored or sensed during an additive fabrication process.

In another aspect, the rate profile may be adapted to a particular fabrication process. For example, the predetermined rate profile may be adapted according to part geometry or print instructions, e.g., where the process requires finer resolution feature printing, or where the process includes a smaller or larger number of starts and stops to extrusion. Similarly, the predetermined rate profile may be adjusted to accommodate longer or shorter line segments produced by a slicing engine for the build path, or to restart the rate profile at the beginning of each straight line length. In another aspect, the rate profile may be adapted to, or paused during, certain operations such as tight corners or small curves, e.g., where localized continuous, non-varying extrusion rates might be a higher priority than extended, clog-free extrusion.

In an extrusion based fabrication process, such as for instance fused filament fabrication, it is often desirable to keep the temperature of the extrusion nozzle within a very narrow temperature range, such that the temperature and thus the rheological behavior of the extrudate is predictable and stable. When the build material feed rate into the nozzle changes rapidly, as may be the case when using the variable feed rate profiles discussed herein, the nozzle temperature may no longer stay within the desired narrow temperature window. Rapid changes in feed rate result in rapid changes to the thermal power extracted from the nozzle to condition the build material for extrusion and thus may lead to temperature changes of the nozzle, away from an ideal temperature for extrusion. Such detrimental temperature changes may be avoided by using a thermally robust nozzle, for instance with high thermal power flow, as described in U.S. patent application Ser. No. 16/035,296, filed on Jul. 13, 2018, entitled THERMALLY ROBUST NOZZLE FOR 3-DIMENSIONAL PRINTING AND METHODS OF USING SAME and also as Int'l Application No. PCT/US18/421119, filed on Jul. 13, 2018, with the same title, designating the United States, both of which are incorporated herein fully by reference. Such a thermally robust nozzle takes advantage of a large thermal power flow through the nozzle body, far in excess of that required to condition the build material for extrusion, so as to stabilize the nozzle temperature under varying extrusion conditions.

In fused filament fabrication it is often desirable to achieve a substantially continuous and substantially uniform deposition of the build material along the build path to maintain consistent dimensions (e.g., line height and line width) of the extruded lines across each layer of the object under fabrication. As is discussed above, this can be achieved by substantially maintaining a fixed ratio between the extrusion rate (i.e., flow rate of material out of the nozzle) and the rate at which the nozzle moves along the build path. As discussed above, using variable build material feed rates necessarily affects the potential extrusion rate, and thus, as is explained above, the variable feed rates must be taken into account when simultaneously determining appropriate extrusion rates and nozzle velocity/rate along the build path. This accommodation may include adjusting a speed at which the nozzle moves relative to the build plate during a build process. For example, this may include varying a rate of travel by the nozzle along the build path in a manner coordinated with the feed rate of the build material. For example, varying the rate of travel by the nozzle along the build path may include moving the nozzle at higher or lower speed along the build path to coordinate the nozzle motion with the higher or lower build material feed rate during respective high feed rate or low feed rate extrusion intervals. More specifically, as the feed rate increases the nozzle speed should increase proportionally, and vice versa. Further or instead, varying the rate of travel by the nozzle along the build path may include pausing movement of the nozzle along the build path to account for a lack of extrudate flow from the nozzle during a low feed rate interval (e.g., an interval during which the feed rate reaches zero) Pausing the movement of the nozzle along the build path may also be required during a reverse interval and a part of the following forward interval (e.g., a duration during which no extrusion occurs and the build material is withdrawn backward from its original position in the nozzle and then advanced forward to its original position). Synchronization of nozzle motion to the build material feed rate may vary according to a variety of factors such as, for example, build materials, nozzle geometries, heating ranges, printing geometry, and so forth.

It should be noted that an important factor may include the motion of the nozzle relative to the build plate. This can be achieved by moving the nozzle relative to a build plate that is stationary (relative to the shop floor), or, by moving the build plate relative to a nozzle that is stationary relative to the shop floor, or, by moving both the nozzle and the build plate relative to a stationary shop floor, and each other. Such relative motions are familiar to a person of ordinary skill in the art of fused filament additive fabrication.

In steady state, the feed rate of material into the nozzle inlet 305 governs the extrusion rate of material out of the nozzle outlet 316. They are related by build material cross-section, nozzle geometry, and material density changes as a function of temperature as it passes through the nozzle. However, the effective extrusion rate may not be directly governed by the build material feed rate during transients (such as when beginning to feed build material, stopping the feed of build material, or changing the rate at which build material is being fed, for example). This is caused by extruder dynamics and can cause local deviations in the shape of the deposited extrudate (especially the line width) despite obeying the Fixed-ratio-of-rates relation. A large contributor to the extruder dynamics may stem from the nozzle geometry. The nozzle bore 304 may have some clearance with respect to the build material 310, thereby offering some free volume which the build material may fill. Therefore it may be desirable to include a compensation between the nozzle motion pattern ($V_N$) and the build material feed pattern ($F_M$) to synchronize and effectively correct the shape of the deposited extrudate (especially in the case of substantially continuous and substantially uniform deposition of the build material along the build path). This compensation may temporally violate the Fixed-ratio-of-rates relation discussed above. Thus, for example, one or both of the nozzle motion pattern ($V_N$) or the build material feed pattern ($F_M$) pattern may include one or more of shifted, expanded, or reduced motion intervals, or any other suitable modification to achieve improved effective synchronization. This compensation between the nozzle motion pattern ($V_N$) and build material feed pattern ($F_M$) may be performed by the printer independently from the printing instructions created by a slicing engine based only on part geometry and the other non-clogging mitigating considerations discussed above.

Several methods exist to determine a suitable compensation between the nozzle motion pattern and the build material feed pattern to achieve a substantially continuous and substantially uniform deposition of the build material along the build path. One approach would be to parameterize the build material feed rate motion pattern ($F_M$) and experimentally determine the optimal nozzle motion pattern ($V_N$) for each element of a given build material feed rate profile. Another approach would be to develop a theoretical model for the extruder dynamics. Extruder dynamics refers to transient effects such as elastic deformation of the build material 310 or drive system 308, as well as many dynamic processes in the nozzle such as build material melting kinetics, variations of the amount of multiphase material inside the nozzle and variations in effective viscosity. For any given nozzle geometry, drive system configuration, build material and process conditions, a model for the extruder dynamics may be developed analytically (for example via electrical analogy and impedance, capacitance and inductance elements) or via simulation using for instance the finite element method. The resulting model of the extruder dynamics can then be used to determine a suitable compensation between nozzle motion pattern ($V_N$) and build material feed pattern ($F_M$).

In a different approach, a sensor, such as for instance a flow sensor situated in close proximity to the nozzle outlet, may be used to determine the flow rate of extrudate from the nozzle. With knowledge of this extrusion rate, the nozzle motion pattern may then be directly linked to the extrudate flow pattern, such that a substantially fixed ratio between the extrusion rate and the rate at which the nozzle moves along the build path is maintained and a substantially continuous and substantially uniform deposition of the build material along the build path is achieved.

In certain implementations, additional deliberate violations of the Fixed-ratio-of-rates relation, may be desired, or tolerated. The nozzle may be moved along the build path at approximately a rate corresponding to the time-averaged build material feed rate or somewhat below the average feed rate of the build material (e.g., below the average feed rate over a number of high feed rate and low feed rate intervals). It should be noted that while the ratio of build material feed rate to nozzle velocity may not be true instantaneously, it is true over a time average. As compared to continuously adjusting for the build material feed rate, movement of the nozzle at around a rate corresponding to the average feed rate or somewhat below the average feed rate of the build material may reduce the complexity of synchronizing nozzle motion and build material feed rate to achieve a substantially uniform deposition rate of the build material along the built path.

In another aspect, a printer employing the above techniques may include a nozzle 302 having a bore 304 with an entrance to receive a build material from a source, the build material having a working temperature range with a flowable state exhibiting rheological behavior suitable for fused filament fabrication; a heating system operable to heat the build material within the nozzle bore to a temperature within the working temperature range; a nozzle including an opening that provides an exit path for the build material from the nozzle bore; a drive system operable to mechanically engage the build material and to advance the build material from the source into the nozzle bore with sufficient force to extrude the build material, while at a temperature within the working temperature range, at a feed rate through the opening in the nozzle; and a controller configured to vary the feed rate of the build material into the nozzle during extrusion according to a predetermined rate profile with at least two different feed rates selected to mitigate clogging of the build material within the nozzle.

FIG. 9 shows a rate profile 900 for variable-feed rate extrusion. In particular, FIG. 9 illustrates a rate profile used to drive build material, for instance, a wire or rod or filament through a nozzle slightly wider than the build material, for an extended period without clogging. Although the feed rates are relative, it will generally be observed that this rate profile uses a forward/backward drive technique in which the build material is driven forward and backward at about the same rate, but the build material is driven for a duration of twice as long in the forward direction as in the reverse direction. The timescale shown in FIG. 9 may be any of various different timescales suitable for a given application. Thus, for example, the timescale in FIG. 9 may be milliseconds. It should be appreciated, however, that shorter or longer timescales may be used without departing from the scope of the present disclosure. Typically, the frequency of forward/backward or forward fast/slow or forward/stop ranges from 1 Hz to 50 Hz and even as high as 100 Hz (corresponding to interval durations of approximately 500 milliseconds and 10 milliseconds and possibly as brief as 5 milliseconds).

The forward rate of the build material may generally be any suitable rate, e.g., a rate within the high feed rate regime described above, or at or near a high end of an intermediate feed rate regime described above. The backward rate of the build material is illustrated as substantially equal to the forward rate, but any rate suitable for the printer hardware may also or instead be employed. In one aspect, the average feed rate—e.g., the average feed rate over a number of forward and backward cycles—may be within the low feed rate regime or the intermediate feed rate regime as described above, and the top forward feed rate may be within the high feed rate regime or a high end of the intermediate feed rate regime. To improve the uniformity of the deposition along the build path, particularly in the absence of any synchronization between build material feed profile and nozzle motion profile, it may be particularly desirable to make the difference between forward and backward feed distances either small or large. In the case of a small difference, the build material may be driven at a high forward feed rate and a high backward feed rate, such that the variations in feed rate occur at a timescale much faster than the timescale at which the nozzle moves along the build path, effectively smoothing out variations in the feed rate profile in the extruded line. In the case of a large difference between forward and backward feed distances, the build material may be driven at an intermediate forward and a high backward feed rate such that the occurrence of interruptions of the extrudate flow due to the reverse feed interval is reduced. In both cases the feed rates are chosen such that the average feed rate of the build material is within the intermediate or low feed rate extrusion regime.

By way of non-limiting examples, this technique has been demonstrated with forward feed rates between about 5-500 mm/s, backward feed rates of equal magnitude, forward feed distances of between 1-20 mm and backward feed distances of between 0.5-19 mm, and a difference between forward and backward feed distances of between 0.5-19.5 mm. It is important to note that the distances just mentioned, and in other places where a distance is mentioned in connection with a build material feed rate, the distanced meant is the distance that the solid build material travels. A forward feed distance refers to a distance by which the solid build material is advanced toward and into the nozzle body. A backward feed distance refers to a distance by which the solid build material is moved out of and away from the nozzle body. It will be understood that when extrudate is emerging from the nozzle, the incremental forward feed distance and the incremental length along the build path are not the same as the distance that the build material has advanced, but they are advantageously linked as previously described, so as to create a uniform width path.

Figure 10:
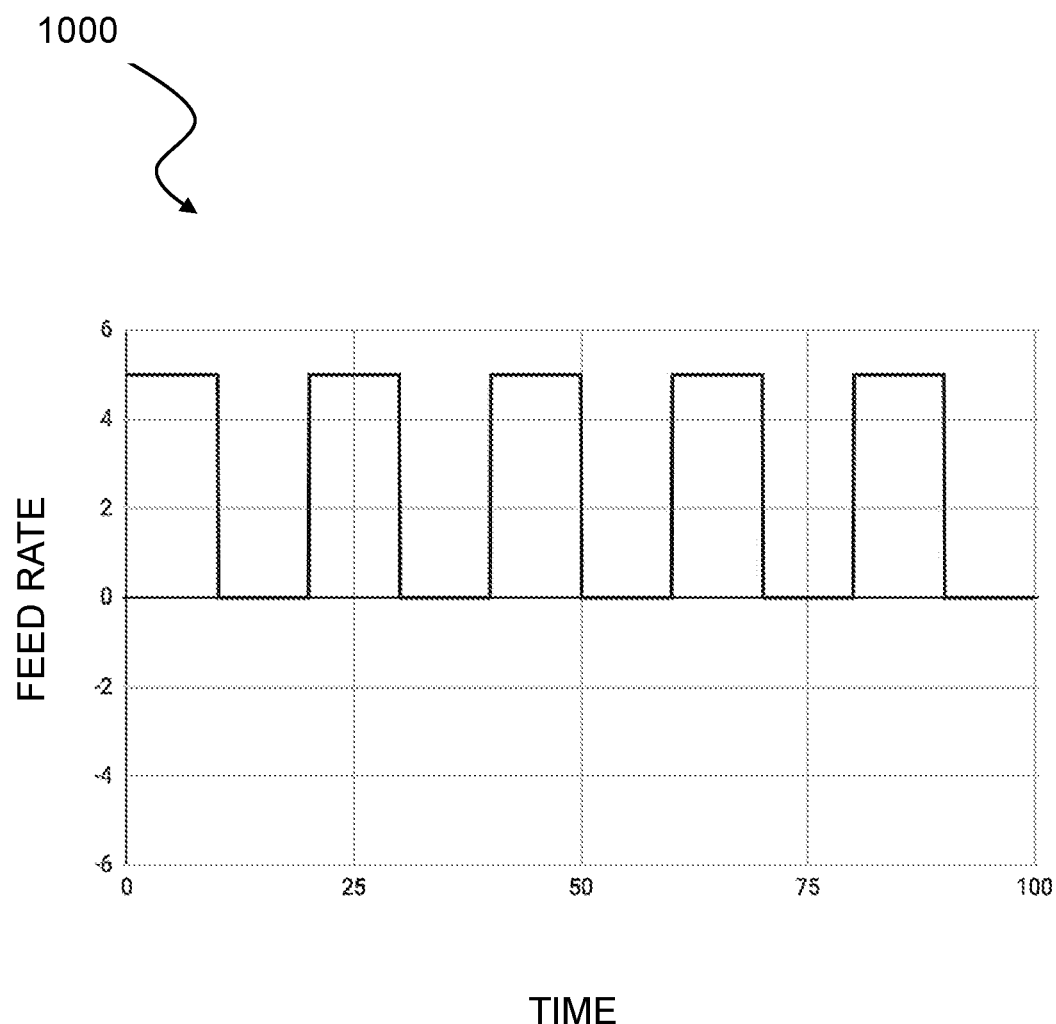
FIG. 10 shows a build material feed rate profile having forward feed and zero speed feed intervals.

FIG. 10 shows a rate profile 1000 for variable-feed rate extrusion. In particular, FIG. 10 illustrates a rate profile used to drive a build material such as a filament through a nozzle slightly wider than a width of the filament for an extended period without clogging. It will generally be observed that this rate profile uses a forward/stop drive technique in which the build material is driven periodically between forward motion and no motion. The timescale shown in FIG. 10 may be any of various different timescales suitable for a given application. Thus, for example, the timescale in FIG. 10 may be milliseconds. It should be appreciated, however, that shorter or longer timescales may be used without departing from the scope of the present disclosure.

In general, the forward feed rate may be any feed rate within the high feed rate regime or a high end of the intermediate feed rate regime described above. The stop duration may be of any length commensurate with a suitable average feed rate, where the average feed rate is preferably maintained within the intermediate feed rate or low feed rate regime. By way of non-limiting examples, this technique has been demonstrated with forward feed rates between about 5-500 mm/s, stop durations of about 20 ms to about 2 s, and forward feed distances of about 1-20 mm.

Figure 11:
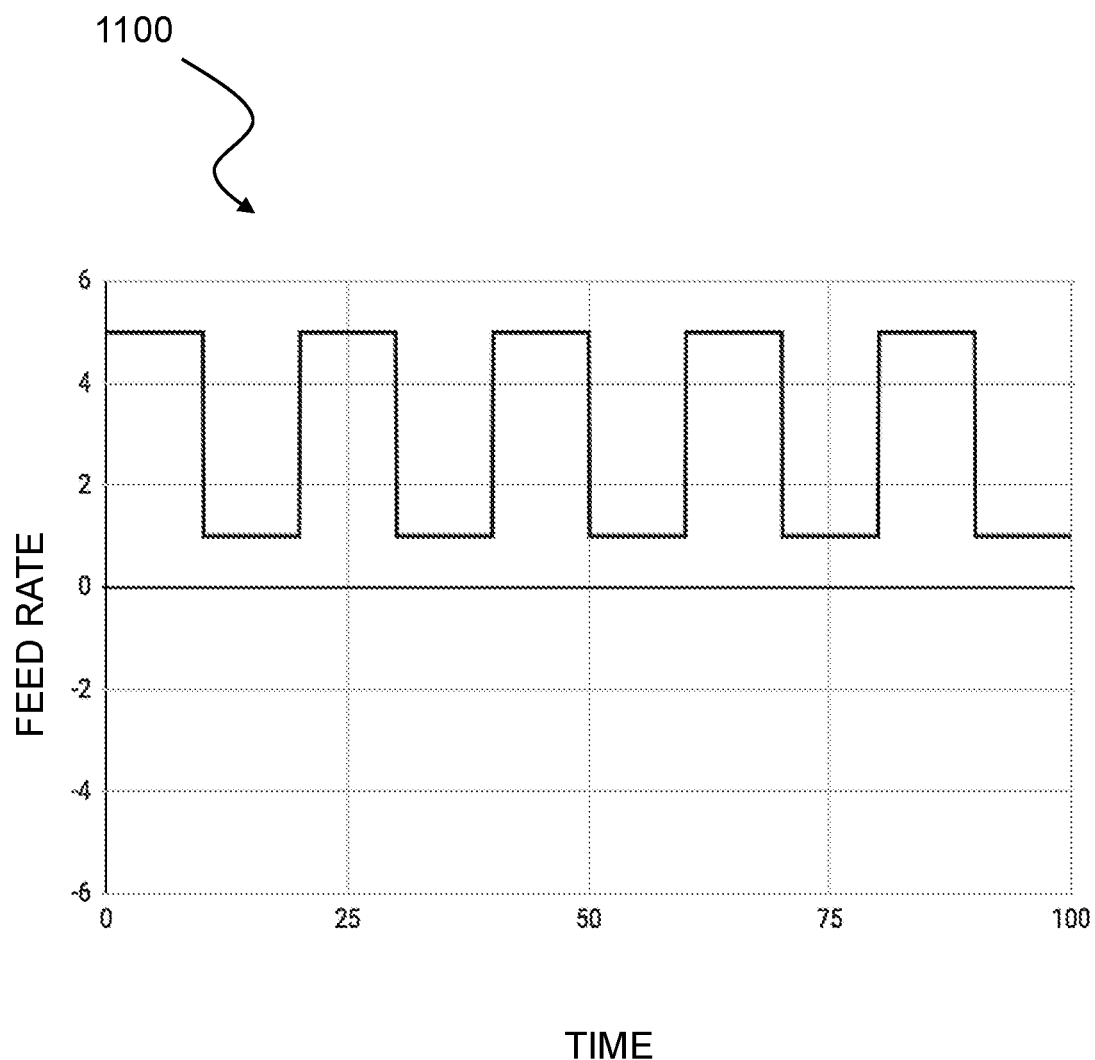
FIG. 11 shows a build material feed rate profile having only forward feed and intervals, some of which are at a relatively high feed rate, and some of which are at a relatively low (but positive) feed rate. No reverse motion is indicated.
Figure 12:
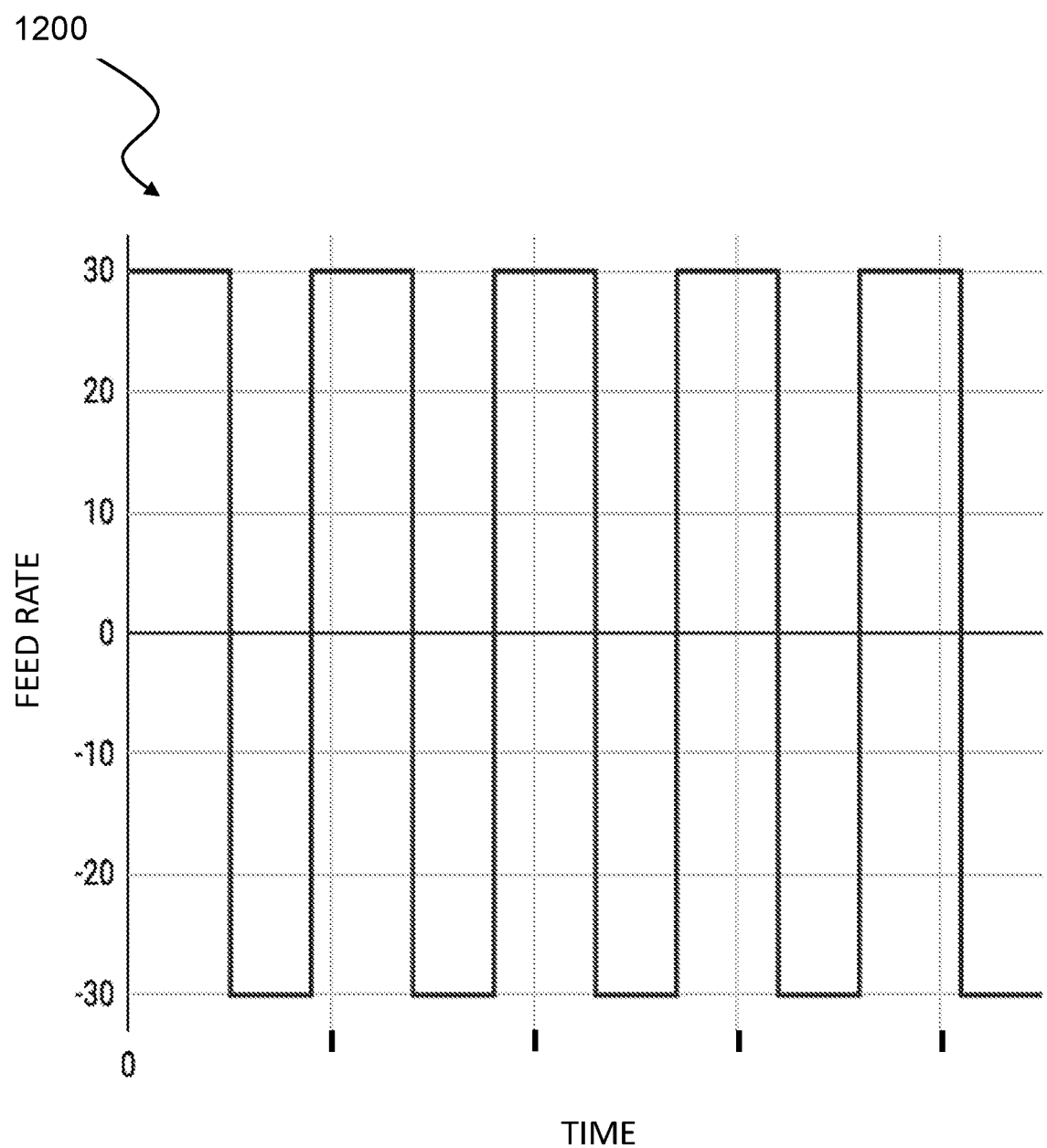
FIG. 12 shows a build material feed rate profile having forward feed and reverse feed intervals.

FIG. 11 shows a rate profile 1100 for variable-feed rate extrusion. In particular, FIG. 11 illustrates a rate profile used to drive a build material, such as a filament through a nozzle slightly wider than a width of the filament for an extended period without clogging. It will generally be observed that this rate profile 1100 uses a high feed rate/low feed rate drive technique in which the filament is driven periodically between high feed rate forward motion and low feed rate forward motion. The timescale shown in FIG. 11 may be any of various different timescales suitable for a given application. Thus, for example, the timescale in FIG. 11 may be milliseconds. It should be appreciated, however, that shorter or longer timescales may be used without departing from the scope of the present disclosure.

In general, the high feed rate, e.g., during a high feed rate forward motion interval, may be any feed rate within the high feed rate regime described above, and the low feed rate, e.g., during a low feed rate forward motion interval, may be any feed rate within the low or intermediate feed rate regime. The average feed rate may be within the intermediate feed rate regime or the low feed rate regime. The low feed rate distance and the high feed rate distance may in general be any distance(s) below a distance at which the build material is expected to clog. To improve the uniformity of the deposition along the build path, it may be particularly desirable to maximize the low feed rate distance and minimize the high feed rate distance.

By way of non-limiting examples, this technique has been demonstrated with high forward feed rates between about 10-500 mm/s, low forward feed rates of about 5-80 mm/s, low forward feed rate distances of about 5-100 mm, and high feed rate distances of about 1-20 mm.

The above discussion applies to straight bore, expanding bore and reducing bore nozzles as well as any other nozzle geometry. A nozzle may have a combination of straight, expanding and reducing geometries along its axial length, for example. Where a reducing bore nozzle has an outlet cross section smaller than an inlet cross section, a straight bore nozzle has an outlet cross section approximately the same as an inlet cross section, and an expanding bore nozzle has an outlet cross section larger than an inlet cross section. One aspect of reducing bore nozzles is that due to the improved thermal contact between the nozzle and build material, the high feed rate regime is typically shifted to higher feed rates compared to a corresponding straight bore or expanding bore nozzle.

The mechanisms and reasons for clog formation are complicated and are not fully understood. However, based on extensive experience with MCMP build materials in a variety of circumstances, it is believed that the following may be a reasonable explanation of relevant phenomena, although this explanation is provided for information purposes only, and is not intended to limit the generality of any of the claims hereto. In many cases, accumulation of solid phase material at undesirable locations within the nozzle can contribute to clog formation and eventually result in clogs. Accumulation of high melting point, relatively large particles of foreign species inside the nozzle may contribute to clog formation. Such species can be oxide particles originating from a residual oxide layer on the incoming build material or formed inside the nozzle during the extrusion process in an oxygen rich environment. The presence of other high melting point impurities in the build material may also contribute to the buildup of such particles. The accumulated solid phase material may also originate from the solid phase of the multi-phase metal build material itself. For instance, a liquid phase of the multi-phase metal build material may be extruded preferentially over a solid phase and the solid phase may then build up in the nozzle. Moreover, agglomeration of solid phase material during the extrusion process may result in larger and larger solid particle over time which may then clog the nozzle outlet. Some of the multi-phase build materials also undergo Ostwald ripening, which results in an increase in the average solid particle size over time. Larger particles are more likely to build up in the nozzle and form clogs. Another clog mechanism is solidification of liquid phase material in areas of the nozzle which are at a temperature below the working temperature range of the build material. Another mechanism that can result in accumulation of solid phase material can occur during extended extrusion at high feed rates. In this case the nozzle may not be able to supply enough thermal power to heat up the feedstock material to its desired extrusion temperature. Since the fraction of solid phase in many multi-phase metal build materials depends strongly on temperature, such an unintentional reduction in extrusion temperature can significantly increase the solid fraction in the multi-phase material and thus lead to increased buildup of solid phase in the nozzle.

The mechanisms and reasons that variable feed rates induce clog mitigation are also necessarily complicated and are not fully understood, in part, because understanding thereof requires understanding with certainty why the clogs form, which, as discussed above, is somewhat imperfect. However, based on extensive experience with MCMP build materials in a variety of circumstances, it is believed that the following may be a reasonable explanation of relevant phenomena, although this explanation is provided for information purposes only, and is not intended to limit the generality of any of the claims hereto. Variable build material feed rate operation can help mitigate many of the above-mentioned clogging mechanisms. For instance, short duration, high feed rate intervals may produce a plunger like effect that can clear out previously accumulated solid phase material from the nozzle. Rapid feed rate changes may also provide additional agitation, variation in fluid pressure and shear rate in the nozzle that may help dislodge and remove built up solid material from the nozzle. Moreover, during a low feed rate interval, the amount of thermal power extracted from the nozzle decreases, which enables the build material to heat up and reach its desired extrusion temperature and the associated desired solid fraction in the multi-phase state. A similar effect can be achieved with a reverse feed rate interval where build material is retracted away from the nozzle outlet, and no extrusion occurs for the duration of the reverse interval. Retraction of the build material may cause a partial or full discontinuity within the filament of build material within the nozzle, (where one partially-conditioned portion remains in contact with the nozzle near the outlet) or the build material to lose thermal contact with the nozzle outlet. This reduces heat losses through the thermally conductive build material and thus allows the multi-phase material remaining in the nozzle to grow warmer and reach the desired extrusion temperature. Moreover, the retracted build material has time to cool down, which improved its mechanical properties such as yield strength and then allows the build material to act as a better plunger when it is advanced again into the nozzle in a forward feed rate interval following the reverse interval.

In their working temperature range, multi-phase metal alloys such as a composition in an alloy system with a eutectic/peritectic/isomorphous, or other systems, exhibit at least one solid phase and one liquid phase. Possibly due to Ostwald ripening, the average size of the solid phase particles can typically increase over time. This ripening behavior can make these build materials particularly susceptible to nozzle clogs through a buildup of solid phase material in the extrusion nozzle. Reducing the dwell time of these materials in their multi-phase state inside the nozzle may thus be highly desirable. This can be achieved, for instance by using a variable feed rate profile with a forward feed rate interval and a reverse feed rate interval where the forward feed rate is very high (i.e. within the high feed rate regime), such that when the material is in its multi-phase state it is extruded at a very high rate and the dwell time inside the nozzle is minimized.

It is also believed that a high forward build material feed rate can also act to entrain solid particles, which might be accumulating in the nozzle, and force them forward and out.

As an example of an actual variable feed rate profile used for fused filament fabrication, consider the following. A 1.75 mm diameter metal alloy wire was used as build material with composition from an alloy system with a eutectic. The rate profile includes a forward feed rate interval during which the build material wire is advanced 7.5 mm forward through the nozzle at a feed rate of 30 mm/s and a reverse feed rate interval during which the build material wire is withdrawn 6 mm backward through the nozzle at a reverse feed rate of −30 mm/s. (This amounts to a feed forward duration of 0.25 s, and a feed backward duration of 0.2 s.) As described above, this rate profile is particularly beneficial for metal alloys which undergo Ostwald ripening in their multi-phase state, such as compositions from alloy systems with eutectics.

Another example of an actual feed rate profile for a similar build material, also exhibits forward and reverse feed rate intervals, but at significantly higher feed rate magnitudes. During the forward feed rate interval, the build material wire is advanced 2 mm forward at a feed rate of 250 mm/s and during the reverse feed rate interval the wire is reversed by 1.5 mm at a rate of −250 mm/s. During this feed rate profile the nozzle typically moves at a time-averaged rate of 36 mm/s along the build path and 0.5 mm of line length are usually extruded during a full forward/reverse cycle.

Yet another actual feed rate profile used with a similar build material, exhibits high forward feed rate intervals and low forward feed rate intervals, similar to the feed rate profile shown in FIG. 11, but with significantly different durations of intervals. During the high forward feed rate intervals the build material advances at a rate of 30 mm/s for 0.3 s, while during the low forward feed rate intervals the build material advances at a rate of 15 mm/s for 2 s. Associated with this feed rate profile, the extrusion nozzle moves along the build path at a time-averaged rate of 17 mm/s and usually 40 mm of line length are extruded during a full high/low feed rate cycle.

Yet another actual feed rate profile used with a similar build material, exhibits high forward feed rate intervals and zero feed rate intervals, similar to the feed rate profile shown in FIG. 10, but with significantly different durations of intervals during the high forward feed rate intervals, the build material advances at a rate of 26 mm/s for 0.7 s, while during the zero feed rate intervals the build material feed 16 stops for 0.3 s. Associated with this feed rate profile, the extrusion nozzle moves along the build path at a time-averaged rate of 18 mm/s and usually 18 mm of line length are extruded during a full forward/stop cycle.

Variable feed build material feed rate profiles may also be invoked as a part is being built in response to a sensed condition of the printer, such as a condition that indicates a clog is forming, such as increased force required to drive the build material into the nozzle, or deformation or unusual physical configuration of the build material adjacent the nozzle.

Considering first an increased force required to feed build material into the nozzle, for instance, as described above in connection with FIG. 7, a sensor can be used to monitor 712 deposition, such as force on the drive system measured by load cell 328 (FIG. 3). Such suitable sensors might include such a load cell applied to a support for the driving mechanism, which flexes backward when the driving mechanism experiences a reaction force against it as it tries to drive the build material into the nozzle. Alternatively, a torque sensor can be included within the drive mechanism to sense the torque on the driving apparatus, such as wheels or gears. Or, the current drawn by the drive motors can be monitored, with an increase in current indicating an increase in power needed to drive the build material into the nozzle inlet. Such a sensor detection can constitute an error condition and the system can monitor deposition 712 for such an error, and then initiate remedial action, which action could be the selection of a specific rate profile as discussed herein, designed to address a clog that has already formed, or that is impeding flow to some extent, albeit perhaps not fully.

Another form of sensor could be a camera 352 (FIG. 3 or other optical sensor adjacent the inlet 305 of the nozzle bore 304. It has been observed that if a clog is beginning to form, or has formed, certain types of build material may deform at the nozzle inlet. For instance, the build material may mushroom outward, increasing in diameter, because the bulk of the material is not flowing into the bore 304 of the nozzle, but the drive system 308 is still pushing the somewhat softened build material in the inward direction. Thus, it may mushroom, or squash out, so that the diameter of build material adjacent and outside the inlet to the nozzle. Alternatively, the build material may bend, or buckle, which can be optically detected. This too would constitute monitoring deposition 712 for existence of an error condition, for which remedial action could be taken by selecting a specific rate profile designed to mitigate against the incipient clog condition.

Another aspect of the current teachings is that the frequency of the build material feed rate changes is inevitably higher than those seen in a conventionally printed part, that is, in absence of any of the variable rate extrusion techniques. The actual, (as-executed on the physical hardware)

build material feed rate can be represented as a graph of velocity versus time, thereby constituting a time domain representation. The build material feed rate can also be analyzed in the frequency domain, for example using signal processing techniques such as Fast Fourier Transform (FFT). In the frequency domain, the FFT of the as-executed build material feed rate for a part printed while employing the variable build material feed rate techniques presented herein, as compared to the FFT for the same part printed conventionally, may show different frequency components. Specifically, the variable feed rate part may have lower amplitude at lower frequencies and may have peaks present with higher amplitudes at higher frequencies. As an example, consider an arbitrary printed path with a start and an end. For this example, we will ignore any complications such as extruder dynamics or path starting or ending routines. We will also assume that the printer, as configured and operated, is constrained by the capabilities of the robotics and not by any thermal limitations of the nozzle. Conventionally, the build material is fed at a rate starting from zero and reaching the target rate in a manner within the limitations of the robotics. The motion planner may deviate from this target rate momentarily to execute features such as sharp corners in the path, where the robotics necessitate slowing down. Otherwise, the target build material feed rate is maintained throughout the path, until the robotics decelerate to a stop at the end of the path. Consider now this same arbitrary path printed with a variable build material feed rate profile as taught herein. The feed rate is still subject to the same acceleration and deceleration phases, but also contains higher frequency feed rate changes throughout the length of the path. That is to say, where a conventionally executed path may have a spatial section with a substantially constant feed rate, the same path executed with a variable feed rate profile will have a feed rate with significant variation in time at the same spatial section. To be clear, the relatively high frequency components of the FFT of a feed rate profile using the variable feed rates of teachings hereof are due to the relatively short durations, or bursts of a high feed rate interval with a lower feed rate interval, for several cycles of alternation therebetween, alternating of a frequency of, for example between 1 Hz and 50 Hz and possibly as high as 100 Hz (corresponding to timescales of approximately 500 milliseconds and 10 milliseconds and possibly as brief as 5 milliseconds). It will be understood that a conventionally printed part in the absence of variable rate extrusion techniques may have some higher frequency components due, for example for the need to fill interior space in a part with short motions of the nozzle and these will appear for a block of time and then disappear for a block of time as the feed rate profile moves to exterior geometry in a layer. For such a conventional extrusion it is therefore a signature of the FFT of a built material feed rate that, if applied in blocks of time, there will blocks with high frequency content and blocks with relatively much lower high frequency content. For a conventional extrusion, typically half the blocks of time will be spent creating the exterior geometry and half the time will be spent creating the interior geometry, although this proportion may vary from part to part. A feed rate profile constructed to use the variable feed rate of the present teachings will have a signature where a significant majority of all blocks of time will have substantial high frequency content. Further, in a conventional extrusion, the blocks of time that are used to built the exterior of the geometry will not have much high frequency content. It is therefore an alternate signature for a feed rate profile constructed to use the variable feed rates of the present teachings, that FFT of the time blocks allocated to building the exterior of the part will have significant high frequency content. In this case, the power spectrum, also known as energy spectral density or power spectral density, will show that a significant portion of the total energy is at and above frequencies corresponding to the fundamental frequency of the variable feed rate of the present teachings. Here, the energy or power may be taken to be proportional to the square of the feed rate. In some embodiments, one quarter or more of the spectral power may be at or above the fundamental frequency of the variable feed rate of the present teachings. In some embodiments, one half or more of the spectral power may be at or above the fundamental frequency of the variable feed rate of the present teachings, this fundamental frequency typically lying between 1 Hz and 50 Hz and perhaps as high as 100 Hz A multitude of periodic and aperiodic feed rate profiles are possible, limited only by practicality of implementation and efficacy in clog mitigation. The following figures illustrate several non-limiting principles of feed rate variation within and between feed rate profiles.

Figure 13:
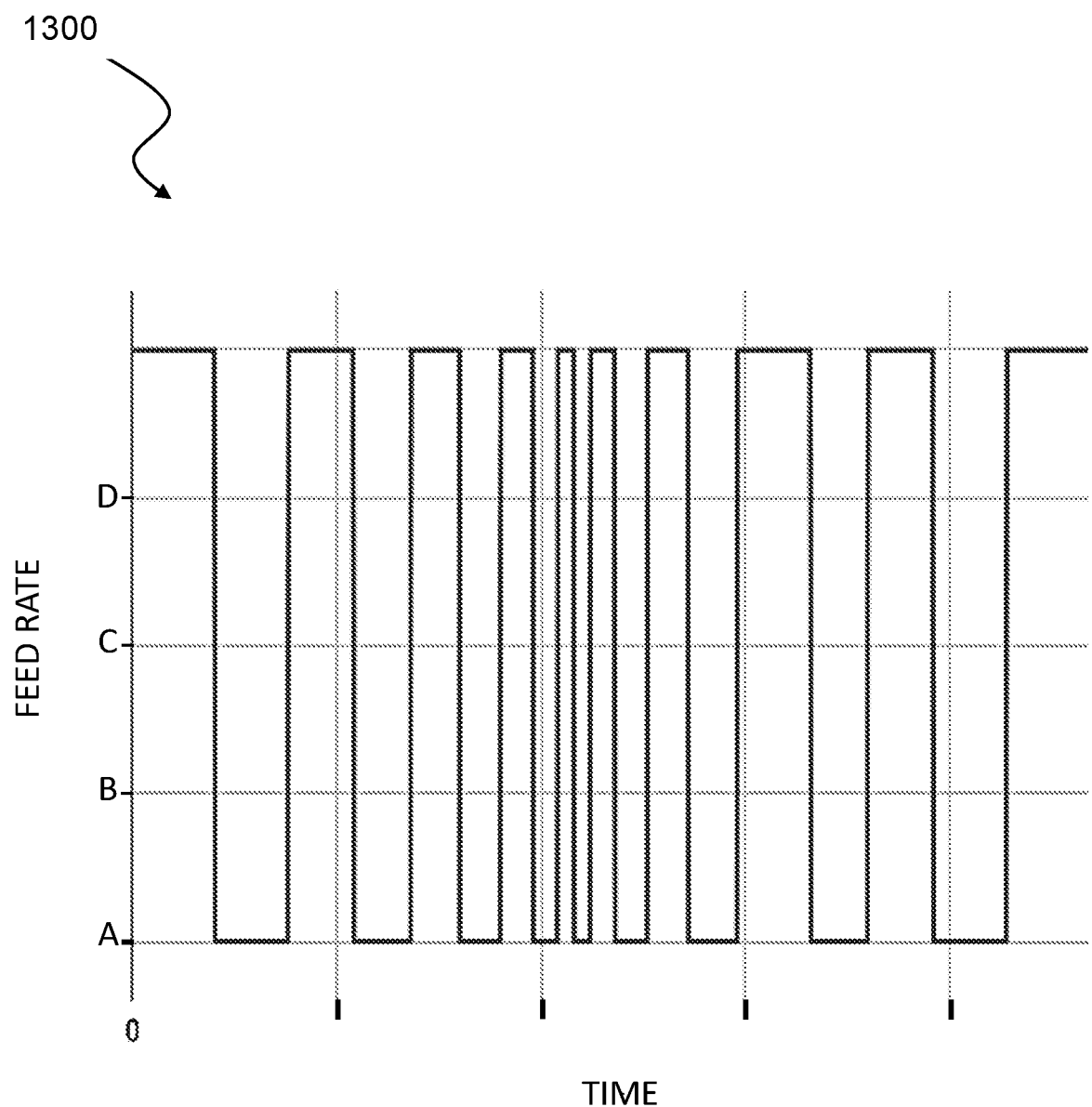
FIG. 13 shows a build material feed rate profile having higher feed rate intervals and lower feed rate intervals, in which the duration of the interval varies over the course of the time displayed. The location of the zero magnitude, feed rate is not specified, and could be at any one of the locations identified as A, B, C, and D on the feed rate vertical axis, depending upon feed rate parameters of other aspects of the combined system, as discussed below.
Figure 14:
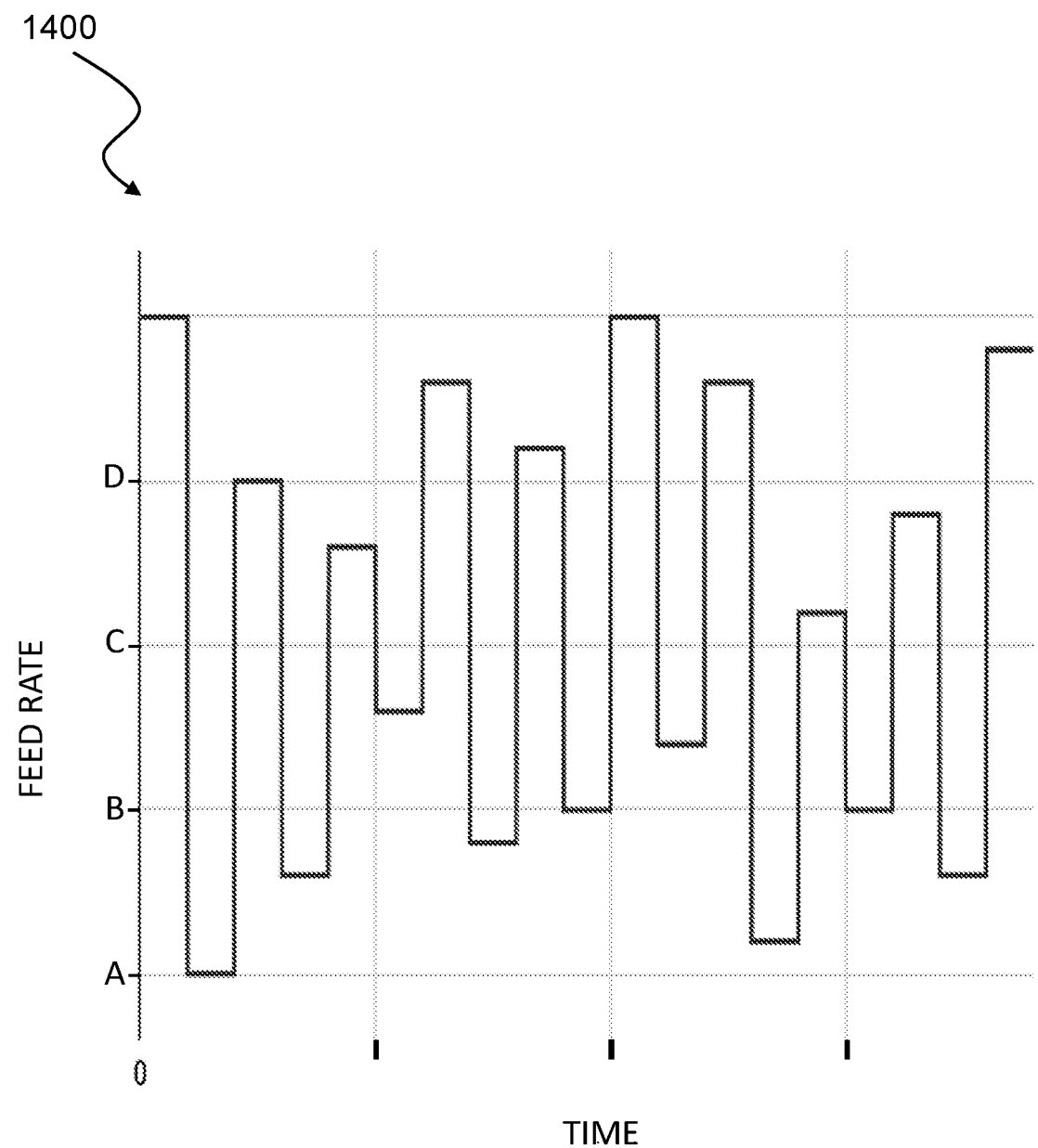
FIG. 14 shows a build material feed rate profile having higher feed rate intervals and lower feed rate intervals, in which the magnitude—meaning the feed rate speed of the interval varies over the course of the time displayed. The location of the zero magnitude, feed rate is not specified, and could be at any one of the locations identified as A, B, C, and D on the feed rate vertical axis, depending upon feed rate parameters of other aspects of the combined system, as discussed below.
Figure 15:
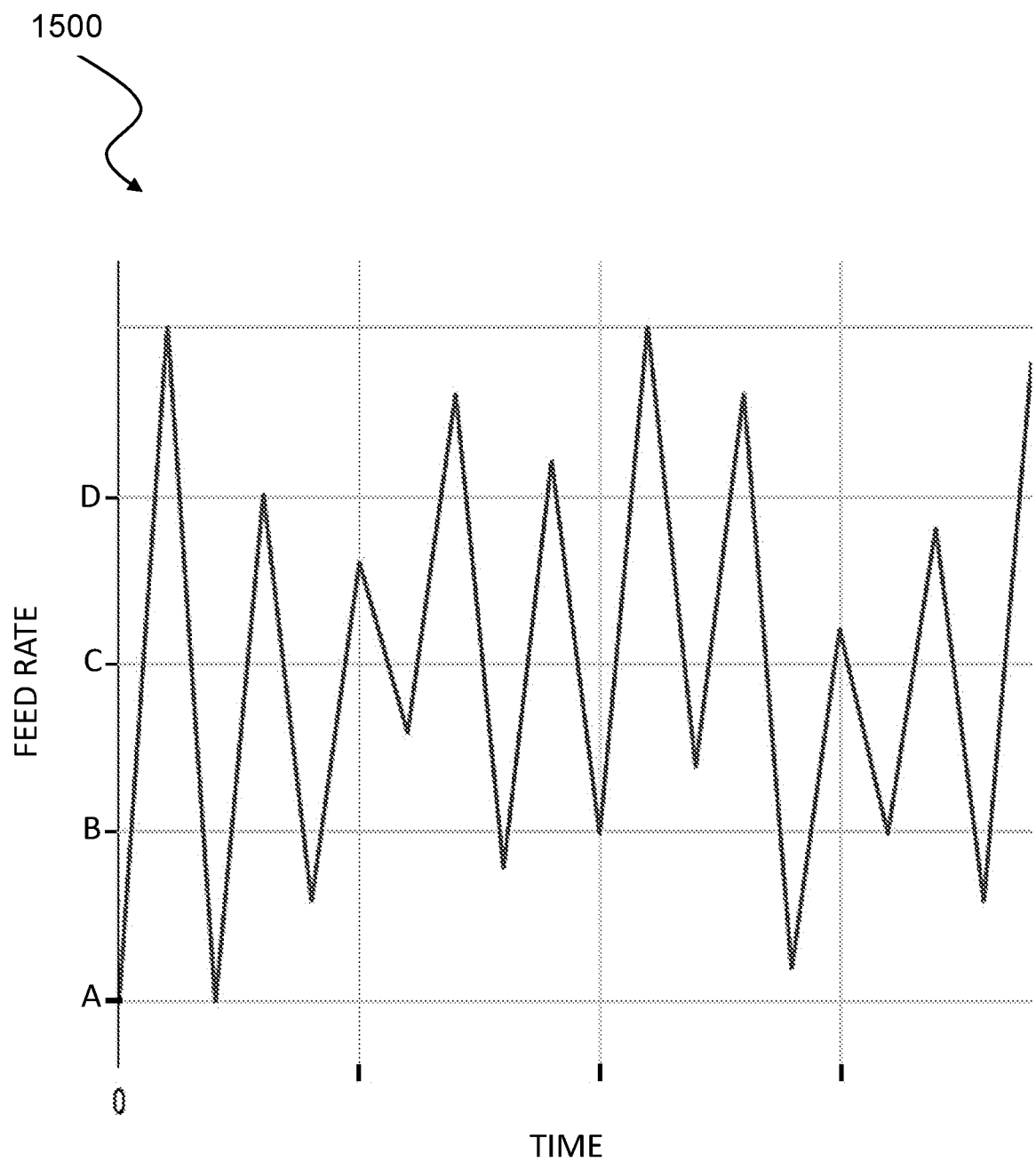
FIG. 15 shows a build material feed rate profile having higher feed rate intervals and lower feed rate intervals, in which the magnitude, meaning the feed rate speed of the interval, varies over the course of the time displayed. In addition, within any interval, the magnitude of the interval varies over the course of the interval, and never is at a constant magnitude for any period of time. The location of the zero magnitude, feed rate is not specified, and could be at any one of the locations identified as A, B, C, and D on the feed rate vertical axis, depending upon feed rate parameters of other aspects of the combined system, as discussed below.
Figure 17:
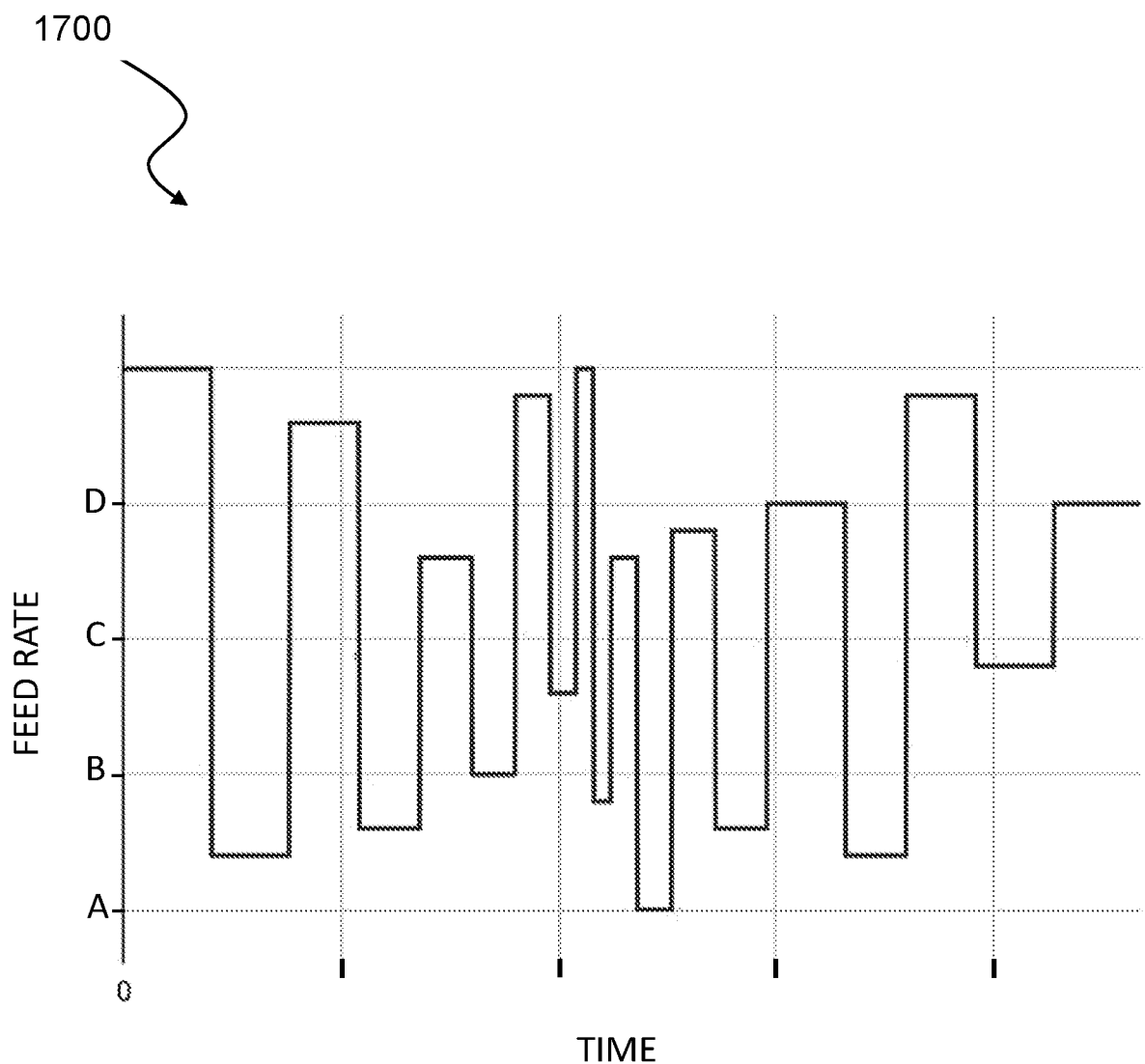
FIG. 17 shows a build material feed rate profile having higher feed rate intervals and lower feed rate intervals, in which both the magnitude of the interval and the duration of the interval varies over the course of the time displayed. The location of the zero magnitude, feed rate is not specified, and could be at any one of the locations identified as A, B, C, and D on the feed rate vertical axis, depending upon feed rate parameters of other aspects of the combined system, as discussed below.

FIG. 13 depicts a feed rate profile 1300 in which the duration of an interval changes but the magnitude remains the same from interval to interval. FIG. 14 depicts a feed rate profile 1400 in which the feed rate magnitude changes from interval to interval, but the duration remains the same in each interval. FIG. 15 depicts a feed rate profile 1500 in which the magnitude changes but the duration remains the same and the feed rate magnitude is always changing. That is to say the feed rate does not dwell at a particular value, in which case there would be a duration of a horizontal line representing magnitude. FIG. 16 depicts another feed rate profile 1600 in which feed rate does not dwell at a particular value. FIG. 17 depicts a feed rate profile in which the both the duration and the magnitude change.

In all these FIGS. 13-17, the vertical axis labels A, B, C and D may correspond to any appropriate feed rates, including zero or negative feed rates, selected for anti-clogging behavior, as outlined (i.e. choosing from the three regimes intelligently, for example). By way of non-limiting example, A may correspond to 0 mm/s, B may be a feed rate corresponding to the high end of the low feed rate regime, C may be a feed rate corresponding to a feed rate within the intermediate regime, and D may be a feed rate corresponding to the end of the intermediate regime and the beginning of the high feed rate regime. These feed rate profiles, or variations or combinations thereof may be used as the anti-clogging feed rate profile in the method step 806.

It is also possible that a feed rate profile would be composed of any combinations of the patterns shown, or not shown. For instance, a feed rate profile might include a segment of forward and reverse intervals of approximately the same feed rate, for different durations, such as shown at 900 in FIG. 9, followed by a segment of a feed rate profile such as at 11 in FIG. 11, with forward intervals of a relatively high feed rate, followed by forward intervals of a lesser, yet still positive feed rate, followed, finally, by a feed rate profile 1600 as shown in FIG. 16, in which case for this example, a zero feed rate would be at tickmark C, such that the build material is fed forward at a relatively high rate, which declines in magnitude during the forward interval, and then abruptly reverses to a relatively high magnitude reverse feed rate interval, which continues with slightly lower and lower feed rate until the profile reverses again to a relatively high feed rate forward motion interval. Any such combination, or any other combination as might be devised of profiles of the sort illustrated, and also not illustrated, may be combined if they are found to have provided beneficial extrusion conditions. (As noted above, the timescale shown in all of the above referenced profile figures may be any of various different timescales suitable for a given application. Thus, for example, the timescale in FIG. 9 may be milliseconds. It should be appreciated, however, that shorter or longer timescales may be used without departing from the scope of the present disclosure.

It will be understood that the extruder build material drive system 308 cannot accelerate instantaneously and therefore it is not possible to have a truly vertical line on a feed rate versus time graph. However, the acceleration may be appreciably large relative to the commanded change in feed rate that these depictions are a fair approximation. The same is true of decelerations.

It will be appreciated that the foregoing techniques may be employed alone or in any suitable combination, and may be combined with other time varying extrusion feed rate regimes such as sinusoidal regimes, ramps, and so forth, provided that the aggregate rate profile supports extended clog-free extrusion as contemplated herein.

It will also be understood that the principles of the present teachings may usefully be applied to additive fabrication using build materials such as bulk metallic glasses or any other build materials that may benefit from, e.g., controlled variations in material feed rate in order to mitigate nozzle clogging.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the present teachings as defined by the following claims, which are to be interpreted in the broadest sense allowable by law.

Aspects of the Present Teachings

The following aspects of THE present teachings are intended to be described herein, and this section is to ensure that they are mentioned. They are named aspects, and although they appear similar to claims, they are not claims. However, at some point in the future, the applicants reserve the right to claim any and all of these aspects in this and any related applications.

A1. A method for feeding build material into and extruding build material out from a nozzle of a three-dimensional printer to fabricate an object, the object having an interior geometry and an exterior geometry, based on a computerized model of the geometry of the object, the printer also comprising a nozzle and a build plate, the nozzle having an inlet and an outlet, the method comprising:
  a. feeding the build material into the nozzle inlet according to a predetermined feed rate profile which predetermined feed rate profile can be broken up into blocks of time, some of which blocks of time relate to fabricating the interior geometry of the object and some of which blocks of time relate to fabricating the exterior geometry of the object, each block of time being represented by a FFT (fast Fourier transform), where the blocks of time that relate to fabricating the exterior geometry are represented by a FFT that has significant high frequency content;
  b. extruding build material from the nozzle outlet; and
  c. simultaneously with the extruding step, moving the nozzle outlet along a build path relative to the build plate to fabricate the object on the build plate.

A2. The method of aspect 1, further wherein the predetermined feed rate profile comprises intervals of at least two different feed rates.

A3. The method of aspect 1, where the blocks of time that relate to fabricating the exterior geometry are represented by a FFT that has significant content exceeding 1 Hz.

A4. The method of aspect 1, where the blocks of time that relate to fabricating the exterior geometry are represented by a FFT that has significant content exceeding 5 Hz, and preferably exceeding 50 Hz, and more preferably exceeding 100 Hz.

A5. The method of aspect 2, wherein the predetermined rate profile comprises a periodic variation of at least two different feed rates.

A6. The method of aspect 2, wherein the predetermined rate profile comprises an aperiodic variation of at least two different feed rates.

A7. The method of aspect 1, further where the build material is a metal-containing-multi-phase (MCMP) type material, and where the build material has a working temperature range that includes a temperature, for extruding the build material out from the nozzle outlet.

A8. A method for feeding build material into and extruding build material out from a nozzle of a three-dimensional printer to fabricate an object, based on a computerized model of geometry of the object, the printer also comprising a nozzle and a build plate, the nozzle having an inlet and an outlet, there also being a set of feed rate profiles operational to print the object according to the computerized model, and a range of feed rates suitable for steady state extrusion, the method comprising:
  a. feeding the build material into the nozzle inlet according to a combination of:
    i. the set of feed rate profiles operational to print the object according to the computerized model; and
    ii. a predetermined feed rate profile, which predetermined feed rate profile comprises at least two different feed rates, one being a high feed rate that exceeds the range of feed rates suitable for steady state extrusion;
  b. extruding build material from the nozzle outlet; and
  c. simultaneously with the extruding step, moving the nozzle outlet along a build path relative to the build plate to fabricate the object on the build plate.

A9. The method of aspect 8, further where one of the at least two different feed rates is a low feed rate that is less than and outside the range of feed rates suitable for steady state extrusion.

A10. The method of aspect 8, further where one of the at least two different feed rates is a reverse feed rate.

A11. The method of aspect 8, further where one of the at least two different feed rates is a zero feed rate.

A12. The method of aspect 8, further where one of the at least two different feed rates has a magnitude that differs from one interval to another interval.

A13. The method of aspect 8, further where one of the at least two different feed rates has a magnitude that varies during the course of one interval of the feed rate profile.

A14. The method of aspect 8, further where one of the at least two different feed rates has a duration that differs from one interval to another interval.

A15. The method of aspect 8, wherein the predetermined rate profile comprises a periodic variation of at least two different feed rates.

A16. The method of aspect 8, wherein the predetermined rate profile comprises an aperiodic variation of at least two different feed rates.

A17. The method of aspect 8, wherein a combined feed rate profile resulting from combining the set of feed rate profiles operational to print the object according to the computerized model and a predetermined feed rate profile, exhibits a time-averaged feed rate, which is within the range suitable for steady state extrusion.

A18. The method of aspect 8, further comprising applying a fixed-ratio-of-rates requirement to the ratio of the combination of feed rates and motion of the nozzle outlet along the build path.

A19. The method of aspect 8, the predetermined feed rate profile comprising a feed rate profile related only to mitigation of clogs and other flow interruptions.

A20. The method of aspect 8, further wherein the step of feeding the build material into the nozzle inlet according to a combination of feed rates comprises taking into consideration a feed rate profile that is based on robotics and process.

A21. The method of aspect 8, further where the build material is selected from the group consisting of a filament, a wire and a rod.

A22. The method of aspect 8, further where the build material is a metal-containing-multi-phase (MCMP) type material, and where the build material has a working temperature range that includes a first temperature for mechanically driving the material into the inlet and a second, greater temperature, for extruding the build material out from the nozzle outlet.

A23. The method of aspect 22, the MCMP material comprising an alloy that is selected from the group consisting of: an alloy characterized by a phase diagram that exhibits a eutectic; an alloy characterized by a phase diagram that exhibits a peritectic; and an alloy characterized by a phase diagram that exhibits an isomorphous condition.

A24. The method of aspect 8 further comprising the steps of:
  a. monitoring for an error condition that indicates a flow interruption;
  b. in said step of combining a predetermined feed rate profile, combining a predetermined rate profile specifically chosen based on the flow interruption.

A25. The method of aspect 24, the predetermined rate profile comprising forward feed intervals and reverse feed intervals.

A26. A method for feeding build material into and extruding build material out from a nozzle of a three-dimensional printer to fabricate an object, based on a computerized model of geometry of the object, the printer also comprising a nozzle and a build plate, the nozzle having an inlet and an outlet, there also being a set of feed rate profiles operational to print the object according to the computerized model, and a range of feed rates suitable for steady state extrusion, the method comprising:
 a. feeding the build material into the nozzle inlet according to a combination of:
  i. the set of feed rate profiles operational to print the object according to the computerized model; and
  ii. a predetermined feed rate profile, which predetermined rate profile comprises at least two different feed rates, one being a low feed rate that is less than and outside the range of feed rates suitable for steady state extrusion;
 b. extruding build material from the nozzle outlet; and
 c. simultaneously with the extruding step, moving the nozzle outlet along a build path relative to the build plate to fabricate the object on the build plate.

A27. A method for feeding build material into and extruding build material out from a nozzle of a three-dimensional printer to fabricate an object, based on a computerized model of geometry of the object, the printer also comprising a nozzle and a build plate, the nozzle having an inlet and an outlet, there also being a set of feed rate profiles operational to print the object according to the computerized model, the method comprising:
 a. feeding the build material into the nozzle inlet according to a combination of feed rates:
  i. the set of feed rate profiles operational to print the object according to the computerized model; and
  ii. a predetermined feed rate profile, which predetermined rate profile comprises at least two different feed rates;
 b. extruding build material from the nozzle outlet; and
 c. simultaneously with the extruding step, moving the nozzle outlet along a build path relative to the build plate to fabricate the object on the build plate.

A28. The method of aspect 27, further comprising applying a fixed-ratio-of-rates requirement to the ratio of the combination of feed rates and motion of the nozzle outlet along the build path.

A29. The method of aspect 27, the predetermined feed rate profile comprising a feed rate profile related only to mitigation of clogs and other flow interruptions.

A30. The method of aspect 27, further wherein the step of feeding the build material into the nozzle inlet according to a combination of feed rates comprises taking into consideration a feed rate profile that is based on robotics and process.

A31. The method of aspect 27, further where the build material is selected from the group consisting of a filament, a wire and a rod.

A32. The method of aspect 27, further where the build material is a metal-containing-multi-phase (MCMP) type material, and where the build material has a working temperature range that includes a first temperature for mechanically driving the material into the inlet and a second, greater temperature, for extruding the build material out from the nozzle outlet.

A33. The method of aspect 32, the MCMP material comprising an alloy that is selected from the group consisting of: an alloy characterized by a phase diagram that exhibits a eutectic; an alloy characterized by a phase diagram that exhibits a peritectic; and an alloy characterized by a phase diagram that exhibits an isomorphous condition.

A34. The method of aspect 27, wherein the predetermined rate profile comprises a periodic variation of at least two different feed rates.

A35. The method of aspect 27 further comprising the steps of:
 a. monitoring for an error condition that indicates a flow interruption; and
 b. in said step of combining a predetermined feed rate profile, combining a predetermined rate profile specifically chosen based on the flow interruption.

A36. A method for feeding build material into and extruding build material out from a nozzle of a three-dimensional printer to fabricate an object, based on a computerized model of geometry of the object, the printer also comprising a nozzle and a build plate, the nozzle having an inlet and an outlet, there also being a set of model-based feed rate profiles operational to print the object according to the computerized model, which model-based feed rate profiles as applied, results in fabricating an object at a model-based per-object rate, not accounting for delays based on servicing build material and extrusion flow interruptions, and a range of feed rates suitable for steady state extrusion, the method comprising:
 a. feeding the build material into the nozzle inlet according to a combination of:
  i. the set of feed rate profiles operational to print the object according to the computerized model; and
  ii. a predetermined feed rate profile, which predetermined rate profile comprises at least two different feed rates, and which predetermined rate profile as applied results in fabricating an object at a per-object rate that is less than the model-based per-object rate;
 b. extruding build material from the nozzle outlet;
 c. simultaneously with the extruding step, moving the nozzle outlet along a build path relative to the build plate to fabricate the object on the build plate.

A37. The method of aspect 36, further wherein the model-based feed rate profiles as applied, result in fabricating an object at a servicing-model-based per-object rate, accounting for delays based on servicing build material and extrusion flow interruptions, which servicing-model-based per-object rate is less than the model-based per-object rate; further wherein the predetermined rate profile as applied results in fabricating an object at a per-object rate that is larger than the servicing-model-based per-object rate.

A38. A computer program product comprising computer executable code embodied in a non-transitory computer readable medium that, when executing on a printer for three-dimensional fabrication of an object, the object having an interior geometry and an exterior geometry, based on a computerized model of the geometry of the object, the printer also comprising a nozzle and a build plate, the nozzle having an inlet and an outlet, controls the printer to perform the steps of:
 a. feeding the build material into the nozzle inlet according to a predetermined feed rate profile which predetermined feed rate profile can be broken up into blocks of time, some of which blocks of time relate to fabricating the interior geometry of the object and some of which blocks of time relate to fabricating the exterior geometry of the object, each block of time being represented by a FFT (fast Fourier transform), where the blocks of time that relate to fabricating the exterior geometry are represented by a FFT that has significant high frequency content;

b. extruding build material from the nozzle outlet;

c. simultaneously with the extruding step, moving the nozzle outlet along a build path relative to the build plate to fabricate the object on the build plate.

A39. A computer program product comprising computer executable code embodied in a non-transitory computer readable medium that, when executing on a printer for three-dimensional fabrication of an object, based on a computerized model of the geometry of the object, the printer also comprising a nozzle and a build plate, the nozzle having an inlet and an outlet, there also being a set of feed rate profiles operational to print the object according to the computerized model, and a range of feed rates suitable for steady state extrusion, controls the printer to perform the steps of:

a. feeding the build material into the nozzle inlet according to a combination of:
i. the set of feed rate profiles operational to print the object according to the computerized model; and
ii. a predetermined feed rate profile, which predetermined rate profile comprises at least two different feed rates, one being a high feed rate that exceeds the range of feed rates suitable for steady state extrusion;

b. extruding build material from the nozzle outlet; and c. simultaneously with the extruding step, moving the nozzle outlet along a build path relative to the build plate to fabricate the object on the build plate.

A40. A printer for fabricating a three-dimensional object based on a computerized model of geometry of the object, the object having an interior geometry and an exterior geometry, the printer comprising:

a. a nozzle with an inlet to receive a build material in a solid condition, the build material having a working temperature range with a flowable state exhibiting rheological behavior suitable for fused filament fabrication;

b. a heating system operable to heat the build material within the nozzle to a temperature within the working temperature range;

c. a drive system operable to engage the build material and to feed the build material into the nozzle inlet at a feed rate with sufficient force to extrude the build material from the nozzle outlet onto a build plate, while at a temperature within the working temperature range; and d. a feed rate controller configured to vary the feed rate that the drive system feeds the build material into the nozzle according to a predetermined feed rate profile which predetermined feed rate profile can be broken up into blocks of time, some of which blocks of time relate to fabricating the interior geometry of the object and some of which blocks of time relate to fabricating the exterior geometry of the object, each block of time being represented by a FFT (fast Fourier transform), where the blocks of time that relate to fabricating the exterior geometry are represented by a FFT that has significant high frequency content; and e. a nozzle robotics system operational to move the nozzle outlet at a rate along a build path relative to the build plate to fabricate the object on the build plate as build material is driven into the nozzle inlet and extruded out from the nozzle outlet.

A41. A printer for fabricating a three-dimensional object based on a computerized model of geometry of the object, the printer comprising:

a. a nozzle with an inlet to receive a build material in a solid condition, the build material having a working temperature range with a flowable state exhibiting rheological behavior suitable for fused filament fabrication, there also being a range of feed rates suitable for steady state extrusion;

b. a heating system operable to heat the build material within the nozzle to a temperature within the working temperature range;

c. a drive system operable to engage the build material and to feed the build material into the nozzle inlet at a feed rate with sufficient force to extrude the build material from the nozzle outlet onto a build plate, while at a temperature within the working temperature range; and d. a feed rate controller configured to vary the feed rate that the drive system feeds the build material into the nozzle according to a combination of:
i. a set of feed rate profiles operational to print the object according to the computerized model; and
ii. a predetermined feed rate profile, which predetermined rate profile comprises at least two different feed rates, one being a high feed rate that exceeds the range of feed rates suitable for steady state extrusion; and e. a nozzle robotics system operational to move the nozzle outlet at a rate along a build path relative to the build plate to fabricate the object on the build plate as build material is driven into the nozzle inlet and extruded out from the nozzle outlet.

What is claimed is:

1. A method for feeding build material into and extruding build material out from a nozzle of a three-dimensional printer to fabricate an object, the object having an interior geometry and an exterior geometry, based on a computerized model of geometry of the object, the three-dimensional printer also comprising a build plate, the nozzle having an inlet and an outlet, the method comprising:

a. feeding the build material into the inlet according to a predetermined feed rate profile, which predetermined feed rate profile can be broken up into blocks of time, some of which blocks of time relate to fabricating the interior geometry of the object and some of which blocks of time relate to fabricating the exterior geometry of the object, each block of time being represented by a FFT (fast Fourier transform), where the blocks of time that relate to fabricating the exterior geometry are represented by a FFT that has significant high frequency content;

b. extruding build material from the outlet;

c. simultaneously with the extruding step, moving the outlet along a build path relative to the build plate to fabricate the object on the build plate; and d. the build material is a metal-containing-multi-phase (MCMP) type material, and wherein the build material has at least one solid phase and at least one liquid phase co-existing and has a working temperature range that includes a temperature for extruding the build material out from the outlet.

2. The method of claim 1, wherein the predetermined feed rate profile comprises intervals of at least two different feed rates.

3. The method of claim 1, wherein the blocks of time that relate to fabricating the exterior geometry are represented by an FFT that has significant content exceeding 1 Hz.

4. The method of claim 1, wherein the predetermined feed rate profile comprises a periodic variation of at least two different feed rates.

5. A method for feeding build material into and extruding build material out from a nozzle of a three-dimensional printer to fabricate an object, based on a computerized model of geometry of the object, the three-dimensional printer also comprising a build plate, the nozzle having an inlet and an outlet, there also being a set of feed rate profiles operational to print the object according to the computerized model, and a range of feed rates suitable for steady state extrusion, the method comprising:
   a. feeding the build material into the inlet according to a combination of:
      i. the set of feed rate profiles operational to print the object according to the computerized model; and
      ii. a predetermined feed rate profile, which predetermined rate profile comprises at least two different feed rates, one being a high feed rate that exceeds the range of feed rates suitable for steady state extrusion;
   b. extruding build material from the outlet;
   c. simultaneously with the extruding step, moving the outlet along a build path relative to the build plate to fabricate the object on the build plate; and
   d. the build material is a metal-containing-multi-phase (MCMP) type material, and wherein the build material has at least one solid phase and at least one liquid phase co-existing and wherein the build material has a working temperature range that includes a temperature for extruding the build material out from the outlet.

6. The method of claim 5, wherein one of the at least two different feed rates is a low feed rate that is less than and outside the range of feed rates suitable for steady state extrusion.

7. The method of claim 5, wherein one of the at least two different feed rates is a reverse feed rate.

8. The method of claim 5, wherein one of the at least two different feed rates is a zero feed rate.

9. The method of claim 5, wherein the predetermined rate profile comprises a periodic variation of at least two different feed rates.

10. The method of claim 5, wherein a combined feed rate profile resulting from combining the set of feed rate profiles operational to print the object according to the computerized model and the predetermined feed rate profile, exhibits a time-averaged feed rate, which is within the range of feed rates suitable for steady state extrusion.

11. The method of claim 5, wherein the predetermined feed rate profile comprises a feed rate profile related only to mitigation of clogs and other flow interruptions.

12. A method for feeding build material into and extruding build material out from a nozzle of a three-dimensional printer to fabricate an object, based on a computerized model of geometry of the object, the three-dimensional printer also comprising a build plate, the nozzle having an inlet and an outlet, there also being a set of feed rate profiles operational to print the object according to the computerized model, the method comprising:
   a. feeding the build material into the inlet according to a combination of feed rates:
      i. the set of feed rate profiles operational to print the object according to the computerized model; and
      ii. a predetermined feed rate profile, which predetermined rate profile comprises at least two different feed rates;
   b. extruding build material from the outlet;
   c. simultaneously with the extruding step, moving the outlet along a build path relative to the build plate to fabricate the object on the build plate; and
   d. the build material is a metal-containing-multi-phase (MCMP) type material, and wherein the build material has at least one solid phase and at least one liquid phase co-existing and wherein the build material has a working temperature range that includes a temperature for extruding the build material out from the outlet.

13. The method of claim 12, further comprising applying a fixed-ratio-of-rates requirement to a ratio of the combination of feed rates and motion of the outlet along the build path.

14. The method of claim 12, wherein the predetermined feed rate profile comprises a feed rate profile related only to mitigation of clogs and other flow interruptions.

* * * * *